United States Patent
Tanaka

(10) Patent No.: US 9,111,503 B2
(45) Date of Patent: Aug. 18, 2015

(54) DISPLAY DEVICE AND METHOD FOR DRIVING SAME

(75) Inventor: Kohhei Tanaka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 179 days.

(21) Appl. No.: 13/985,271

(22) PCT Filed: Feb. 7, 2012

(86) PCT No.: PCT/JP2012/052697
§ 371 (c)(1),
(2), (4) Date: Aug. 13, 2013

(87) PCT Pub. No.: WO2012/111475
PCT Pub. Date: Aug. 23, 2012

(65) Prior Publication Data
US 2013/0314397 A1    Nov. 28, 2013

(30) Foreign Application Priority Data
Feb. 14, 2011    (JP) .................................. 2011-028809

(51) Int. Cl.
*G09G 5/00*    (2006.01)
*G09G 3/36*    (2006.01)
*G02F 1/1362*    (2006.01)

(52) U.S. Cl.
CPC .......... *G09G 3/3648* (2013.01); *G02F 1/13624* (2013.01); *G02F 1/136213* (2013.01); *G02F 1/136286* (2013.01); *G09G 3/3614* (2013.01); *G09G 3/3659* (2013.01); *G09G 3/3655* (2013.01); *G09G 2300/0426* (2013.01); *G09G 2300/0833* (2013.01); *G09G 2310/0248* (2013.01); *G09G 2310/0256* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 6,278,426 B1 * | 8/2001 | Akiyama | 345/87 |
| 2009/0109360 A1 | 4/2009 | Takahashi | |
| 2009/0219238 A1 * | 9/2009 | Furuya et al. | 345/87 |
| 2010/0020001 A1 * | 1/2010 | Edwards et al. | 345/92 |
| 2011/0227894 A1 * | 9/2011 | Choi et al. | 345/211 |

FOREIGN PATENT DOCUMENTS

JP    2009-109600 A    5/2009

OTHER PUBLICATIONS

International Search Report and Written Opinion corresponding to PCT/JP2012/052697, dated Apr. 3, 2012.

* cited by examiner

*Primary Examiner* — Christopher R Lamb
(74) *Attorney, Agent, or Firm* — Lowe Hauptman & Ham, LLP

(57) ABSTRACT

In each pixel formation portion of a display device, an amplification electrode is provided which is connected to a drain electrode of a thin-film transistor whose gate electrode is connected to a gate bus line and whose source electrode is connected to a source bus line. A second-capacitor is formed by the amplification electrode and a pixel electrode. A selection period is constituted by a precharge period and an amplification period. In the precharge period, a video signal potential is applied to the pixel electrode and a potential of a control wire is applied to the amplification electrode. In the amplification period, a video signal potential is applied to the amplification electrode with the pixel electrode being in a floating state.

16 Claims, 39 Drawing Sheets

DISPLAY DEVICE AND METHOD FOR DRIVING SAME

RELATED APPLICATIONS

The present application is a National Phase of International Application Number PCT/JP2012/052697, filed Feb. 7, 2012, and which is based upon and claims the benefit of priority from Japanese Patent Application No. 2011-028809, filed on Feb. 14, 2011.

TECHNICAL FIELD

The present invention relates to a display device, and specifically relates to an active matrix-type display device, and a method for driving the same.

BACKGROUND ART

There has hitherto been known an active matrix-type liquid crystal display device provided with a thin-film transistor (TFT) as a switching element. A display portion of the active matrix-type liquid crystal display device includes a plurality of source bus lines (video signal lines), a plurality of gate bus lines (scanning signal lines), and a plurality of pixel formation portions provided corresponding respectively to intersections between the plurality of source bus lines and the plurality of gate bus lines. These pixel formation portions are arranged in a matrix form, to configure a pixel array.

FIG. 39 is a circuit diagram showing a configuration of a pixel formation portion of the conventional general active matrix-type liquid crystal display device. As shown in FIG. 39, the pixel formation portion includes: a thin-film transistor T91, whose gate electrode is connected to a gate bus line GL passing through a corresponding intersection, and whose source electrode is connected to a source bus line SL passing through the intersection; a pixel electrode 92 connected to a drain electrode of the thin-film transistor T91; a common electrode (counter electrode) COM and an auxiliary capacitance electrode CS which are provided commonly in the plurality of pixel formation portions; a liquid crystal capacitor Clc formed by the pixel electrode 92 and the common electrode COM; and an auxiliary capacitor Cstg formed by the pixel electrode 92 and the auxiliary capacitance electrode CS. Further, a pixel capacitance is formed by the liquid crystal capacitor Clc and the auxiliary capacitor Cstg. Then, a voltage indicating a pixel value is held in the pixel capacitance on the basis of a video signal that the source electrode of the thin-film transistor T91 receives from the source bus line SL when the gate electrode of the thin-film transistor T91 receives an active scanning signal from the gate bus line GL. It is to be noted that the auxiliary capacitor Cstg is not necessarily provided.

Incidentally, there has recently been apparent progress in high definition of display images in the liquid crystal display device. An Example of the high definition includes a 4K (resolution: 3840×2048) large-sized panel for television. With high-definition display images, power consumption associated with driving of the panel increases. A power attribute to the charging and discharging of the source bus line accounts for a large part of the power consumption of the panel. The power consumption attribute to the charging and discharging of the source bus is obtained by: (the number of source bus lines)×(wiring capacitance of source bus line)×(drive frequency)×(square of amplitude of video signal). Therefore, making the amplitude of the video signal smaller can effectively reduce the power consumption of the panel.

As methods for making smaller the amplitude of the video signal to be applied to the source bus line, methods (first to third methods) as described below have been proposed.

A first method is a method of alternatively applying a high-level potential and a low-level potential to the common electrode, namely a method of performing alternate current (AC) drive on the common electrode. According to the first method, a polarity (a polarity with reference to a common electrode potential) of the video signal is made negative at the time of writing into the pixel capacitance in a state where a high-level potential is applied to the common electrode, and the polarity of the video signal is made positive at the time of writing into the pixel capacitance in a state where a low-level potential is applied to the common electrode. It is to be noted that the first method has been adopted to a display device of a VA (Vertical Alignment) mode, an IPS (In-Plane Switching) mode, and the like.

A second method is a method of configuring the common electrode to be separated per row, and driving each common electrode as a waveform as shown in FIG. 40. In FIG. 40, Vcom1 to Vcom4 are waveforms of the common electrode corresponding respectively to first to fourth rows. Also in the second method, as in the first method, the polarity of the video signal is made negative at the time of writing into the pixel capacitance in a state where a high-level potential is applied to the common electrode, and the polarity of the video signal is made positive at the time of writing into the pixel capacitance in a state where a low-level potential is applied to the common electrode. It is to be noted that the second method has been adopted to the display device of the IPS mode.

The third method is a method of fluctuating a potential of the auxiliary capacitance electrode after writing from the source bus line into the pixel capacitance is performed. According to the third method, after writing from the source bus line into the pixel capacitance is performed, the potential of the auxiliary capacitance electrode is changed so as to increase a voltage between the pixel electrode and the common electrode in a state where a switching element (thin-film transistor T91 of FIG. 39) called as pixel TFT or the like is turned OFF.

Further, Japanese Patent Application Laid-Open No. 2009-109600 discloses invention of a liquid crystal display device where the pixel formation portion is configured as shown in FIG. 41 and driving is performed as follows. In a first half period of one horizontal scanning period, an ON-level potential is applied to a line denoted by reference character 9 in a state where an OFF-level potential is applied to the gate bus line GL. This brings thin-film transistors T902, T903 into an ON state. As a result, a video signal potential (a potential of the source bus line SL) is applied to a node 901, and a potential of the common electrode COM is applied to a node 902. Subsequently, in a latter half of one horizontal scanning period, an ON-level potential is applied to the gate bus line GL in a state where an OFF-level potential is applied to the line denoted by reference character 9. This brings a thin-film transistor T901 into the ON state. As a result, a video signal potential is applied to the node 902. That is, the potential of the node 902 increases from the common electrode potential to the video signal potential. At this time, as the node 901 is in a floating state, a potential of the node 901 increases with increase in potential of the node 902 via a capacitor C91. In such a manner as thus described, a larger voltage is applied between the pixel electrode and the common electrode.

PRIOR ART DOCUMENT

Patent Document

[Patent Document 1] Japanese Patent Application Laid-Open No. 2009-109600

SUMMARY OF THE INVENTION

Problems to be Solved by the Invention

However, according to the aforementioned first to third methods, the configuration is such that the potential of the common electrode (counter electrode) or the auxiliary capacitance electrode is directly controlled. For this reason, loads for those controls are large, and applications to a large-sized panel are thus difficult. Further, the first to third methods have respective problems as follows. As for the first method, since a large load is applied for driving the common electrode, it is difficult to apply to high-speed drive and it is disadvantageous in terms of seeking for low power consumption. As for the second method, it cannot be applied to a display device other than a display device of a horizontal field mode such as the IPS mode. As for the third method, with the auxiliary capacitance electrode being an essential constitutional element, it is disadvantageous in terms of seeking for an improvement in aperture ratio.

Further, in the invention disclosed in Japanese Patent Application Laid-Open No. 2009-109600, the common electrode potential is applied to the node 902 (see FIG. 41) in the first half period of one horizontal scanning period. That is, precharge using the common electrode potential is performed. For this reason, a pixel electrode potential is amplified in accordance with a difference between the video signal potential and the common electrode potential. However, since the common electrode potential is not to be freely set, the difference between the video signal potential and the common electrode potential cannot be made sufficiently large, and accordingly the degree of amplification of the pixel electrode potential is not sufficient.

Accordingly, it is an object of the present invention to realize a display device which can significantly reduce an amplitude of a video signal even when a large-sized panel is adopted, and a method for driving the display device.

Means for Solving the Problems

A first aspect of the present invention is directed to an active matrix-type display device which has a plurality of video signal lines; a plurality of scanning signal lines intersecting with the plurality of video signal lines; a plurality of pixel formation portions arranged in a matrix form corresponding respectively to intersections of the plurality of video signal lines and the plurality of scanning signal lines; and a common electrode commonly provided in the plurality of pixel formation portions, the display device comprising:

first control wires which intersect with at least one of the plurality of video signal lines and the plurality of scanning signal lines, and second control wires which are provided so as to correspond one-to-one to the plurality of scanning signal lines, wherein each of the pixel formation portions includes a pixel electrode which is to be applied with a potential in accordance with an image to be displayed, a first-capacitor which is formed by the pixel electrode and the common electrode, an amplification circuit portion for amplifying a potential of the pixel electrode, and a first switching element whose control terminal is connected to the scanning signal line, whose first conductive terminal is connected to the video signal line, and whose second conductive terminal is connected to the amplification circuit portion, the amplification circuit portion includes an amplification stage constituted by a second switching element whose control terminal is connected to the second control wire and whose first conductive terminal is connected to the video signal line, a third switching element whose control terminal is connected to the second control wire and whose first conductive terminal is connected to the first control wire, and a second-capacitor provided between the second conductive terminal of the second switching element and the second conductive terminal of the third switching element, the second conductive terminal of the first switching element is connected to the second conductive terminal of the third switching element, the pixel electrode is connected to the second conductive terminal of the second switching element, and when attention is focused on any pixel formation portion, one frame period during which a display for one screen is performed includes a selection period and a non-selection period other than the selection period, the selection period being a period for changing a potential of the pixel electrode in accordance with the image to be displayed and including a first period and a second period, the corresponding first control wire is applied with a constant potential or alternatively applied with a constant high-level potential and a constant low-level potential, the corresponding second control wire is applied with a potential for bringing the second switching element and the third switching element into an ON state in the first period and is applied with a potential for bringing the second switching element and the third switching element into an OFF state in a period other than the first period, and the corresponding scanning signal line is applied with a potential for bringing the first switching element into the ON state in the second period and is applied with a potential for bringing the first switching element into the OFF state in a period other than the second period.

According to a second aspect of the present invention, in the first aspect of the present invention, the high-level potential and the low-level potential are alternately applied to the first control wire.

According to a third aspect of the present invention, in the second aspect of the present invention, when attention is focused on any pixel formation portion, the corresponding first control wire is applied with the high-level potential in the selection period in which a potential lower than the potential of the common electrode is to be applied to the pixel electrode, and applied with the low-level potential in the selection period in which a potential higher than the potential of the common electrode is to be applied to the pixel electrode.

According to a fourth aspect of the present invention, in the second aspect of the present invention, when a median potential between the maximum potential and the minimum potential that can be applied to the plurality of video signal lines is taken as a reference potential, potentials of values obtained by adding a value Vctla, calculated by the following equation, to respective values of a potential higher than the reference potential by a predetermined magnitude and a potential lower than the reference potential by the predetermined magnitude, are applied to the first control wire as the high-level potential and the low-level potential, $$Vctla=-\Delta Vg \cdot (Ctr+Clc+Cp)/Ctr$$

where $\Delta Vg$ indicates a magnitude of a change in potential of the pixel electrode due to a change in potential of the scanning signal line at the time of shift from the selection period to the non-selection period, Clc indicates a capacitance value of the first-capacitor, Ctr indicates a capacitance value of the second-capacitor, and Cp indicates a capacitance value of a parasitic capacitor.

According to a fifth aspect of the present invention, in the first aspect of the present invention, when a median potential between the maximum potential and the minimum potential that can be applied to the plurality of video signal lines is taken as a reference potential, a potential of a value obtained by adding a value Vctla, calculated by the following equation, to a value of the reference potential is applied to the first control wire as the constant potential, $$Vctla=-\Delta Vg \cdot (Ctr+Clc+Cp)/Ctr$$

where $\Delta Vg$ indicates a magnitude of a change in potential of the pixel electrode due to a change in potential of the scanning signal line at the time of shift from the selection period to the non-selection period, Clc indicates a capacitance value of the first-capacitor, Ctr indicates a capacitance value of the second-capacitor, and Cp indicates a capacitance value of a parasitic capacitor.

According to a sixth aspect of the present invention, in the first aspect of the present invention, the first control wire is arranged so as to extend parallel to the scanning signal line.

According to a seventh aspect of the present invention, in the first aspect of the present invention, the first control wire is arranged so as to extend parallel to the video signal line.

According to an eighth aspect of the present invention, in the first aspect of the present invention, the display device further comprises a two-layer transparent electrode having a first transparent electrode which functions as the pixel electrode, and a second transparent electrode which includes a capacitor forming electrode portion for forming the second-capacitor between the pixel electrode and the capacitor forming electrode portion.

According to a ninth aspect of the present invention, in the eighth aspect of the present invention, the second transparent electrode further includes a lattice-form electrode portion formed in a lattice so as to have a part extending parallel to the scanning signal line and a part extending parallel to the video signal line and electrically separated from the capacitor forming electrode portion, and the lattice-form electrode portion functions as the first control wire.

According to a tenth aspect of the present invention, in the eighth aspect of the present invention, the second transparent electrode further includes a shield electrode portion formed in a region between the video signal line and the first transparent electrode and electrically separated from the capacitor forming electrode portion.

According to an eleventh aspect of the present invention, in the tenth aspect of the present invention, the shield electrode portion is formed so as to cover the video signal line.

According to a twelfth aspect of the present invention, in the tenth aspect of the present invention, the shield electrode portion is formed so as not to overlap the video signal line, and formed in a region between the video signal line and the capacitor forming electrode portion in a direction in which the scanning signal line extends.

According to a thirteenth aspect of the present invention, in the tenth aspect of the present invention, the shield electrode portion functions as the first control wire.

According to a fourteenth aspect of the present invention, in the first aspect of the present invention, liquid crystal is provided as a display medium between the pixel electrode and the common electrode, each of the pixel formation portions forms a pixel constituted by a plurality of regions in which orientational states of the liquid crystal are different from each other, and the first control wire is arranged in the region corresponding to a boundary portion of the plurality of regions.

According to a fifteenth aspect of the present invention, in the first aspect of the present invention, the amplification circuit portion includes a plurality of amplification stages, the second conductive terminal of the first switching element is connected to the second conductive terminal of the third switching element included in the amplification stage electrically arranged the farthest from the pixel electrode among the plurality of amplification stages, the pixel electrode is connected to the second conductive terminal of the second switching element included in the amplification stage electrically arranged the nearest from the pixel electrode among the plurality of amplification stages, and when attention is focused on the consecutive two amplification stages, the second conductive terminal of the second switching element included in the amplification stage electrically arranged farther from the pixel electrode is connected to the second conductive terminal of the third switching element included in the amplification stage electrically arranged nearer from the pixel electrode.

A sixteenth aspect of the present invention is directed to a method for driving an active matrix-type display device which has a plurality of video signal lines; a plurality of scanning signal lines intersecting with the plurality of video signal lines; a plurality of pixel formation portions arranged in a matrix form corresponding respectively to intersections of the plurality of video signal lines and the plurality of scanning signal lines; and a common electrode commonly provided in the plurality of pixel formation portions, each of the pixel formation portions having a pixel electrode which is to be applied with a potential in accordance with an image to be displayed, the method comprising:

regarding each of the pixel formation portions, a pixel electrode potential changing step for changing the potential of the pixel electrode in accordance with the image to be displayed in each one frame period during which a display for one screen is performed; and a pixel electrode potential holding step for holding the potential of the pixel electrode, wherein the display device includes first control wires which intersect with at least one of the plurality of video signal lines and the plurality of scanning signal lines, and second control wires which are provided so as to correspond one-to-one to the plurality of scanning signal lines, each of the pixel formation portions includes a first-capacitor which is formed by the pixel electrode and the common electrode, an amplification circuit portion for amplifying a potential of the pixel electrode, and a first switching element whose control terminal is connected to the scanning signal line, whose first conductive terminal is connected to the video signal line, and whose second conductive terminal is connected to the amplification circuit portion, the amplification circuit portion includes an amplification stage constituted by a second switching element whose control terminal is connected to the second control wire and whose first conductive terminal is connected to the video signal line, a third switching element whose control terminal is connected to the second control wire and whose first conductive terminal is connected to the first control wire, and a second-capacitor provided between the second conductive terminal of the second switching element and the second conductive terminal of the third switching element, the second conductive terminal of the first switching element is connected to the second conductive terminal of the third switching element, the pixel electrode is connected to the second conductive terminal of the second switching element, the first control wire is applied with a constant potential or alternatively applied with a constant high-level potential and a constant low-level potential, and when attention is focused on any pixel formation portion, the pixel electrode potential changing step includes a first step in which the corresponding second control wire is applied with a potential for bringing the second switching element and the third switching element into an ON state in a state where the corresponding scanning signal line is applied with a potential for bringing the first switching element into an OFF state, and a second step in which the corresponding scanning signal line is applied with a potential for bringing the first switching element into the ON state in a state where the corresponding second control wire is applied with a potential for bringing the second switching element and the third switching element into the OFF state, and in the pixel electrode potential holding step, the corresponding scanning signal line is applied with a potential for bringing the first switching element into the OFF state, and the corresponding second control wire is applied with a potential for bringing the second switching element and the third switching element into the OFF state.

Effects of the Invention

According to the first aspect of the present invention, the selection period for changing the pixel electrode potential in accordance with the display image is constituted by the first period and the second period. The pixel electrode potential is made equal to the video signal potential in the first period, and thereafter amplified in accordance with the difference between the potential of the first control wire and the video signal potential in the second period. For this reason, even when the amplitude of the video signal is made smaller than the conventional case, it is possible to apply a potential similar to in the conventional case to the pixel electrode. This leads to a reduction of the power consumption. Here in the configuration of the present invention, the potential of the pixel electrode and the potential of the common electrode are not directly controlled, thereby allowing amplification of the pixel electrode potential with a relatively small load. Accordingly, also in a large-sized panel, the amplitude of the video signal can be made smaller, thus reducing the power consumption.

According to the second aspect of the present invention, by adjusting a high-level potential and a low-level potential which are applied to the first control wire, it is possible to appropriately adjust the relation (undermentioned "pseudo VT characteristic") of a transmittance and the difference between the video signal potential and the common electrode potential.

According to the third aspect of the present invention, since the difference between the potential of the first control wire and the video signal potential becomes larger in the selection period, the pixel electrode potential is amplified on a larger scale. For this reason, the amplitude of the video signal can be significantly made smaller than the conventional case, thus effectively reducing the power consumption.

According to the fourth aspect of the present invention, the value of the pixel electrode potential is not influenced by voltage fluctuation called "feed-through voltage", "pull-in voltage" and the like. For this reason, it is possible to set the value of the common electrode potential without considering the influence of the voltage fluctuation.

According to the fifth aspect of the present invention, similarly to the fourth aspect of the present invention, it is possible to set the value of the common electrode potential without considering the influence of the voltage fluctuation called "feed-through voltage", "pull-in voltage" and the like.

According to the sixth aspect of the present invention, the required number of first control wires becomes small as compared with the configuration in which the first control wires are arranged so as to extend parallel to the video signal line. Hence it is possible to suppress a decrease in aperture ratio due to provision of the first control wire.

According to the seventh aspect of the present invention, differently from the configuration in which the first control wire is arranged so as to extend parallel to the scanning signal line, a precharge potential is not applied at the same timing from one first control wire to a plurality of third switching elements. Hence it is possible to reduce the load which is applied to each first control wire when precharge is performed (first period).

According to the eighth aspect of the present invention, since the second-capacitor is formed by the two-layer transparent electrode, it is possible to make the capacitance value of the second-capacitor large. For this reason, the pixel electrode potential can be more greatly amplified. Hence it is possible to make the amplitude of the video signal significantly small, thus effectively reducing the power consumption.

According to the ninth aspect of the present invention, the transparent electrode formed in the lattice form functions as the first control wire. This makes the resistance of the first control wire small and leads to an improvement in aperture ratio.

According to the tenth aspect of the present invention, since the shield electrode portion is provided in the region between the video signal line and the first transparent electrode which functions as the pixel electrode, it is possible to reduce the influence exerted on the pixel electrode potential by the fluctuations in video signal potential.

According to the eleventh aspect of the present invention, since the shield electrode portion is formed so as to cover the video signal line, it is possible to effectively reduce the influence exerted on the pixel electrode potential by the fluctuations in video signal potential.

According to the twelfth aspect of the present invention, since the capacitance formed between the video signal line and the shield electrode portion becomes relatively small, it is possible to reduce the influence exerted on the pixel electrode potential by the fluctuations in video signal potential, while reducing the wiring capacitance of the video signal line.

According to the thirteenth aspect of the present invention, one electrode functions as the shield electrode portion and the first control wire. For this reason, also in a display device having a higher definition display portion, it is possible to reduce the influence exerted on the pixel electrode potential by the fluctuations in video signal potential.

According to the fourteenth aspect of the present invention, in the display device (orientation-division type liquid crystal display device) that employs a liquid crystal as a display medium and includes pixels each constituted by a plurality of regions in which orientational states of the liquid crystal are different from each other, the first control wire is formed so as to overlap a dark line. For this reason, a decrease in aperture ratio due to provision of the first control wire is effectively suppressed.

According to the fifteenth aspect of the present invention, the pixel electrode potential is amplified in a plurality of stages during the selection period. For this reason, the amplitude of the video signal can be significantly made smaller than the conventional case, thus significantly reducing the power consumption.

According to the sixteenth aspect of the present invention, a similar effect to that of the first aspect of the present invention can be exerted in the method for driving the display device.

MODES FOR CARRYING OUT THE INVENTION

0. Introduction

Before descriptions of embodiments, a basic operating principle of a display device of the present invention will be described. It is to be noted that in the following description, a term "amplification" is used for meaning that a difference between a pixel electrode potential and a common electrode potential becomes large.

Figure 1:
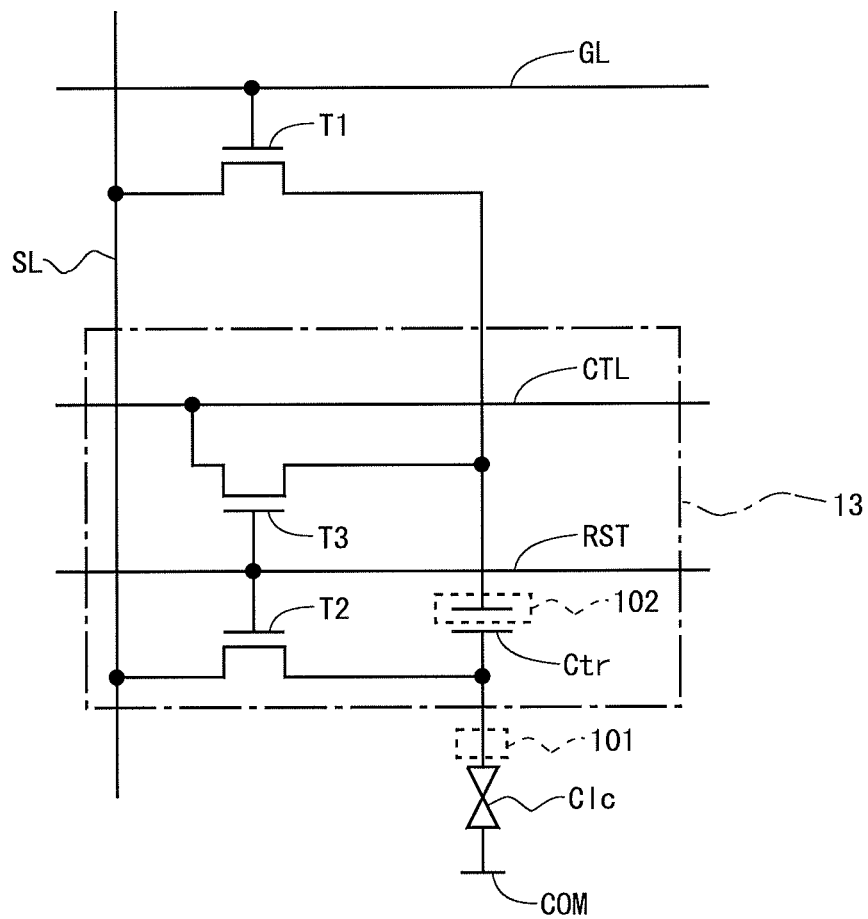
FIG. 1 is an equivalent circuit diagram showing a configuration of a typical pixel formation portion (a portion forming one pixel) in a display device of the present invention.

FIG. 1 is an equivalent circuit diagram showing a configuration of a typical pixel formation portion (a portion forming one pixel) in the display device of the present invention. As shown in FIG. 1, the pixel formation portion includes three thin-film transistors T1, T2 and T3 and two capacitors Clc and Ctr. Further, as a wire passing through the pixel formation portion, a wire denoted by reference character RST (herein after referred to as "reset wire") and a wire denoted by reference character CTL (herein after referred to as "control wire") are provided in addition to a gate bus line GL and a source bus line SL. In the following, the capacitor Clc is referred to as a "first-capacitor", and the capacitor Ctr is referred to as a "second-capacitor". Further, as for the first-capacitor Clc and the second-capacitor Ctr, capacitance values thereof are also denoted by the same reference characters "Clc" and "Ctr", respectively. It is to be noted that, although the control wire CTL is represented so as to extend parallel to the gate bus line GL in FIG. 1, the present invention is not restricted thereto.

A connecting relation among constitutional elements inside the pixel formation portion is as follows. As for the thin-film transistor T1, a gate electrode is connected to the gate bus line GL, a source electrode is connected to the source bus line SL, and a drain electrode is connected to one end of the second-capacitor Ctr. As for the thin-film transistor T2, a gate electrode is connected to the reset wire RST, a source electrode is connected to the source bus line SL, and a drain electrode is connected to the other end of the second-capacitor Ctr and one end of the first-capacitor Clc. As for the thin-film transistor T3, a gate electrode is connected to the reset wire RST, a source electrode is connected to the control wire CTL, and a drain electrode is connected to one end of the second-capacitor Ctr. One end of the first-capacitor Clc is connected to the drain electrode of the thin-film transistor T2 and the other end of the second-capacitor Ctr, and the other end of the first-capacitor Clc is connected to the common electrode COM. One end of the second-capacitor Ctr is connected to the drain electrode of the thin-film transistor T1 and the drain electrode of the thin film transistor T3, the other end of the second-capacitor Ctr is connected to the drain electrode of the thin film transistor T2 and one end of the first capacitor Clc. It is to be noted that, when a liquid crystal display device is adopted as the display device, the first-capacitor Clc corresponds to a liquid crystal capacitor.

In the configuration as thus described, a pixel electrode 101 exists at one end of the first-capacitor Clc. That is, the first-capacitor Clc is formed by the pixel electrode 101 and the common electrode COM. Moreover, at one end of the second-capacitor Ctr, there exists an electrode (herein after referred to as "amplification electrode") 102 for forming a capacitance (capacitance for amplifying a pixel electrode potential) between the electrode 102 and the pixel electrode 101 or between the electrode 102 and an electrode electrically connected to the pixel electrode 101. Hereinafter, a potential of the pixel electrode 101 (pixel electrode potential) is denoted by reference character Vpix, and a potential of the amplification electrode 102 (amplification electrode potential) is denoted by reference character Vint.

It is to be noted that, in the configuration shown in FIG. 1, a first switching element is realized by the thin-film transistor T1, a second switching element is realized by the thin-film transistor T2, a third switching element is realized by the thin-film transistor T3, a first control wire is realized by the control wire CTL, and a second control wire is realized by the reset wire RST. The gate electrode corresponds to a control terminal, the source electrode corresponds to a first conductive terminal, and a drain electrode corresponds to a second conductive terminal. Further, an amplification circuit portion 13 for amplifying the pixel electrode potential Vpix is realized by the thin-film transistor T2, the thin-film transistor T3 and the second-capacitor Ctr.

Figure 2:
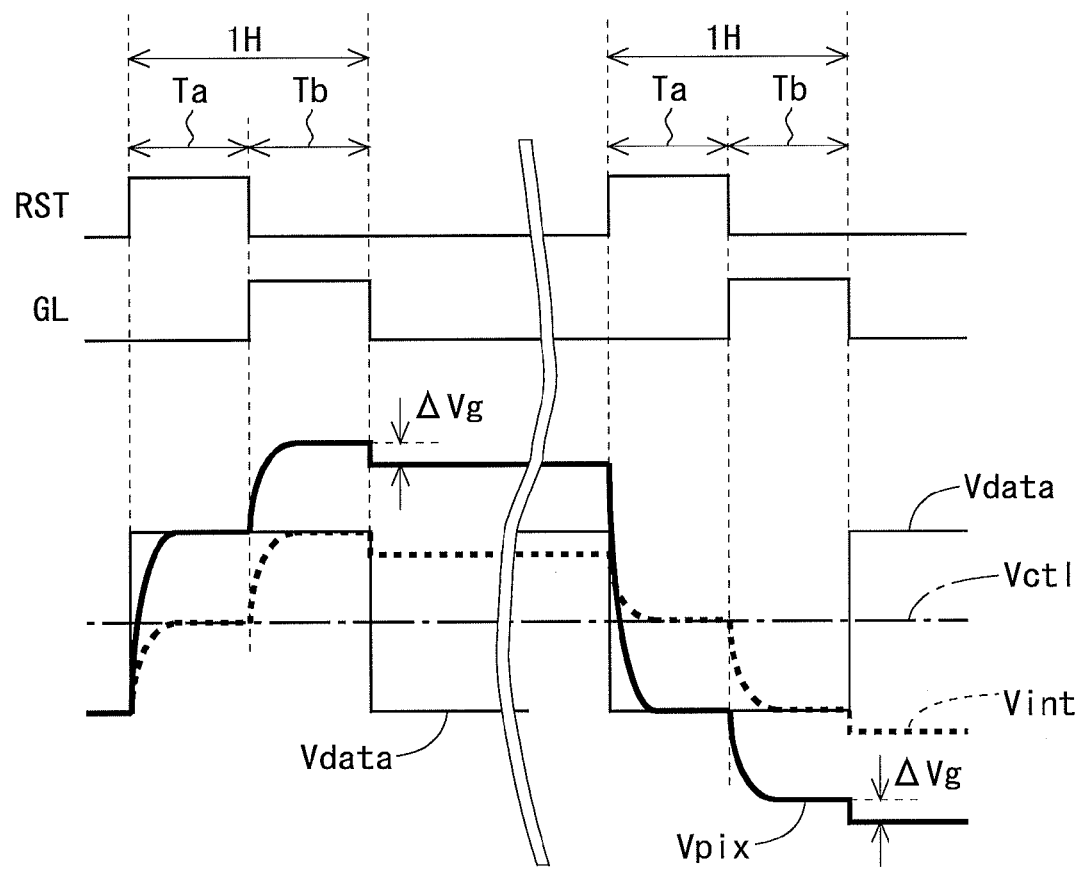
FIG. 2 is a signal waveform diagram for explaining an operation of the pixel formation portion in a selection period.

FIG. 2 is a signal waveform diagram for explaining an operation of the pixel formation portion in a selection period (the period for performing writing into the first-capacitor Clc in accordance with an image to be displayed in each pixel formation portion). The length of the selection period typically corresponds to the length of one horizontal scanning period in the conventional display device. It should be noted that reference character Vdata denotes a video signal potential (the potential of the source bus line SL), and reference character Vctl denotes a potential of the control wire CTL. In the present invention, as shown in FIG. 2, the selection period (horizontal scanning period) is configured of a first half period (herein after referred to as "precharge period") Ta, and a latter half period (herein after referred to as "amplification period") Tb. Therefore, one-frame period includes the selection period including the precharge period Ta and the amplification period Tb, and a non-selection period other than the selection period. The length of the precharge period Ta is not necessarily equivalent to the length of the amplification period Tb. It is to be noted that, since similar operations are performed both in a frame during which writing in the positive polarity is performed and in a frame during which writing in the negative polarity is performed, a description will herein after be given focusing attention on the frame during which writing in the positive polarity is performed.

First, in the precharge period Ta, an ON-level (high-level in the example shown in FIG. 2) potential is applied to the reset wire RST in a state where an OFF-level (low-level in the example shown in FIG. 2) potential is applied to the gate bus line GL. This brings the thin-film transistor T1 into an OFF state, and brings the thin-film transistors T2, T3 into an ON state. As a result, the video signal potential Vdata is applied to the pixel electrode 101, and the control wire potential Vctl is applied to the amplification electrode 102. Here, the video signal potential Vdata is a potential determined in accordance with the display image.

Next, in the amplification period Tb, an ON-level potential is applied to the gate bus line GL in a state where an OFF-level potential is applied to the reset wire RST. This brings the thin-film transistor T1 into the ON state, and brings the thin-film transistors T2, T3 into the OFF state. As a result, the video signal potential Vdata is applied to the amplification electrode 102. That is, the amplification electrode potential Vint increases from Vctl to Vdata. At this time, since the pixel electrode 101 is in the floating state, the pixel electrode potential Vpix increases via the second-capacitor Ctr with increase in amplification electrode potential Vint. A magnitude V1 of the increase in pixel electrode potential Vpix at this time is expressed by the following equation (1). Here, Cp indicates a capacitance value of the parasitic capacitor.

[Mathematical Formula 1]

$$V1 = \frac{Ctr}{Ctr + Clc + Cp} \cdot (Vdata - Vctl) \quad (1)$$

In this manner as thus described, the value of the pixel electrode potential Vpix becomes "Vdata+V1" at the end of amplification period Tb, namely at the end of the selection period.

When the amplification period Tb is completed, the potential of the gate bus line GL is changed from the ON-level to the OFF-level. In association with this change in potential, a voltage fluctuation ΔVg, called "feed-through voltage", "pull-in voltage" and the like, occurs in the pixel electrode potential Vpix. As a result, the pixel electrode potential Vpix becomes a value shown in the following equation (2). It is to be noted that, at the time of writing in the positive polarity, the voltage fluctuation ΔVg occurs such that the difference between the pixel electrode potential and the common electrode potential becomes small, and at the time of writing in the negative polarity, the voltage fluctuation ΔVg occurs such that the difference between the pixel electrode potential and the common electrode potential becomes large.

[Mathematical Formula 2]

$$Vpix = Vdata + \frac{Ctr}{Ctr + Clc + Cp} \cdot (Vdata - Vctl) - \Delta Vg \quad (2)$$

In this manner, in the period from the occurrence of the voltage fluctuation ΔVg after completion of the selection period to performance of writing in the next frame, the pixel electrode potential Vpix is held at the value shown in the above equation (2) (however, fluctuations in the potential due to a leakage current or the like is ignored).

It should be noted that the pixel electrode potential changing step is realized by an operation in the selection period, and the pixel electrode potential holding step is realized by an operation in the non-selection period. Moreover, the first step is realized by an operation in the precharge period Ta, and the second step is realized by an operation in the amplification period Tb.

In the conventional display device, the pixel electrode potential Vpix is equal to the video signal potential Vdata at the end of the selection period. It is grasped from this fact and the equation (2) that, according to the display device of the present invention, the pixel electrode potential Vpix at the end of the selection period is increased by a magnitude of (Ctr/(Ctr+Clc+Cp))·(Vdata−Vctl) as compared with that of the conventional display device. Further, it is grasped from the above equation (2) that the pixel electrode potential is amplified in accordance with the magnitude of (Vdata−Vctl) in the amplification period Tb. Moreover, the above equation (2) can be transformed as shown in the following equation (3).

[Mathematical Formula 3]

$$Vpix = \left[1 + \frac{Ctr}{Ctr + Clc + Cp}\right] \cdot Vdata - \frac{Ctr}{Ctr + Clc + Cp} \cdot Vctl - \Delta Vg \quad (3)$$

It is grasped from the above equation (3) that in the display device of the present invention, the value of the pixel electrode potential Vpix is settled on the basis of a potential obtained by amplifying the video signal potential Vdata by (1+(Ctr/(Ctr+Clc+Cp))) times the conventional device. Further, as for the pixel electrode potential Vpix, it is grasped that not only the offset based on the voltage fluctuation ΔVg occurs but the offset in the size according to the value of the control wire potential Vctl occurs.

Incidentally, the control wire CTL may be based on the direct-current drive or the alternate-current drive. In the case of adopting the alternate-current drive, typically, the control wire potential Vctl is set on a low level at the time of writing in the positive polarity (when the video signal potential Vdata is higher than the common electrode potential), and the control wire potential Vctl is set on a high level at the time of writing in the negative polarity (when the video signal potential Vdata is lower than the common electrode potential). It is grasped from the above equation (3) that the pixel electrode potential Vpix is more greatly amplified by alternate-current driving the control wire CTL as described above.

Figure 3:
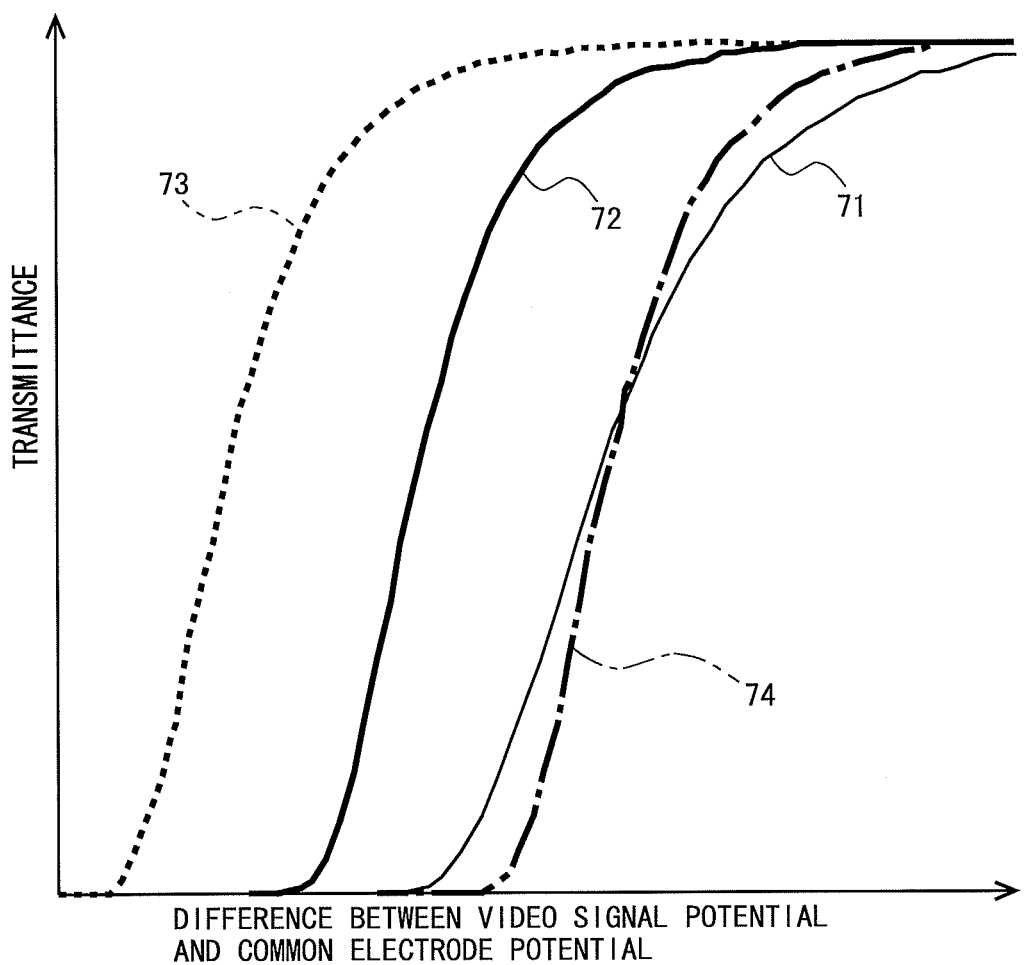
FIG. 3 is a diagram showing a relationship between a transmittance and a difference between a video signal potential and a common electrode potential.

FIG. 3 is a diagram showing a relationship between a transmittance and the difference between the video signal potential and the common electrode potential. It is to be noted that, since a characteristic of expressing a relationship between a liquid crystal applied voltage and a transmittance in the liquid crystal display device is called "VT characteristic", the characteristics expressing the relation shown in FIG. 3 is referred to as "pseudo VT characteristic" for the sake of convenience. In FIG. 3, a solid line denoted by reference character 71 indicates the pseudo VT characteristic in the conventional display device. As described above, according to the present invention, after the video signal potential Vdata is applied to the pixel electrode 101 in the precharge period Ta, the pixel electrode potential Vpix is amplified in the amplification period Tb. For this reason, the "difference between the video signal potential and the common electrode potential", which is required for obtaining as high a transmittance as in the conventional case, is smaller than the conventional case. Therefore, according to the display device of the present invention, when the control wire CTL is direct-current driven, a pseudo VT characteristic, e.g., one as indicated by a thick solid line denoted by reference character 72, is obtained. Further, alternate-current driving the control wire CTL can shift the pseudo VT characteristic. For example, when the control wire potential Vctl is set on a relatively low level at the time of writing in the positive polarity and the control wire potential Vctl is set on a relatively high level at the time of writing in the negative polarity, the pixel electrode potential Vpix is amplified on a larger scale in the amplification period Tb. Accordingly, a pseudo VT characteristic, e.g., one as indicated by a thick solid line denoted by reference character 73, is obtained. For example, when the control wire potential Vctl is set on a relatively high level at the time of writing in the positive polarity and the control wire potential Vctl is set on a relatively low level at the time of writing in the negative polarity, the degree of amplification of the pixel electrode potential Vpix in the amplification period Tb becomes small. Accordingly, a pseudo VT characteristic, e.g., one as indicated by a thick solid line denoted by reference character 74, is obtained.

In light of the above, embodiments of the present invention will be described herein after.

1. First Embodiment 1.1 Whole Configuration and Operation Summary

Figure 4:
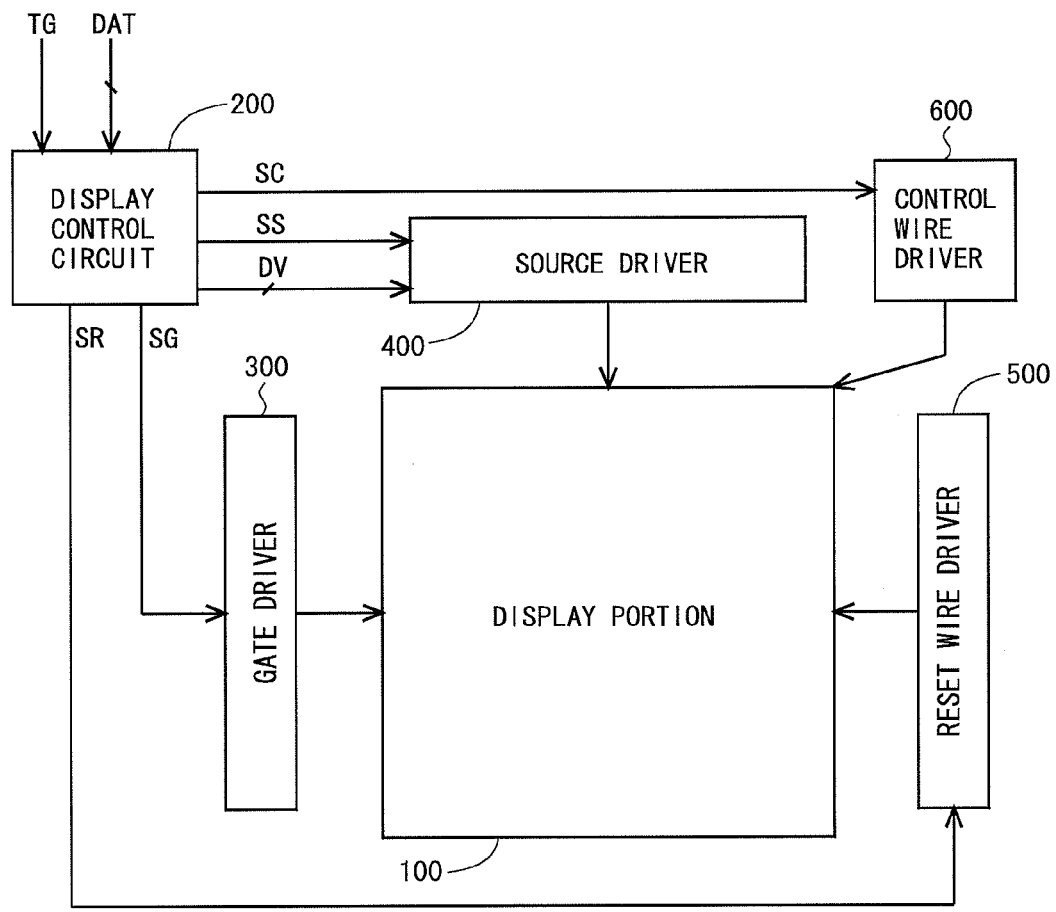
FIG. 4 is a block diagram showing a whole configuration of an active matrix-type liquid crystal display device according to a first embodiment of the present invention.

FIG. 4 is a block diagram showing a whole configuration of an active matrix-type liquid crystal display device according to a first embodiment of the present invention. This liquid crystal display device includes a display portion 100, a display control circuit 200, a gate driver 300, a source driver 400, a reset wire driver 500, and a control wire driver 600. The display portion 100 includes a plurality of source bus lines SL, a plurality of gate bus lines GL, and a plurality of pixel formation portions provided corresponding respectively to intersections between the plurality of source bus lines SL and plurality of gate bus lines GL. Further, the display portion 100 includes the reset wires RST provided so as to correspond one by one to each gate bus line GL, and the control wires CTL provided so as to correspond one by one to each gate bus line GL. The configuration of the pixel formation portion is as described above (see FIG. 1).

The display control circuit 200 receives image data DAT and a timing signal group TG, and outputs a control signal SG for controlling an operation of the gate driver 300, a control signal SS for controlling an operation of the source driver 400, a digital video signal DV on the basis of the image data DAT, a control signal SR for controlling an operation of the reset wire driver 500, and a control signal SC for controlling an operation of the control wire driver 600. It is to be noted that each control signal is configured of one or a plurality of signals. For example, the control signal SG is configured of a start pulse signal indicating start timing for a vertical scanning period, and a clock signal for controlling the timing of the shift operation in a shift register inside the gate driver 300.

The gate driver 300 drives the gate bus lines GL on the basis of the control signal SG. The source driver 400 drives the source bus lines SL on the basis of the control signal SS. The reset wire driver 500 drives the reset wires RST on the basis of the control signal SR. The control wire driver 600 drives the control wires CTL on the basis of the control signal SC. The gate bus lines GL, the source bus lines SL, the reset wires RST and the control wires CTL are driven in such a manner as thus described, whereby an image on the basis of the image data DAT is displayed in the display portion 100.

1.2 Arrangement Relationship Between Pixel Formation Portion and Each Line

Figure 5:
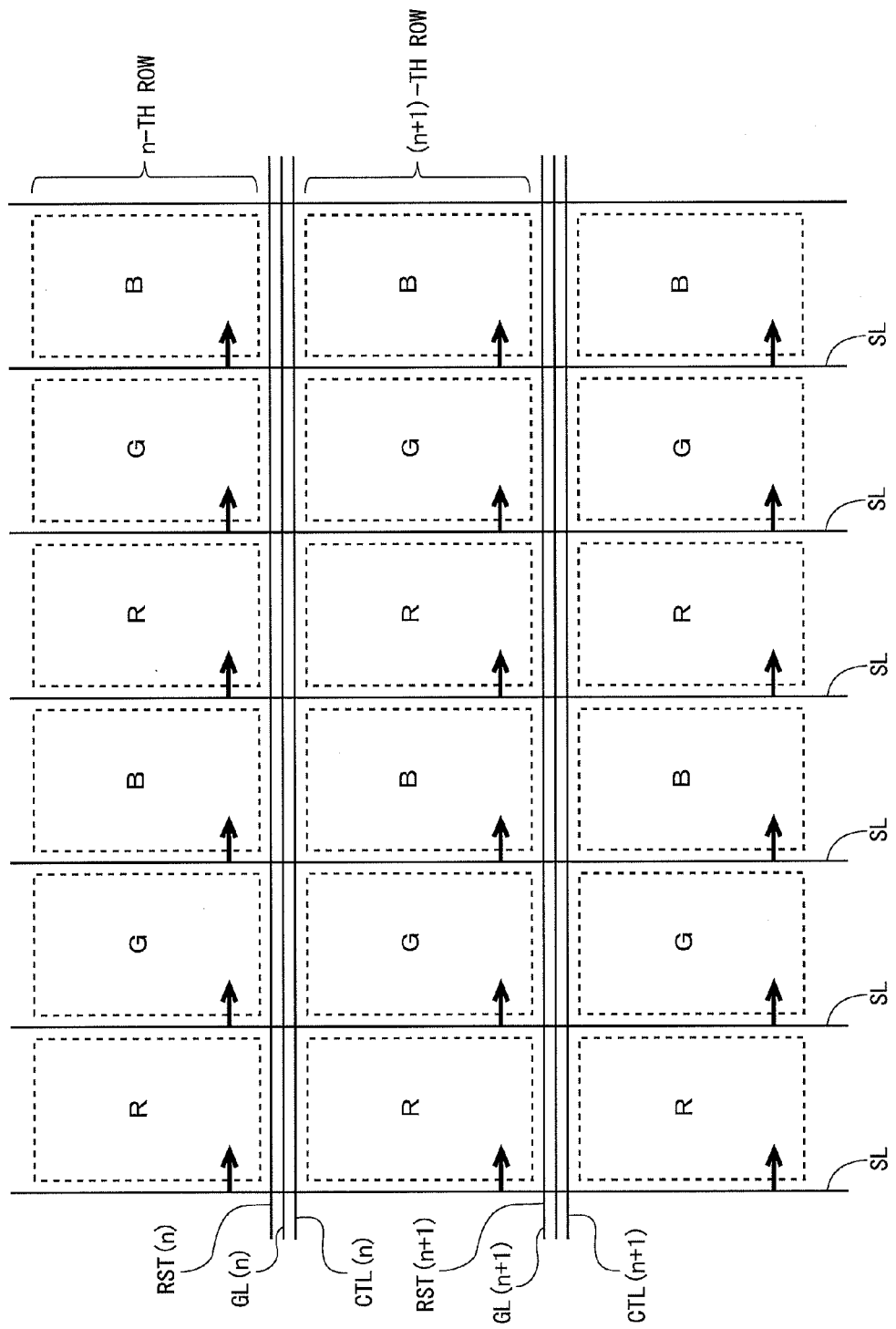
FIG. 5 is a view showing an arrangement relationship between a pixel formation portion and each line in the first embodiment.

FIG. 5 is a view showing an arrangement relation between the pixel formation portion and each line (source bus line SL, gate bus line GL, reset wire RST, and control wire CTL). In FIG. 5, supply directions of video signals from the source bus line SL to the pixel formation portion are indicated by arrows. R, G and B respectively indicate a pixel formation portion for red, a pixel formation portion for green and a pixel formation portion for blue. As grasped from FIG. 5, in the present embodiment, video signals are supplied from the source bus lines SL arranged at the same side (the left side in this example) in all of the pixel formation portions.

1.3 Layout

Figure 6:
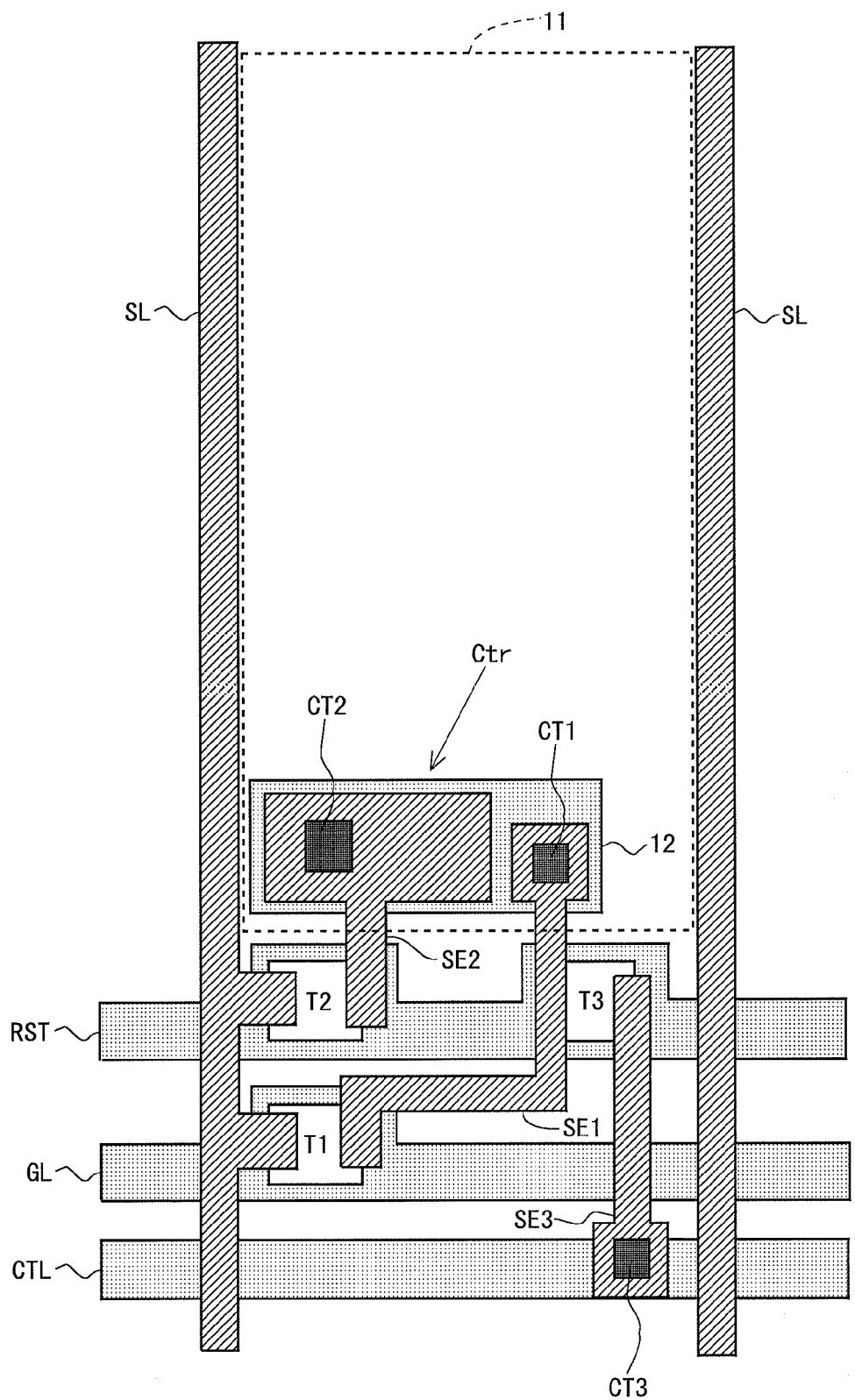
FIG. 6 is a view showing a layout of the vicinity of the pixel formation portion in the first embodiment.

Next, the layout of the vicinity of one pixel formation portion will be described while referring to FIG. 6. Similarly to the conventional liquid crystal display device, a gate metal forming the gate bus line GL and a source metal forming the source bus line SL are arranged so as to be orthogonal to each other. The reset wire RST and the control wire CTL are formed by the gate metal, and arranged so as to extend parallel to the gate bus line GL. A transparent electrode 11 which functions as the pixel electrode 101 is formed in a portion other than a region where the reset wire RST, the gate bus line GL and the control wire CTL are arranged among regions between the two adjacent source bus lines SL, as shown in FIG. 6. Further, the electrode 12 which functions as the aforementioned amplification electrode 102 is formed by the gate metal between the two adjacent source bus lines SL, as shown in FIG. 6.

The drain electrode of the thin-film transistor T1 and the electrode 12 are electrically connected to each other by a source metal denoted by reference character SE1 and a contact CT1. The drain electrode of the thin-film transistor T2 and the transparent electrode 11 are electrically connected to each other by a source metal denoted by reference character SE2 and a contact CT2. The source electrode of the thin-film transistor T3 and the control wire CTL are electrically connected to each other by a source metal denoted by reference character SE3 and a contact CT3. The drain electrode of the thin-film transistor T3 and the electrode 12 are electrically connected to each other by a source metal denoted by reference character SE1 and the contact CT1. In such a configuration as above, the second-capacitor Ctr is formed by the source metal denoted by reference character SE2 and the electrode 12.

Figure 7:
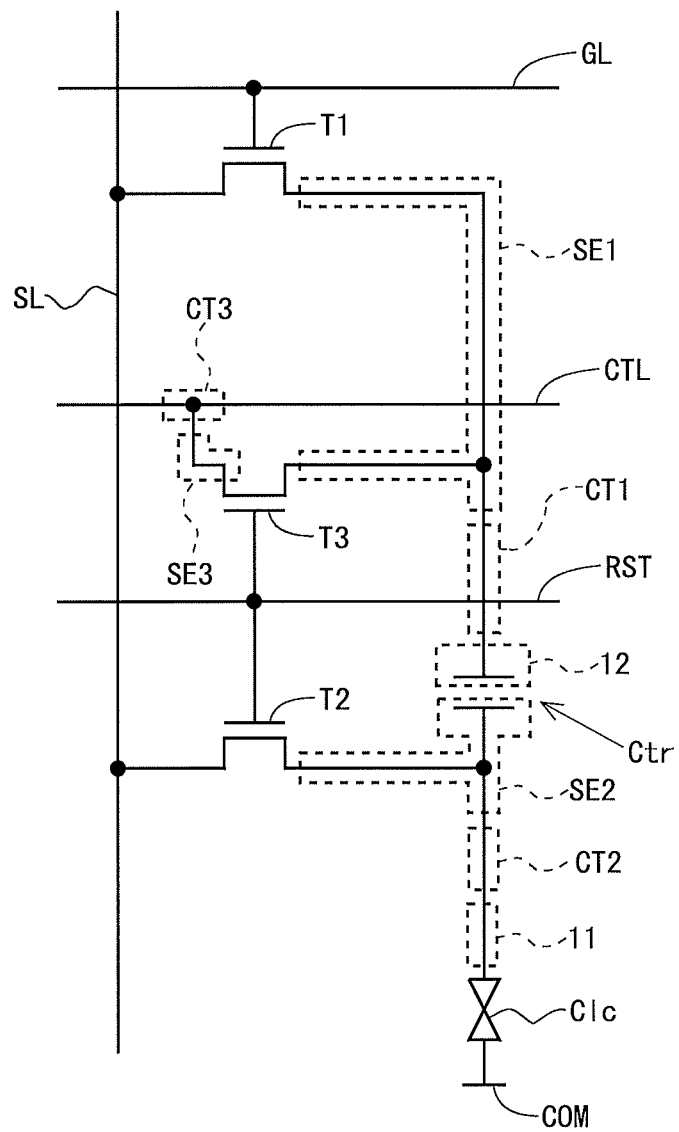
FIG. 7 is a view for explaining the layout of the vicinity of the pixel formation portion in the first embodiment.

It is to be noted that, when positions of the transparent electrode 11, the electrode 12, the source metals denoted by reference characters SE1 to SE3, and the contacts CT1 to CT3 in FIG. 6 are shown on the equivalent circuit diagram shown in FIG. 1, a figure as shown in FIG. 7 is obtained.

1.4 Driving Method

Figure 8:
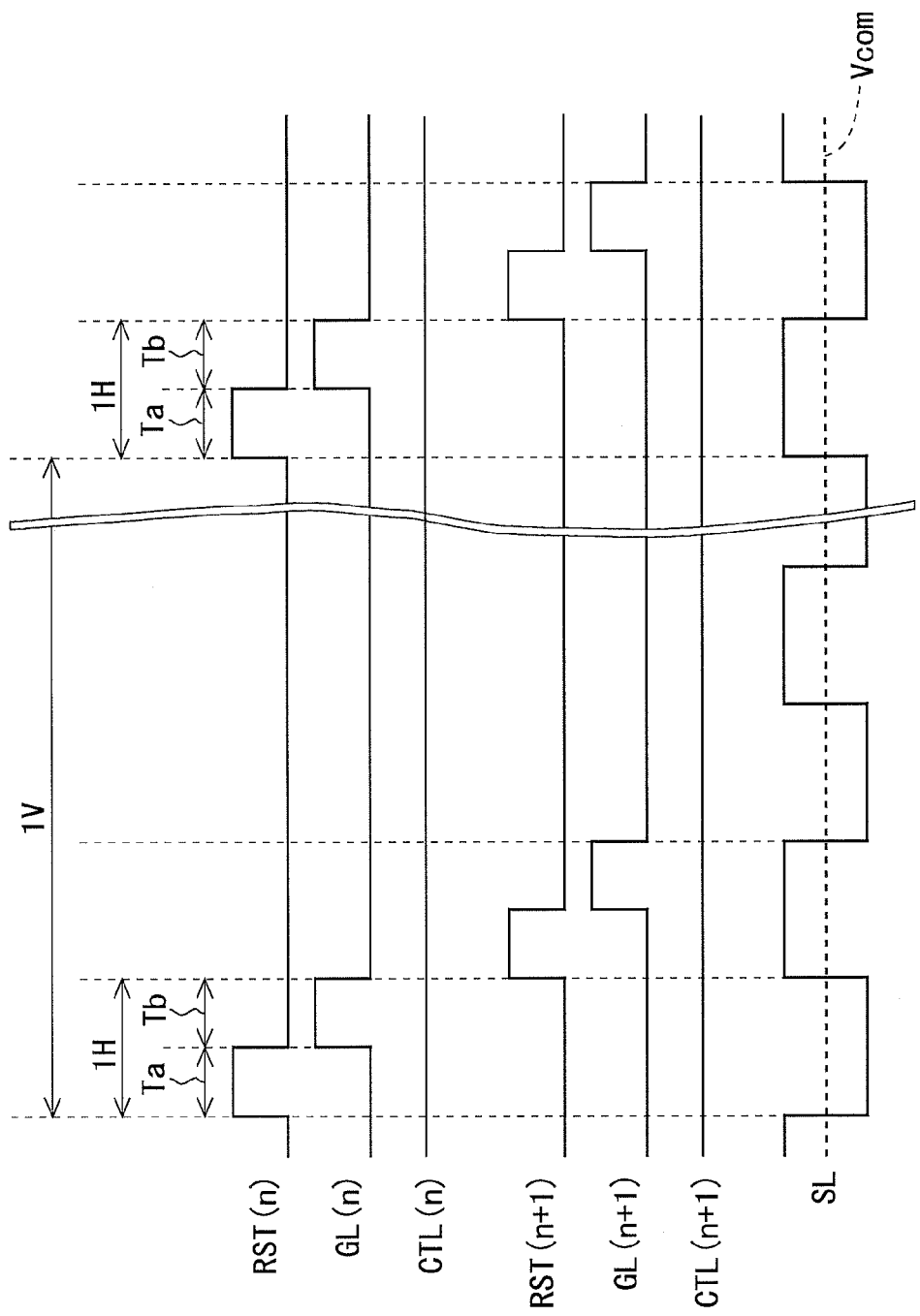
FIG. 8 is a signal waveform diagram for explaining a driving method in the first embodiment.

Next, a driving method in the present embodiment will be described. In the present embodiment, as shown in FIG. 8, a constant potential is applied to the control wire CTL through the operation of the liquid crystal display device (see also FIG. 5). That is, the direct-current drive is performed on the control wire CTL. A video signal in the positive polarity and a video signal in the negative polarity are alternately applied to the source bus line SL in each one horizontal scanning period.

Figure 9:
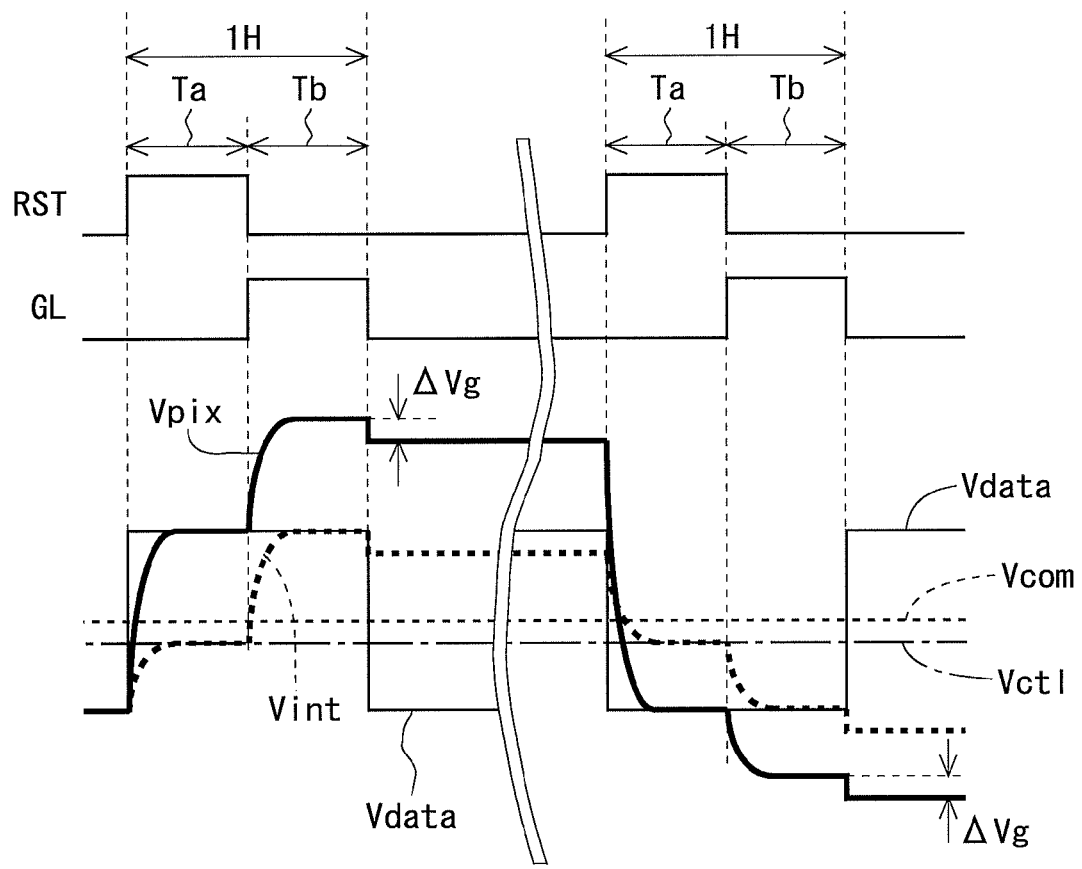
FIG. 9 is a signal waveform diagram for explaining the operation of the pixel formation portion in a selection period in the first embodiment.

FIG. 9 is a signal waveform diagram for explaining an operation of the pixel formation portion in the selection period in the present embodiment. Here, attention is focused on the pixel formation portion where writing in the positive polarity is performed in an odd-numbered frame. As described above, the selection period is configured of the precharge period Ta and the amplification period Tb. It is to be noted that, as shown in FIG. 9, the control wire potential Vctl is set to a lower value than a common electrode potential Vcom in this embodiment.

In the precharge period Ta, an ON-level potential is applied to the reset wire RST in a state where an OFF-level potential is applied to the gate bus line GL. This brings the thin-film transistor T1 into the OFF state, and brings the thin-film transistors T2, T3 into the ON state. As a result, the video signal potential Vdata is applied to the transparent electrode 11 which functions as the pixel electrode 101, and the control wire potential Vctl is applied to the electrode 12 which functions as the amplification electrode 102. In the amplification period Tb, an ON-level potential is applied to the gate bus line GL in a state where an OFF-level potential is applied to the reset wire RST. This brings the thin-film transistor T1 into the ON state, and brings the thin-film transistors T2, T3 into the OFF state. As a result, the amplification electrode potential Vint increases from Vctl to Vdata. Therewith, the pixel electrode potential Vpix increases by the magnitude V1 indicated by the above equation (1). When the amplification period Tb is completed, the pixel electrode potential Vpix decreases by ΔVg as described above. As a result, the pixel electrode potential Vpix becomes a value shown in the above equation (2).

Although the operation of the odd-numbered frame is described, a similar operation is also performed in an even-numbered frame.

Incidentally, when a median value of the video signal potentials Vdata is 0 V, the control wire potential Vctl is preferably set to a value Vctla obtained by the following equation (4). More specifically, when a median potential between the maximum potential and the minimum potential, which can be applied to the source bus line SL, is taken as a reference potential, the control wire potential Vctl is preferably set to a value obtained by adding the value Vctla, calculated by the following equation (4), to the value of the reference potential.

[Mathematical Formula 4]

$$Vctla = -\Delta Vg \cdot \frac{Ctr + Clc + Cp}{Ctr} \quad (4)$$

When the control wire potential Vctl is set to the value Vctla shown in the above equation (4), the above equation (3) is transformed as shown in the following equation (5).

[Mathematical Formula 5]

$$Vpix = \left[1 + \frac{Ctr}{Ctr + Clc + Cp}\right] \cdot Vdata \quad (5)$$

It is grasped from the above equation (5) that the value of the pixel electrode potential Vpix is not influenced by the voltage fluctuation ΔVg. Hence it is unnecessary to perform counter adjustment (perform setting of the common electrode potential Vcom in light of the voltage fluctuation ΔVg). Accordingly, when the control wire potential Vctl is set to the value shown in the above equation (4), the common electrode potential Vcom may be set to the median value (the median value between the maximum potential and the minimum potential) of the video signal potentials Vdata.

For example, when it is assumed that Ctr is extremely larger than Clc and Cp, and when the voltage fluctuation ΔVg is 0.5 V, the control wire potential Vctl may be set to −0.5 V in accordance with the above equation (4). At this time, when the video signal potential Vdata is assumed to fluctuate between −3.0 V and 3.0 V in a certain pixel formation portion, an operation in the pixel formation portion is as follows (see FIG. 10).

Figure 10:
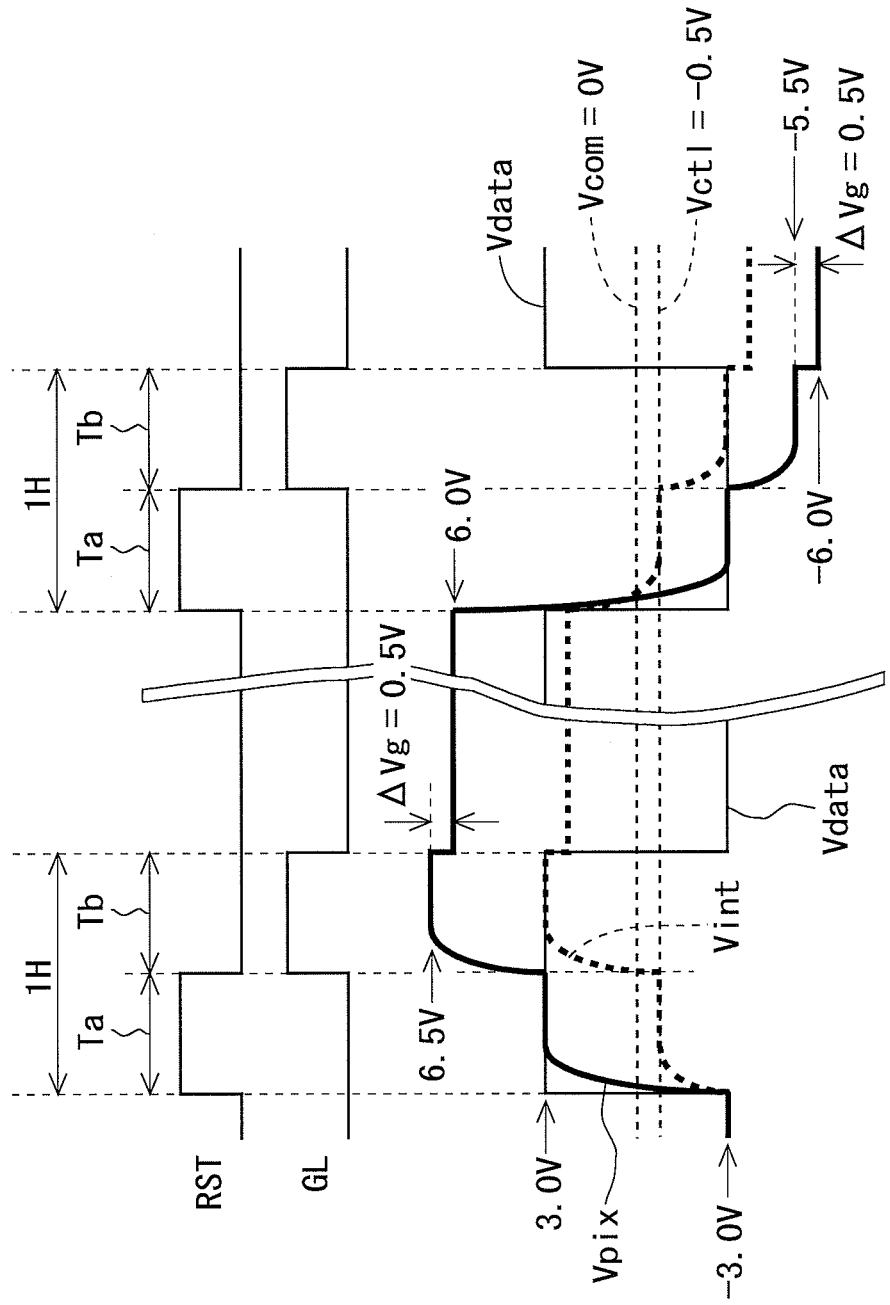
FIG. 10 is a signal waveform diagram for explaining an example of the operation in the pixel formation portion in the first embodiment.

First, in the odd-numbered frame, the pixel electrode potential Vpix is 3.0 V and the amplification electrode potential Vint is −0.5 V in the precharge period Ta. As the period shifts to the amplification period Tb, the amplification electrode potential Vint increases from −0.5 V to 3.0 V. Therewith, the pixel electrode potential Vpix increases from 3.0 V to 6.5 V. When the amplification period Tb is completed, the pixel electrode potential Vpix decreases from 6.5 V to 6.0 V due to the voltage fluctuation Avg. Subsequently, in the even-numbered frame, the pixel electrode potential Vpix is −3.0 V and the amplification electrode potential Vint is −0.5 V in the precharge period Ta. In the amplification period Tb, the amplification electrode potential Vint decreases from −0.5 V to −3.0 V. Therewith, the pixel electrode potential Vpix decreases from −3.0 V to −5.5 V. When the amplification period Tb is completed, the pixel electrode potential Vpix decreases from −5.5 V to −6.0 V due to the voltage fluctuation ΔVg. In such a manner as thus described, potentials from −6.0 V to 6.0 V are applied to the pixel electrode 101. Therefore, the common electrode potential Vcom may be set to 0 V as shown in FIG. 10. That is, the counter adjustment is unnecessary.

Figure 11:
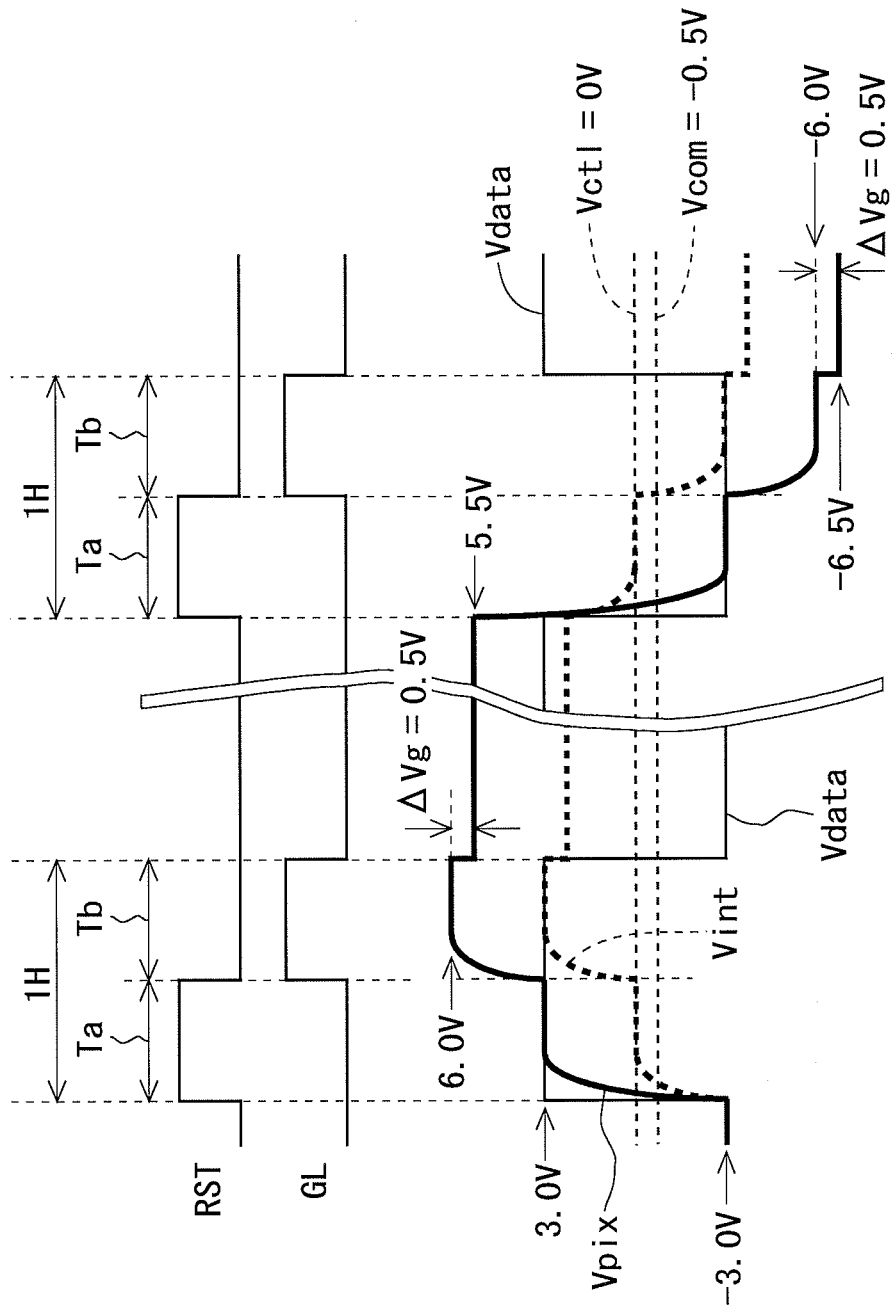
FIG. 11 is a signal waveform diagram for explaining an example of the operation in the pixel formation portion in the first embodiment.

It is to be noted that the control wire potential Vctl may be set to 0 V as shown in FIG. 11. However, in this case, it is necessary to perform the counter adjustment and to set the common electrode potential Vcom to a lower value than the median value of the video signal potentials Vdata by ΔVg.

1.5 Effects

According to the present embodiment, the pixel electrode potential Vpix is made equal to the video signal potential Vdata in the precharge period Ta, and thereafter amplified in accordance with the difference between the video signal potential Vdata and the control wire potential Vctl in the amplification period Tb. For this reason, even when the amplitude of the video signal is made smaller than the conventional case, it is possible to apply to the pixel electrode 101*a* potential similar to the conventional case. As the amplitude of the video signal can be made smaller than the conventional case, power consumption can be further reduced than the conventional case. Here in the present embodiment, potentials of the pixel electrode 101 and the common electrode COM are not directly controlled, thereby allowing amplification of the pixel electrode potential Vpix with a relatively small load. Accordingly, also in a large-sized panel, it is possible to reduce power consumption by lowering the amplitude of the video signal.

Further, according to the present embodiment, it is possible to cancel the influence of the voltage fluctuation ΔVg at the time of change in potential of the gate bus line GL from the ON-level to the OFF-level by setting the control wire potential Vctl to an appropriate value. For this reason, the counter adjustment is unnecessary. Incidentally, in the conventional liquid crystal display device, an off-level potential Voff1 of the gate bus line GL is set to a value shown in the following equation (6).

$$Voff1 = VdataL - \Delta Vg - Vm \quad (6)$$

where VdataL indicates the minimum potential of the video signal, and Vm indicates a magnitude of a margin (OFF-margin) for reliably holding the thin-film transistor in the OFF state.

As opposed to this, in the present embodiment, the influence of the voltage fluctuation ΔVg is cancelled by setting the control wire potential Vctl to an appropriate value, and hence it is possible to set an off-level potential Voff2 of the gate bus line GL to a value shown in the following equation (7).

$$Voff2 = VdataL - Vm \quad (7)$$

In such a manner as thus described, it is possible to set the off-level potential of the gate bus line GL to a value higher than in the conventional case. Hence it is possible to make the amplitude of the scanning signal smaller than the conventional case, thus enabling to reduce the power consumption required to drive the gate bus line GL, and to perform the high-speed drive.

Moreover, according to the present embodiment, the control wire CTL is arranged so as to extend parallel to the gate bus line GL. Since the number of gate bus lines GL is smaller than the number of source bus lines SL in the normal liquid crystal display device, the required number of control wires CTL becomes small as compared with the configuration in which the control wire CTL is arranged so as to extend parallel to the source bus line SL. Hence it is possible to suppress a decrease in aperture ratio due to provision of the control wire CTL.

2. Second Embodiment

2.1 Configuration

A configuration of a pixel formation portion, a whole configuration, an arrangement relationship between the pixel formation portion and each line, and a layout of the vicinity of the pixel formation portion are similar to those in the first embodiment, and therefore, descriptions thereof are omitted (see FIGS. 1, 4, 5 and 6).

2.2 Driving Method

Figure 12:
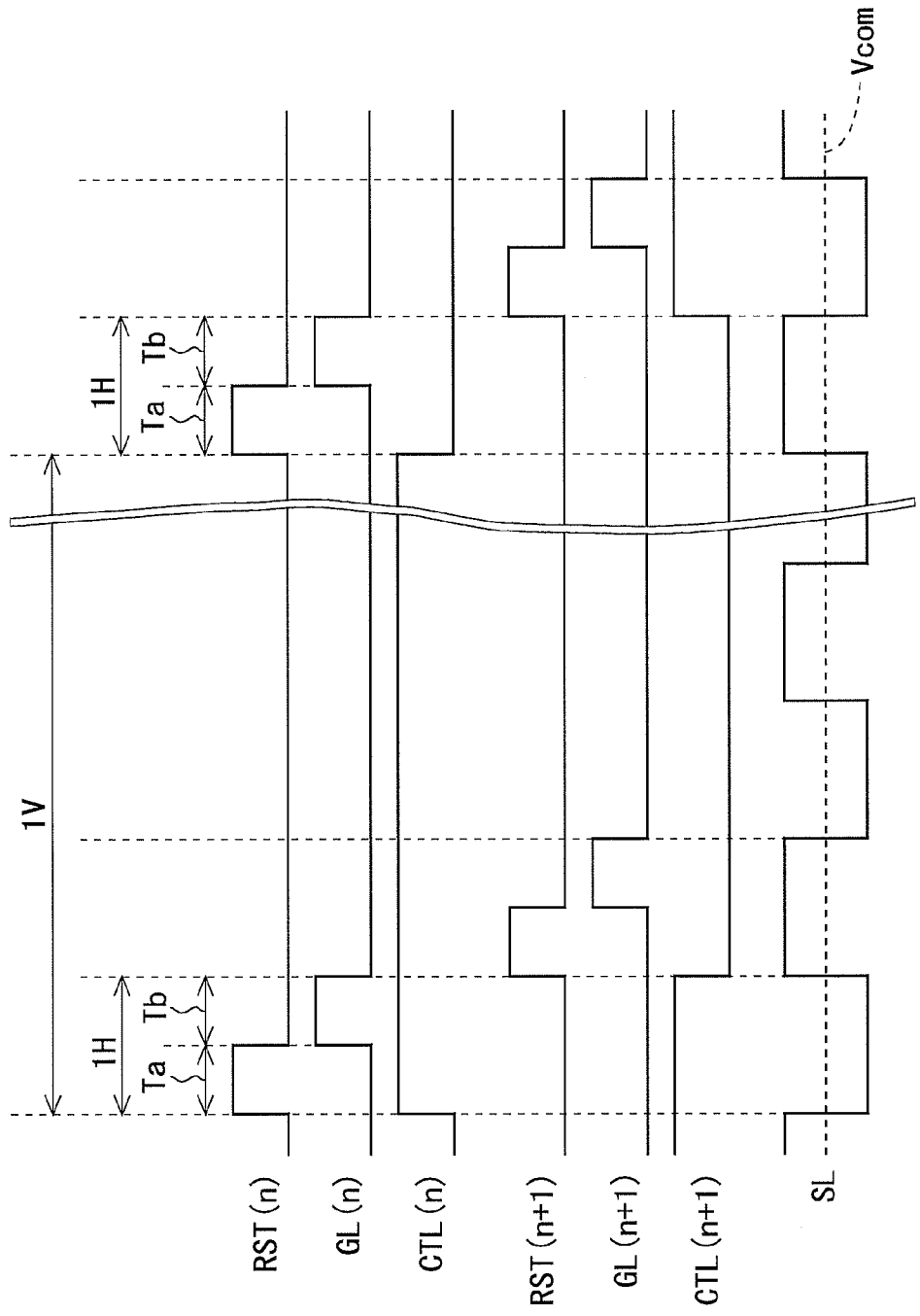
FIG. 12 is a signal waveform diagram for explaining a driving method in a second embodiment of the present invention.

In the present embodiment, as shown in FIG. 12, a constant high-level potential and a constant low-level potential are alternately applied to the control wire CTL in each one frame (one vertical scanning period). That is, the alternate-current drive is performed on the control wire CTL. A video signal in the positive polarity and a video signal in the negative polarity are alternately applied to the source bus line SL in each one horizontal scanning period. Further, at any time point, every source bus line SL is provided with a video signal of the same polarity. In this manner, as for the polarity reversal of pixels, a method called "1H line-reversal drive" is adopted.

Figure 13:
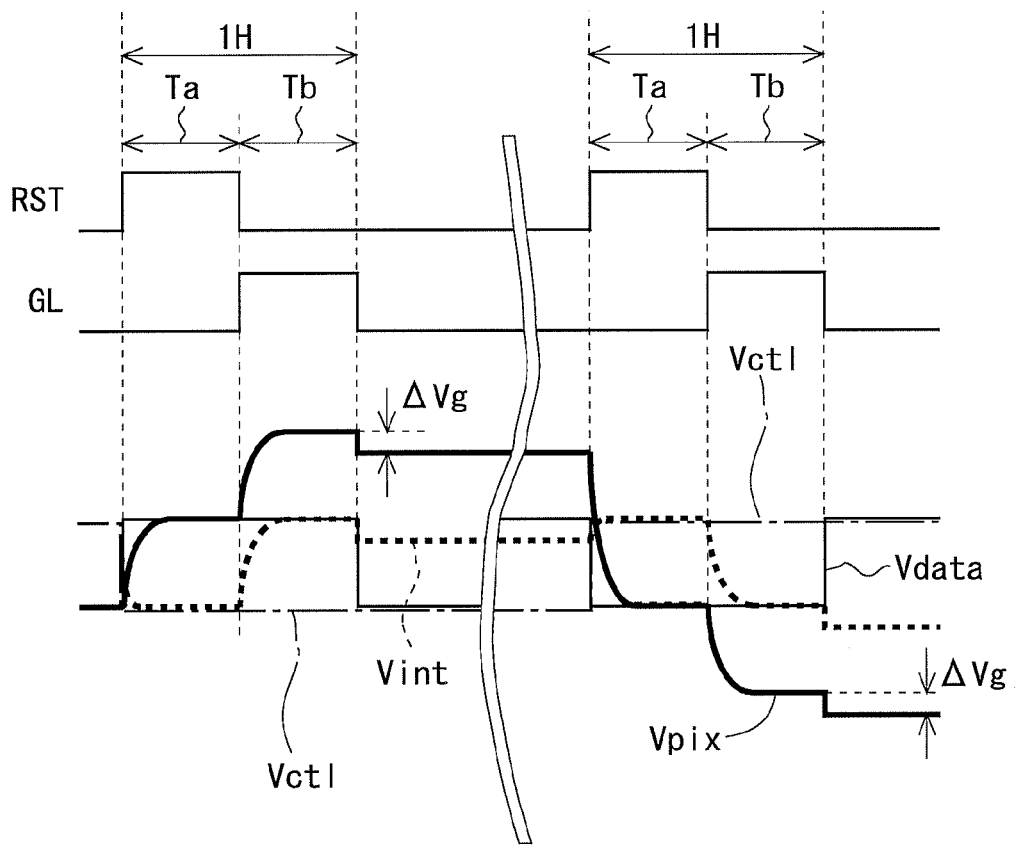
FIG. 13 is a signal waveform diagram for explaining an operation of a pixel formation portion in a selection period in the second embodiment.

FIG. 13 is a signal waveform diagram for explaining an operation of the pixel formation portion in a selection period in the present embodiment. As shown in FIG. 13, in the present embodiment, the control wire potential Vctl is made negative at the time of writing in the positive polarity (when a higher potential than the common electrode potential Vcom should be applied to the pixel electrode 101), and the control wire potential Vctl is made positive at the time of writing in the negative polarity (when a lower potential than the common electrode potential Vcom should be applied to the pixel electrode 101). The pixel electrode potential Vpix is amplified on a larger scale than in the first embodiment by alternate-current driving the control wire CTL as thus described.

The operation of the pixel formation portion in the selection period is as follows (see FIG. 14), for example in such a case where Ctr is assumed to be extremely larger than Clc and Cp, the video signal potential Vdata fluctuates between −2.0 V and 2.0 V, the control wire potential Vctl at the time of writing in the positive polarity is set to −2.0 V, the control wire potential Vctl at the time of writing in the negative polarity is set to 2.0 V, and the voltage fluctuation ΔVg is 0.5 V.

First, in the odd-numbered frame, the pixel electrode potential Vpix is 2.0 V and the amplification electrode potential Vint is −2.0 V in the precharge period Ta. In the amplification period Tb, the amplification electrode potential Vint increases from −2.0 V to 2.0 V. Therewith, the pixel electrode potential Vpix increases from 2.0 V to 6.0 V. When the amplification period Tb is completed, the pixel electrode potential Vpix decreases from 6.0 V to 5.5 V due to the voltage fluctuation Avg. Subsequently, in the even-numbered frame, the pixel electrode potential Vpix is −2.0 V and the amplification electrode potential Vint is 2.0 V in the precharge period Ta. In the amplification period Tb, the amplification electrode potential Vint decreases from 2.0 V to −2.0 V. Therewith, the pixel electrode potential Vpix decreases from −2.0 V to −6.0 V. When the amplification period Tb is completed, the pixel electrode potential Vpix decreases from −6.0 V to −6.5 V due to the voltage fluctuation ΔVg. In such a manner as thus described, the potential from −6.5 V to 5.5 V is applied to the pixel electrode 101.

In the first embodiment, in order to obtain an amplitude of 12 V as to the pixel electrode potential Vpix under certain conditions, it is necessary to set the amplitude of the video signal to 6 V (see FIGS. 10 and 11). As opposed to this, in the present embodiment, in order to obtain an amplitude of 12 V as to the pixel electrode potential Vpix under similar conditions to those in the first embodiment, the amplitude of the video signal may be set to 4 V.

Figure 14:
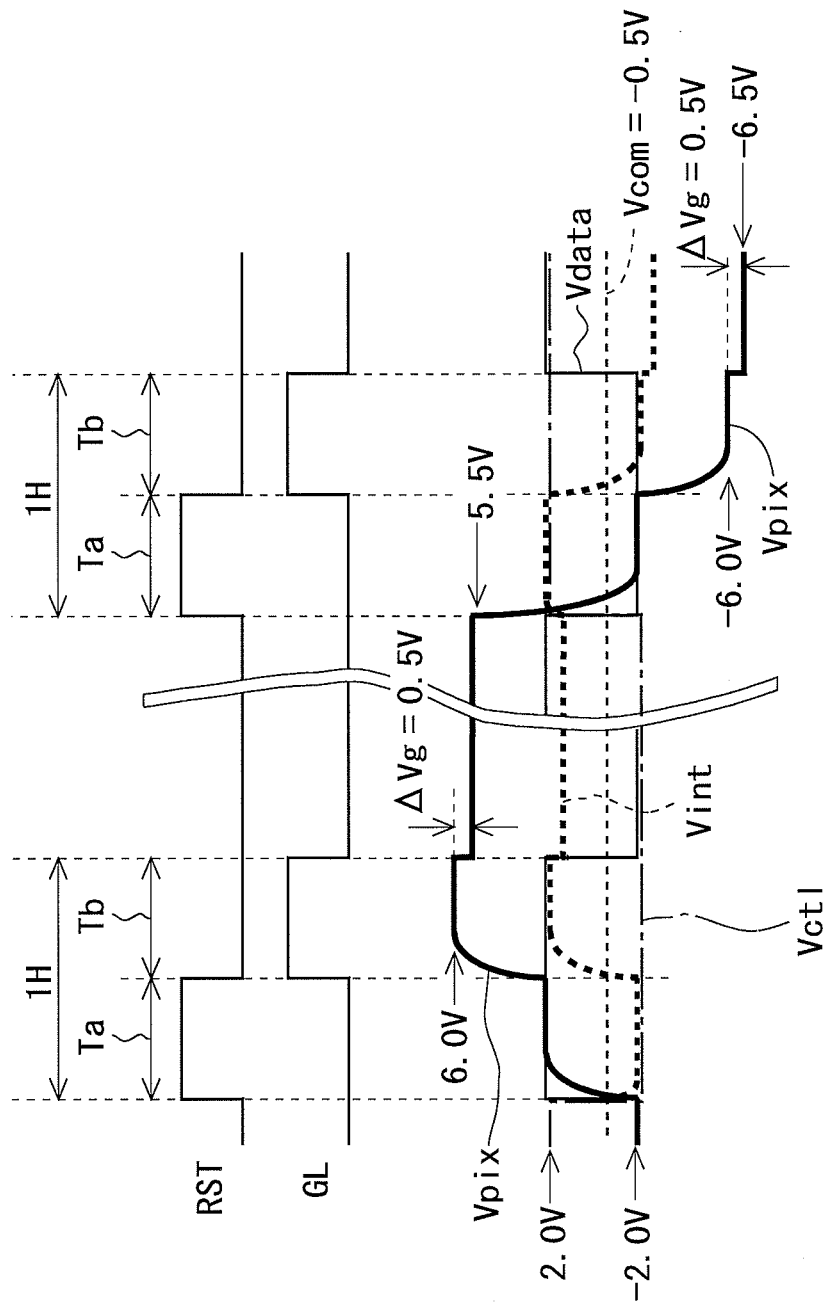
FIG. 14 is a signal waveform diagram for explaining an example of the operation of the pixel formation portion in the second embodiment.
Figure 15:
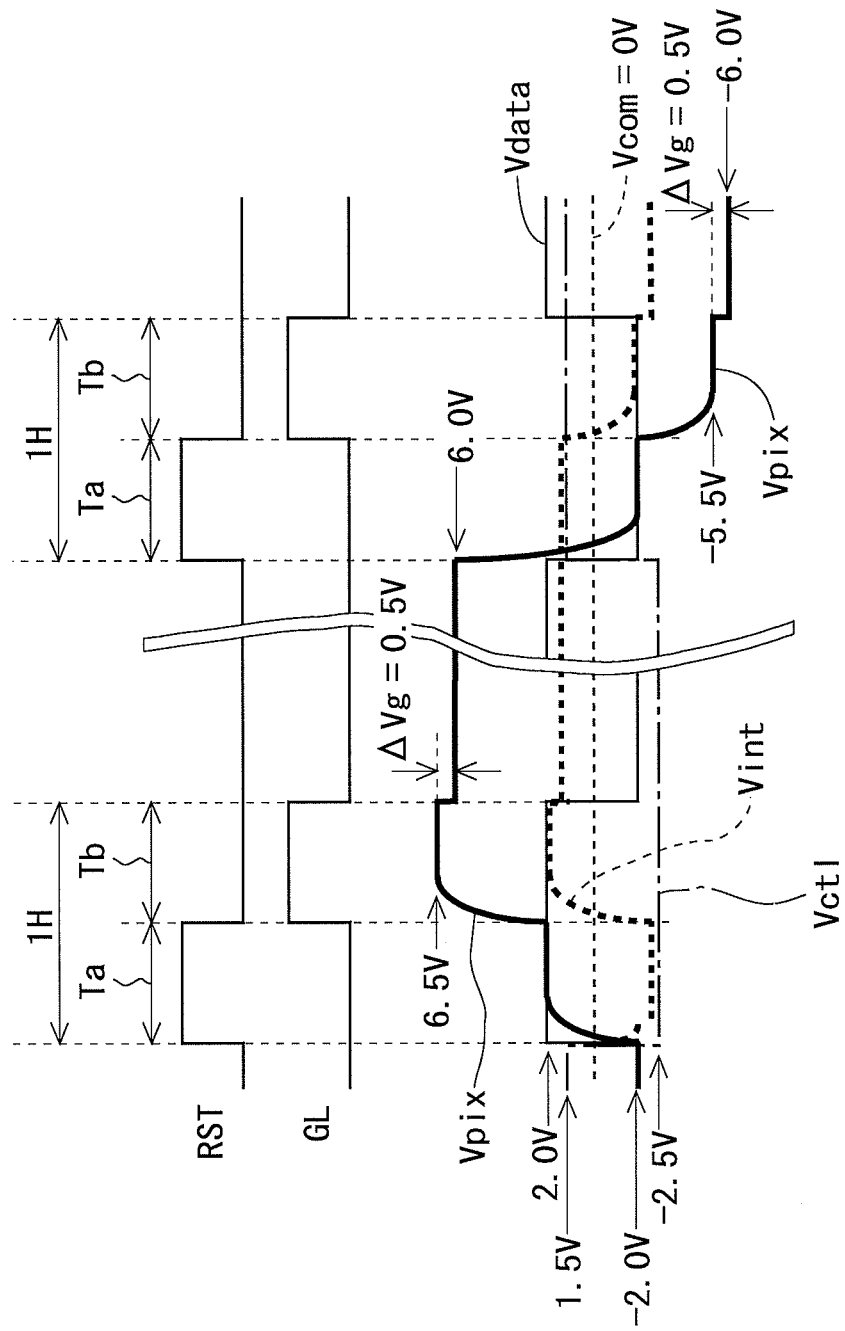
FIG. 15 is a signal waveform diagram for explaining an example of the operation of the pixel formation portion in the second embodiment.

It is to be noted that, although the common electrode potential Vcom is −0.5 V in the example shown in FIG. 14, the control wire potential Vctl at the time of writing in the positive polarity and the control wire potential Vctl at the time of writing in the negative polarity are each made lower by 0.5 V on the basis of the above equation (4), thereby making the counter adjustment unnecessary (see FIG. 15). More specifically, when a median potential between the maximum potential and the minimum potential, which can be applied to the source bus line SL, is taken as a reference potential, a potential of a value obtained by adding the value Vctla, calculated by the above equation (4), to a value of a potential higher than the reference potential by a predetermined magnitude (2.0V, here) is taken as the control wire potential Vctl at the time of writing in the negative polarity, and a potential of a value obtained by adding the value Vctla, calculated by the above equation (4), to a value of a potential lower than the reference potential by the above predetermined magnitude is taken as the control wire potential Vctl at the time of writing in the positive polarity, thereby making the counter adjustment unnecessary.

2.3 Effects

According to the present embodiment, the pixel electrode potential Vpix can be amplified on a large scale as compared with the first embodiment. For this reason, the amplitude of the video signal can be significantly made smaller than the conventional case, thus effectively reducing the power consumption. Here, as in the first embodiment, the potentials of the pixel electrode 101 and the common electrode COM are not directly controlled, thereby allowing amplification of the pixel electrode potential Vpix on a larger scale with a relatively small load. Accordingly, also in a large-sized panel, it is possible to reduce power consumption effectively by lowering an amplitude of a video signal significantly.

Further, it is possible to cancel the influence of the voltage fluctuation ΔVg at the time of change in potential of the gate bus line GL from the ON-level to the OFF-level by setting the control wire potential Vctl at the time of writing in the positive polarity and the control wire potential Vctl at the time of writing in the negative polarity respectively to appropriate values. This makes the counter adjustment unnecessary, and can reduce the power consumption by making the amplitude of the scanning signal smaller than the conventional case and perform the high-speed drive. Moreover, since the control wire CTL is arranged so as to extend parallel to the gate bus line GL, it is possible to suppress a decrease in aperture ratio due to provision of the control wire CTL, as in the first embodiment.

3. Modified Example

Hereinafter, modified examples of each of the above embodiments will be described from three viewpoints: the layout of the vicinity of the pixel formation portion, the method for the polarity reversal of pixels, and the configuration of the pixel formation portion. It is to be noted that in the following, different points from the first embodiment or the second embodiment will be primarily described.

3.1 Layout of Vicinity of Pixel Formation Portion

3.1.1 First Modified Example

Figure 16:
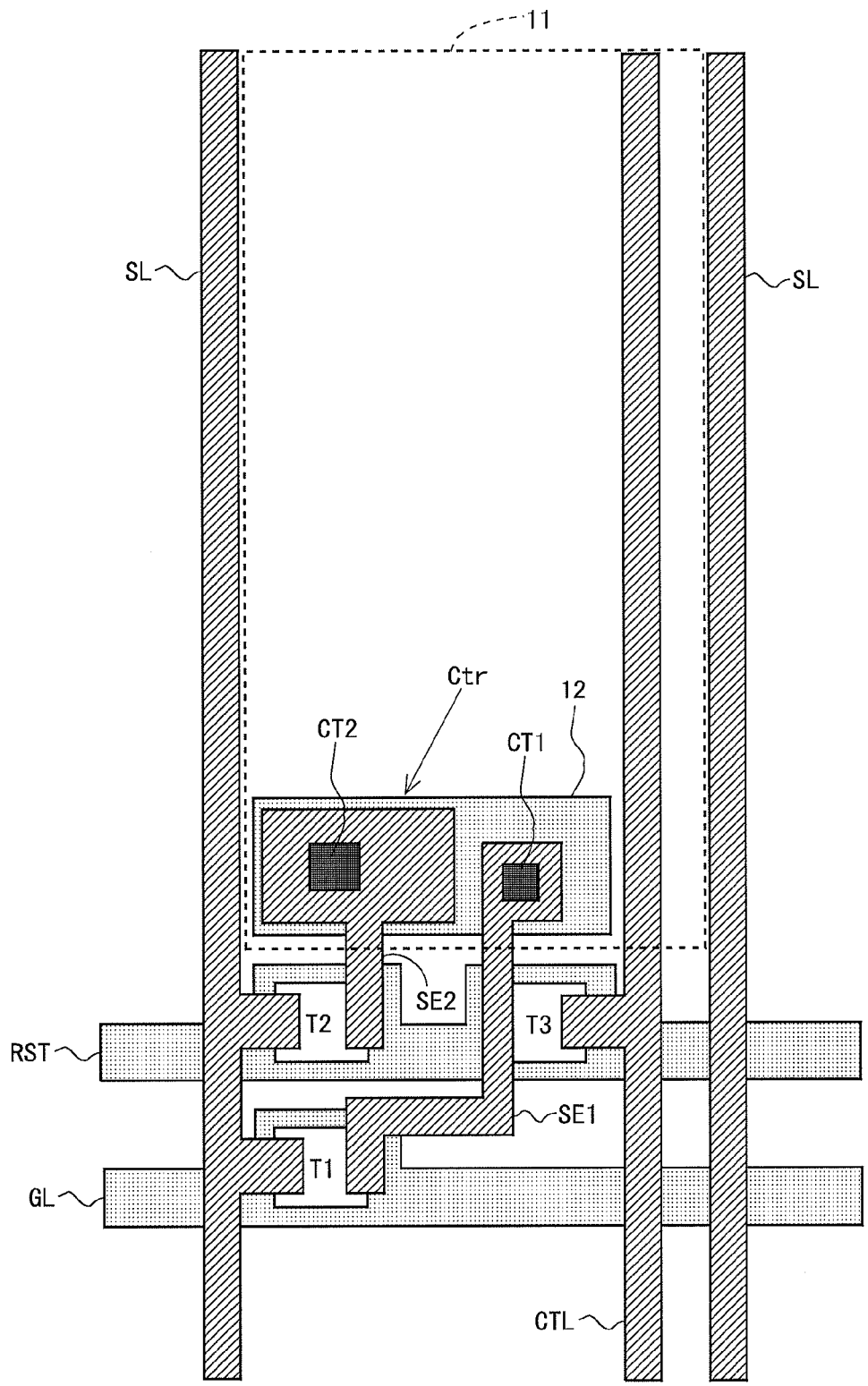
FIG. 16 is a view showing a layout of the vicinity of a pixel formation portion in a first modified example.

FIG. 16 is a view showing a layout of the vicinity of a pixel formation portion in a first modified example. The control wire CTL is arranged so as to extend parallel to the gate bus line GL in each of the above embodiments (see FIG. 6), but in the present modified example, the control wire CTL is arranged so as to extend parallel to the source bus line SL. Accordingly, the control wire CTL intersects with the gate bus line GL in the present modified example. For this reason, the control wire CTL is not formed by the gate metal but formed by the source metal. In the present modified example, the arrangement relationship between the pixel formation portion and each line is, for example, one as shown in FIG. 17.

Figure 17:
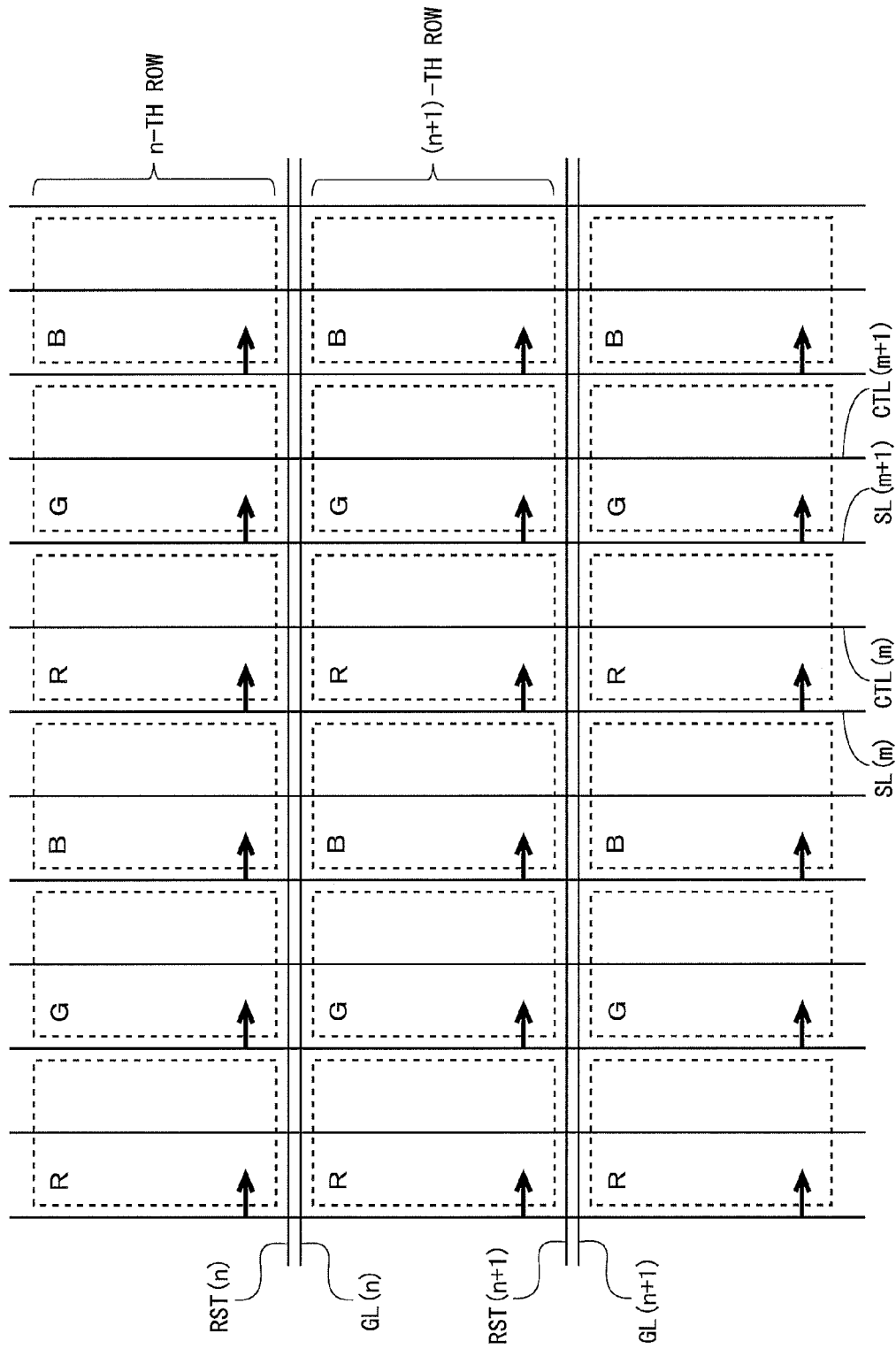
FIG. 17 is a view showing an arrangement relationship between the pixel formation portion and each line in the first modified example.
Figure 18:
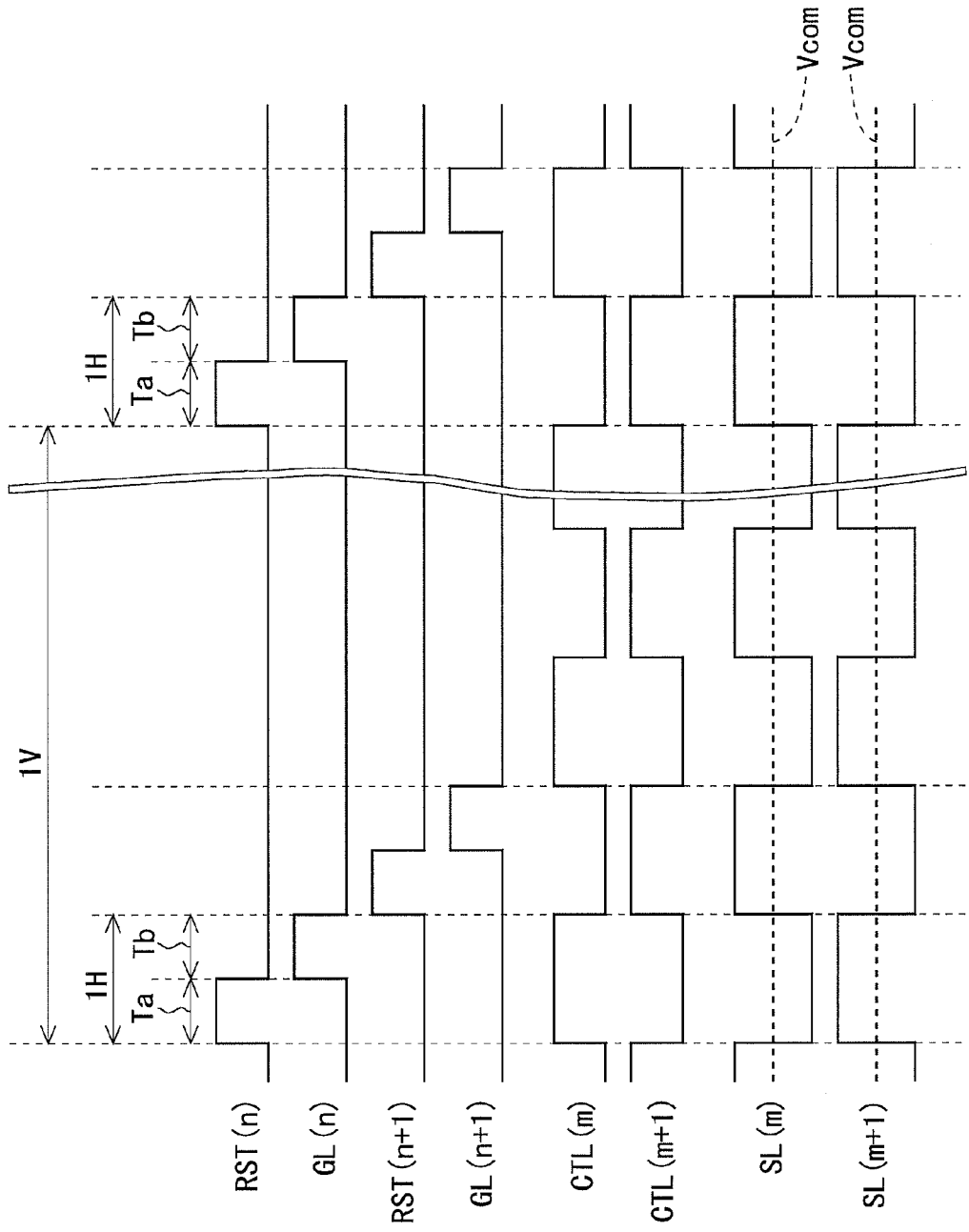
FIG. 18 is a signal waveform diagram for explaining a driving method in the first modified example.

FIG. 18 is a signal waveform diagram for explaining a driving method in the present modified example (see also FIG. 17). As in each of the above embodiments, a video signal in the positive polarity and a video signal in the negative polarity are alternately applied to the source bus line in each one horizontal scanning period (see FIG. 8). However, in the present modified example, two adjacent source bus lines (e.g., SL(m) and SL(m+1)) are provided with video signals with different polarities from each other. A constant high-level potential and a constant low-level potential are alternately applied to the control wire in each one horizontal scanning period. That is, the alternate-current drive is performed on the control wire. Further, potentials on different levels from each other are applied to two adjacent control wires (e.g., CTL(m) and CTL(m+1)). Focusing attention on the relationship between the video signal potential and the control wire potential, a low-level potential is applied to the control wire corresponding to a certain source bus line when a video signal in the positive polarity is being provided to the source bus line. On the other hand, a high-level potential is applied to the control wire corresponding to a certain source bus line when a video signal in the negative polarity is being provided to the source bus line. As described above, in the present modified example, a method called "dot-reversal drive" is adopted as to the polarity reversal of pixels.

In each of the above embodiments, the same number of thin-film transistors T3 as the number of source bus lines SL are connected to the respective control wires CTL, and the precharge potentials are applied at the same timing from the control wire CTL to all the thin-film transistors T3 which are connected to one control wire CTL. As opposed to this, in the present modified example, the precharge potentials are not applied at the same timing from one control wire CTL to a plurality of thin-film transistor T3. Hence, according to the present modified example, it is possible to lower the load applied to one control wire CTL when precharge is performed.

3.1.2 Second Modified Example

Figure 19:
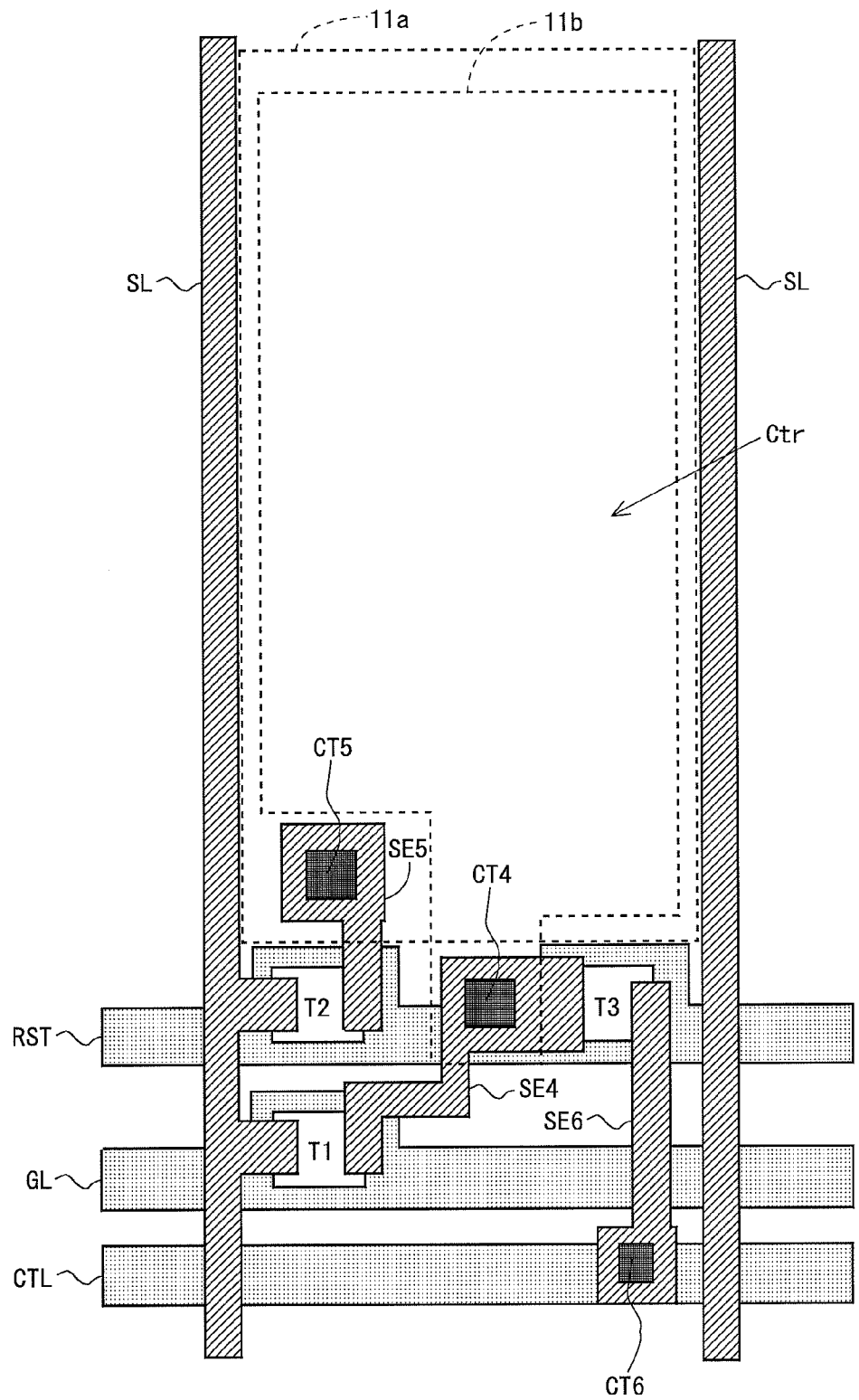
FIG. 19 is a view showing a layout of the vicinity of a pixel formation portion in a second modified example.

FIG. 19 is a view showing a layout of the vicinity of a pixel formation portion in a second modified example. The transparent electrode is formed of one layer in each of the above embodiments (see FIG. 6), but the transparent electrode is formed of two layers in the present modified example. More specifically, an upper-layer transparent electrode (first transparent electrode) 11a which functions as the pixel electrode 101 and a lower-layer transparent electrode (second transparent electrode) 11b which functions as the amplification electrode (capacitor forming electrode portion) 102 are provided in a portion other than regions arranged with the reset wire RST, the gate bus line GL and the control wire CTL among regions between the two adjacent source bus lines SL, and the second-capacitor Ctr is formed by the upper-layer transparent electrode 11a and the lower-layer transparent electrode 11b.

The drain electrode of the thin-film transistor T1 and the lower-layer transparent electrode 11b are electrically connected to each other by a source metal denoted by reference character SE4 and a contact CT4. The drain electrode of the thin-film transistor T2 and the upper-layer transparent electrode 11a are electrically connected to each other by a source metal denoted by reference character SE5 and a contact CT5. The source electrode of the thin-film transistor T3 and the control wire CTL are electrically connected to each other by a source metal denoted by reference character SE6 and a contact CT6. The drain electrode of the thin-film transistor T3 and the lower-layer transparent electrode 11b are electrically connected to each other by the source metal denoted by reference character SE4 and the contact CT4.

According to the present modified example, the second-capacitor Ctr is formed by the two-layer transparent electrode (upper-layer transparent electrode 11a and lower-layer transparent electrode 11b) provided in the relatively wide region among the regions between the two adjacent source bus lines SL. For this reason, a capacitance value of the second-capacitor Ctr is large as compared with each of the above embodiments. Incidentally, as described above, the magnitude V1 of the increase in pixel electrode potential Vpix in the amplification period Tb is expressed by the above equation (1). It is grasped from the above equation (1) that the larger the Ctr, the larger the V1 becomes. As thus described, according to the present modified example, the pixel electrode potential Vpix is amplified on a larger scale in the amplification period Tb. For this reason, as the amplitude of the video signal can be significantly made small, the power consumption can be reduced effectively. Moreover, since the control wire CTL is arranged so as to extend parallel to the gate bus line GL, it is possible to suppress a decrease in aperture ratio due to provision of the control wire CTL, as in each of the above embodiments.

3.1.3 Third Modified Example

Figure 20:
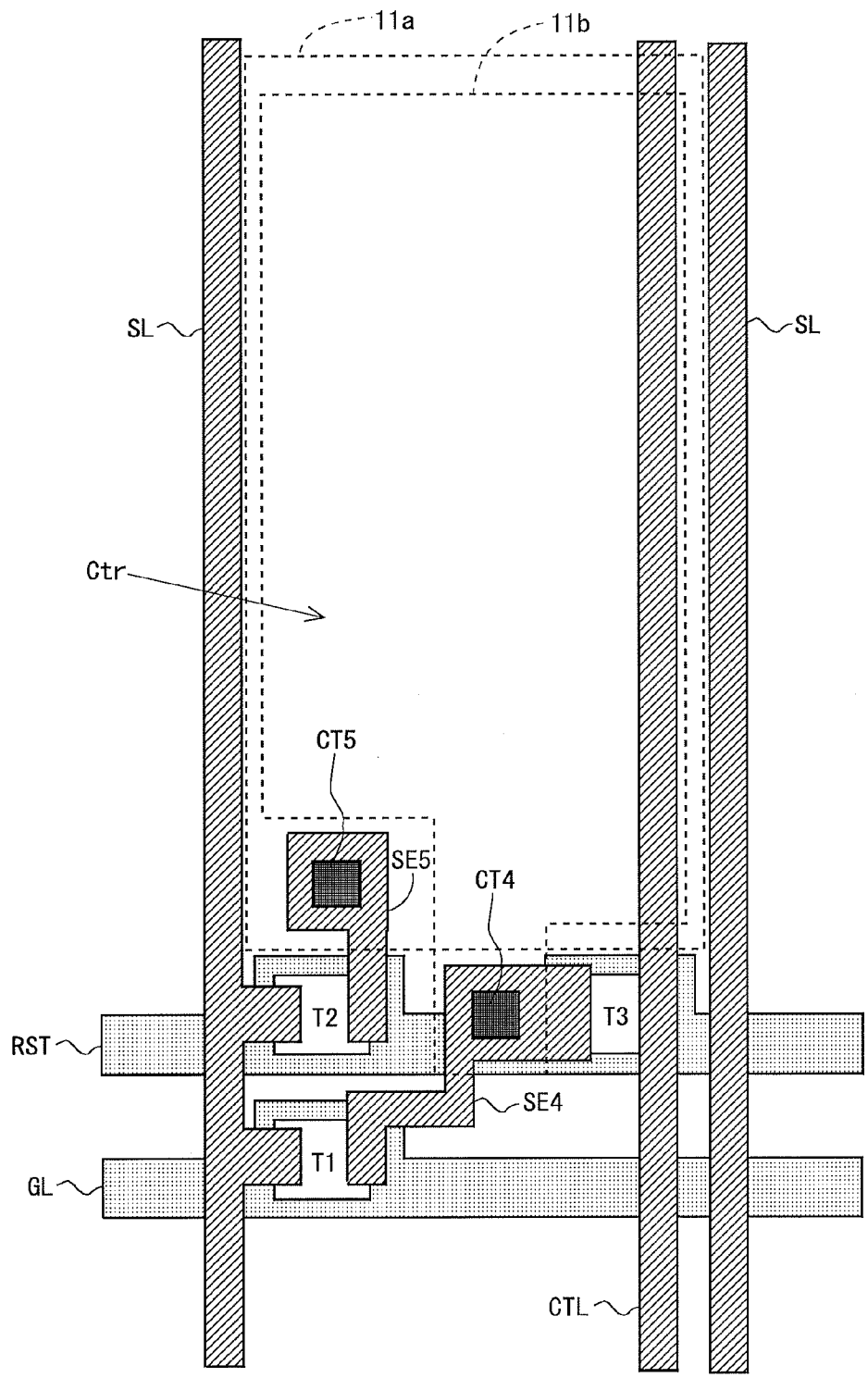
FIG. 20 is a view showing a layout of the vicinity of a pixel formation portion in a third modified example.

FIG. 20 is a view showing a layout of the vicinity of a pixel formation portion in a third modified example. The control wire CTL is arranged so as to extend parallel to the source bus line SL as in the first modified example. Further, the transparent electrode is formed of two layers as in the second modified example. It is to be noted that the source electrode of the thin-film transistor T3 and the control wire CTL are directly connected to each other as shown in FIG. 20. In such a configuration as above, as in the first modified example, the precharge potentials are not applied at the same timing from one control wire CTL to a plurality of thin-film transistor T3, and hence it is possible to lower the load applied to one control wire CTL when precharge is performed. Further, as in the second modified example, the pixel electrode potential Vpix is amplified on a larger scale in the amplification period Tb since the capacitance value of the second-capacitor Ctr becomes large. For this reason, as the amplitude of the video signal can be significantly made small, the power consumption can be reduced effectively.

3.1.4 Fourth Modified Example

Figure 21:
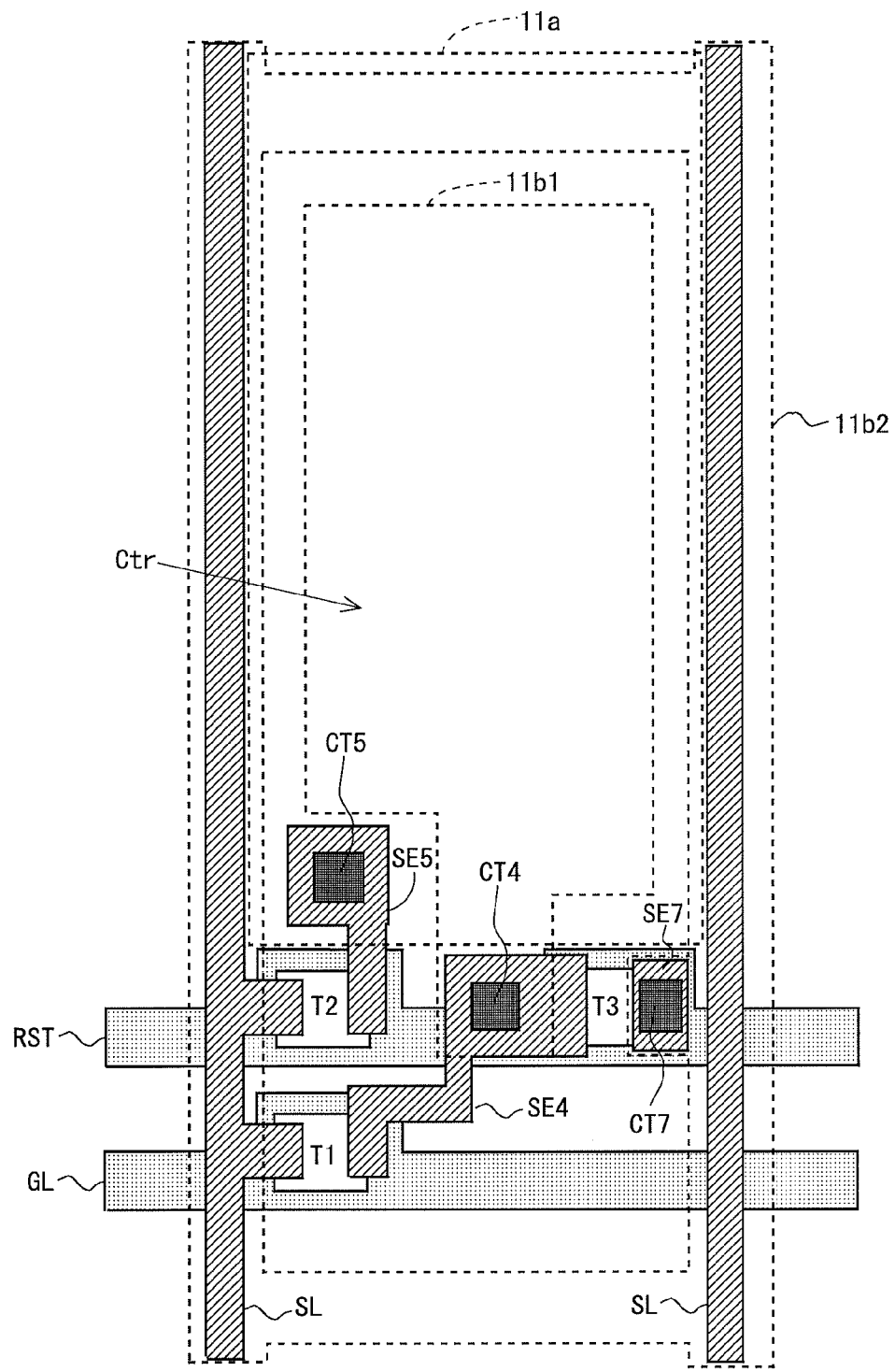
FIG. 21 is a view showing a layout of the vicinity of a pixel formation portion in a fourth modified example.
Figure 22:
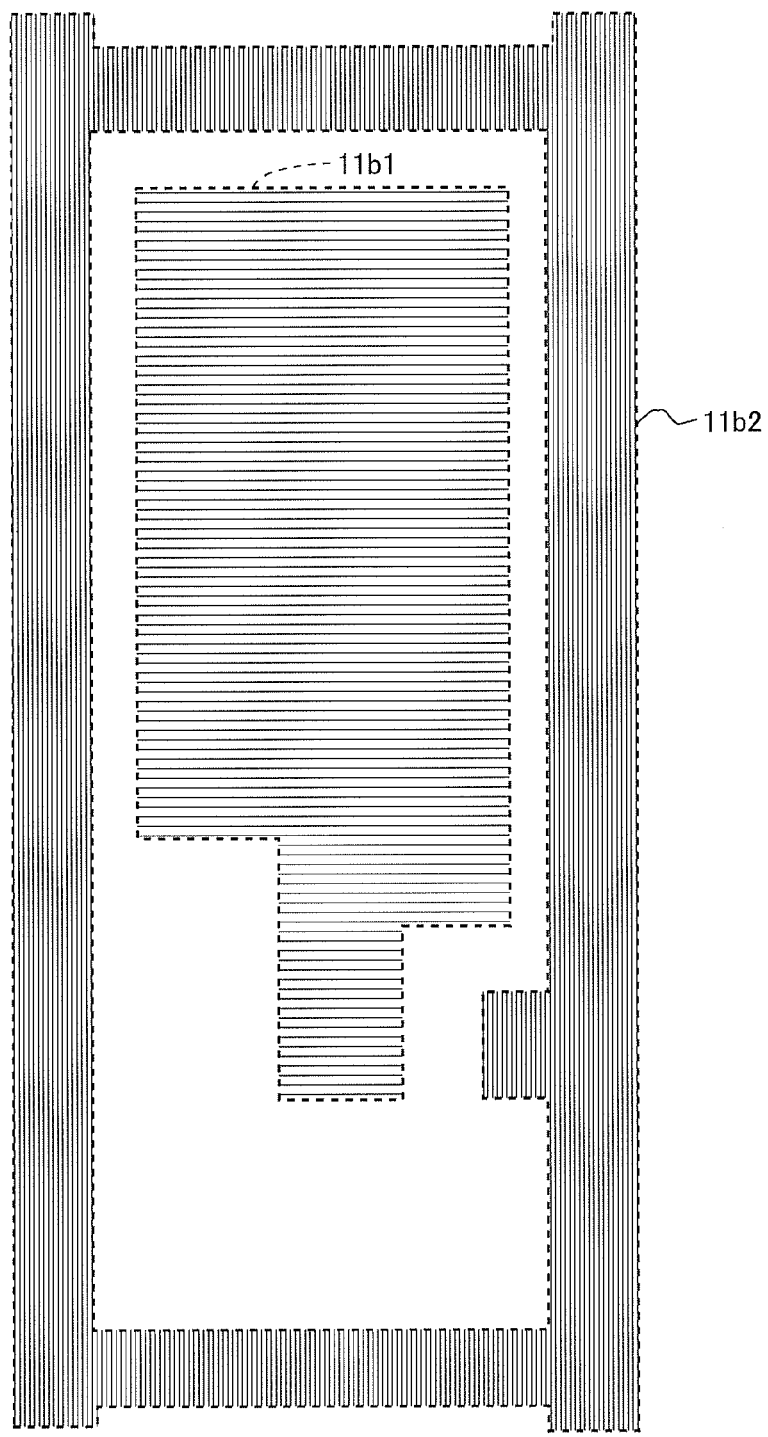
FIG. 22 is a diagram for explaining a configuration of a lower-layer transparent electrode in the fourth modified example.
Figure 23:
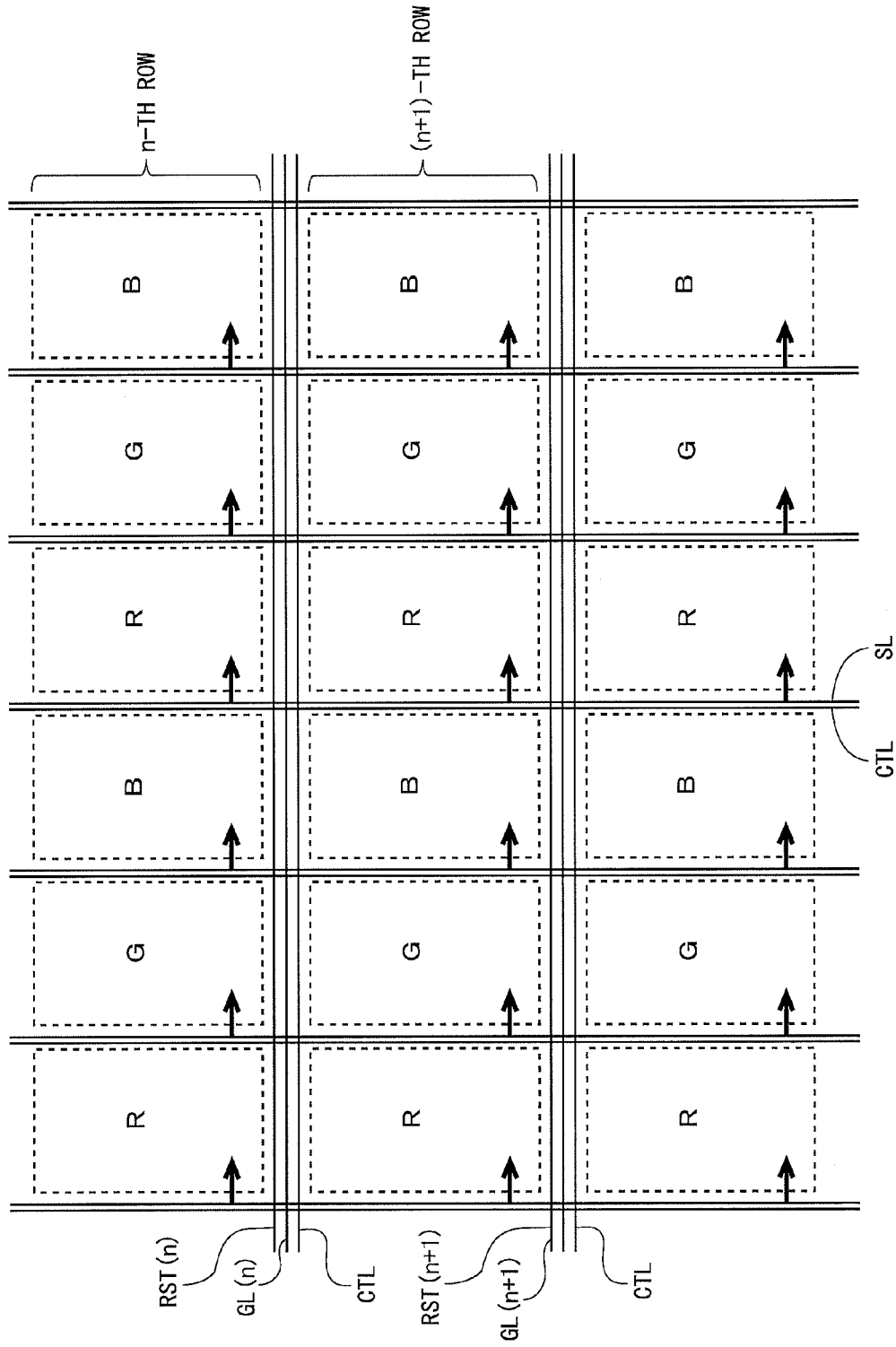
FIG. 23 is a view showing an arrangement relationship between a pixel formation portion and each line in the fourth modified example.

FIG. 21 is a view showing a layout of the vicinity of a pixel formation portion in a fourth modified example. In the present modified example, the lower-layer transparent electrode is separated into two portions as shown in FIG. 22. One lower-layer transparent electrode 11b1 functions as the amplification electrode 102, and the other lower-layer transparent electrode 11b2 functions as the control wire CTL. By using the lower-layer transparent electrode 11b2 in such a shape as shown in FIG. 22 as the control wire CTL, the control wire CTL is provided in a lattice form inside the display portion 100 in the present modified example. The source electrode of the thin-film transistor T3 and the control wire CTL are electrically connected to each other by a source metal denoted by reference character SE7 and a contact CT7. It is to be noted that, in the present modified example, the arrangement relationship between the pixel formation portion and each line is, for example, one as shown in FIG. 23. Moreover in the present modified example, a capacitor forming electrode portion is realized by the lower-layer transparent electrode 11b1, and a lattice-form electrode portion is realized by the lower-layer transparent electrode 11b2.

Figure 24:
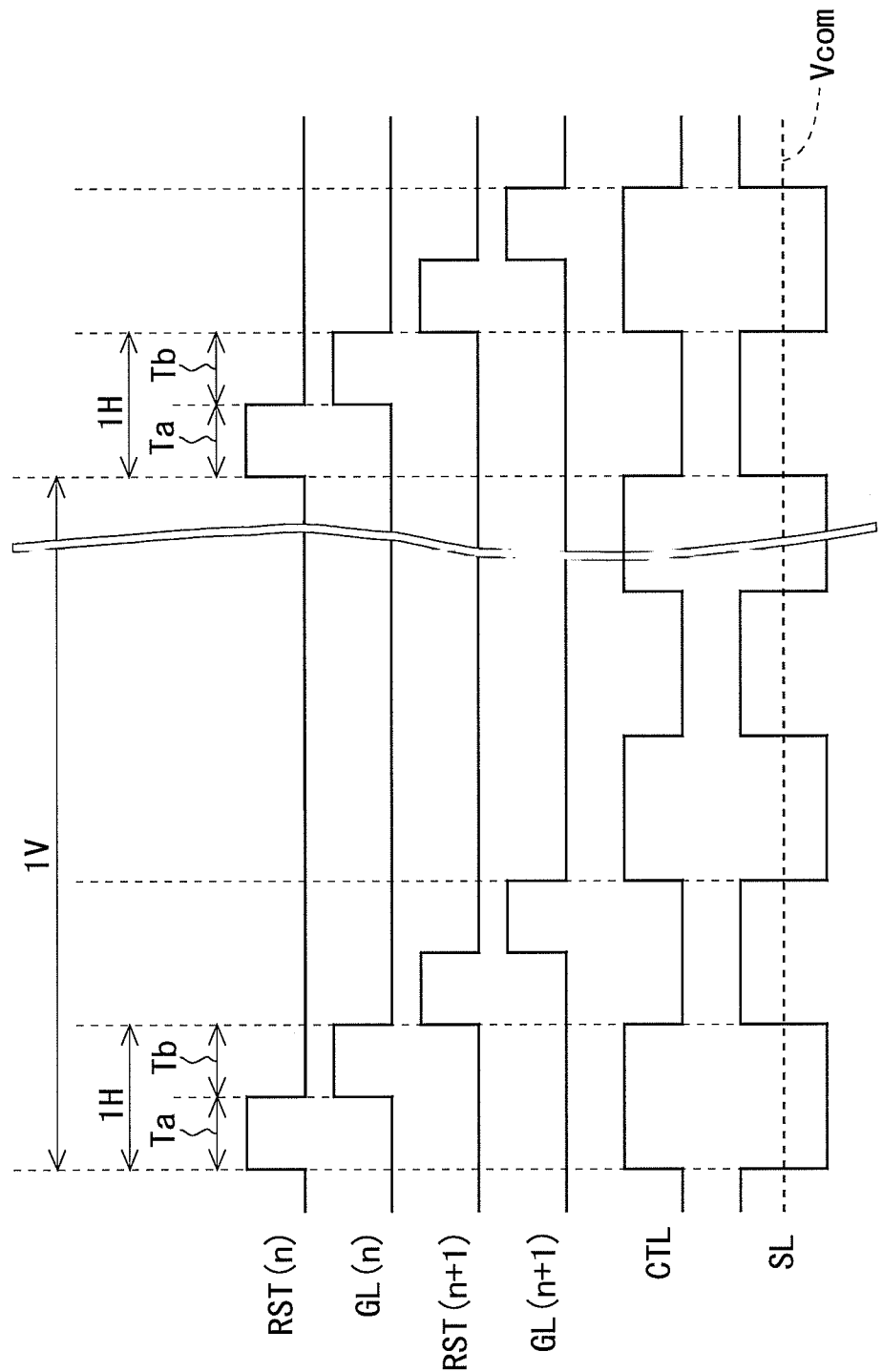
FIG. 24 is a signal waveform diagram for explaining a driving method in the fourth modified example.

FIG. 24 is a signal waveform diagram for explaining a driving method in the present modified example (see also FIG. 23). A video signal in the positive polarity and a video signal in the negative polarity are alternately applied to the source bus line SL in each one horizontal scanning period. A constant high-level potential and a constant low-level potential are alternately applied to the control wire CTL in each one horizontal scanning period. That is, the alternate-current drive is performed on the control wire CTL. Focusing attention on the relationship between the video signal potential and the control wire potential, a low-level potential is applied to the control wire CTL when a video signal in the positive polarity is being provided to the source bus line SL, and a high-level potential is applied to the control wire CTL when a video signal in the negative polarity is being provided to the source bus line SL. As described above, in the present modified example, the method called "1H line-reversal drive" is adopted as to the polarity reversal of pixels.

According to the present modified example, as in the second modified example, the pixel electrode potential Vpix is amplified on a larger scale in the amplification period Tb since the capacitance value of the second-capacitor Ctr becomes large. For this reason, as the amplitude of the video signal can be significantly made small, the power consumption can be reduced effectively. Further, the control wire CTL is formed by the transparent electrode. This allows improvement in aperture ratio. Moreover, the resistance of the control wire CTL becomes small since the control wire CTL is provided in the lattice form inside the display portion 100. It is to be noted that, although the description is given taking the example of alternate-current driving the control wire CTL, the control wire CTL may be direct-current driven as shown in FIG. 8.

3.1.5 Fifth Modified Example

Fifth and sixth modified examples described herein after are applied to a liquid crystal display device (herein after referred to as "orientation-division type liquid crystal display device") provided with pixels each constituted by a plurality of regions in which orientational states of liquid crystal (inclined direction of liquid crystal molecules) are different from each other. It is to be noted that the fifth modified example will be described while compared with the second modified example (see FIG. 19), and the sixth modified example will be described while compared with the third modified example (see FIG. 20).

Figure 25:
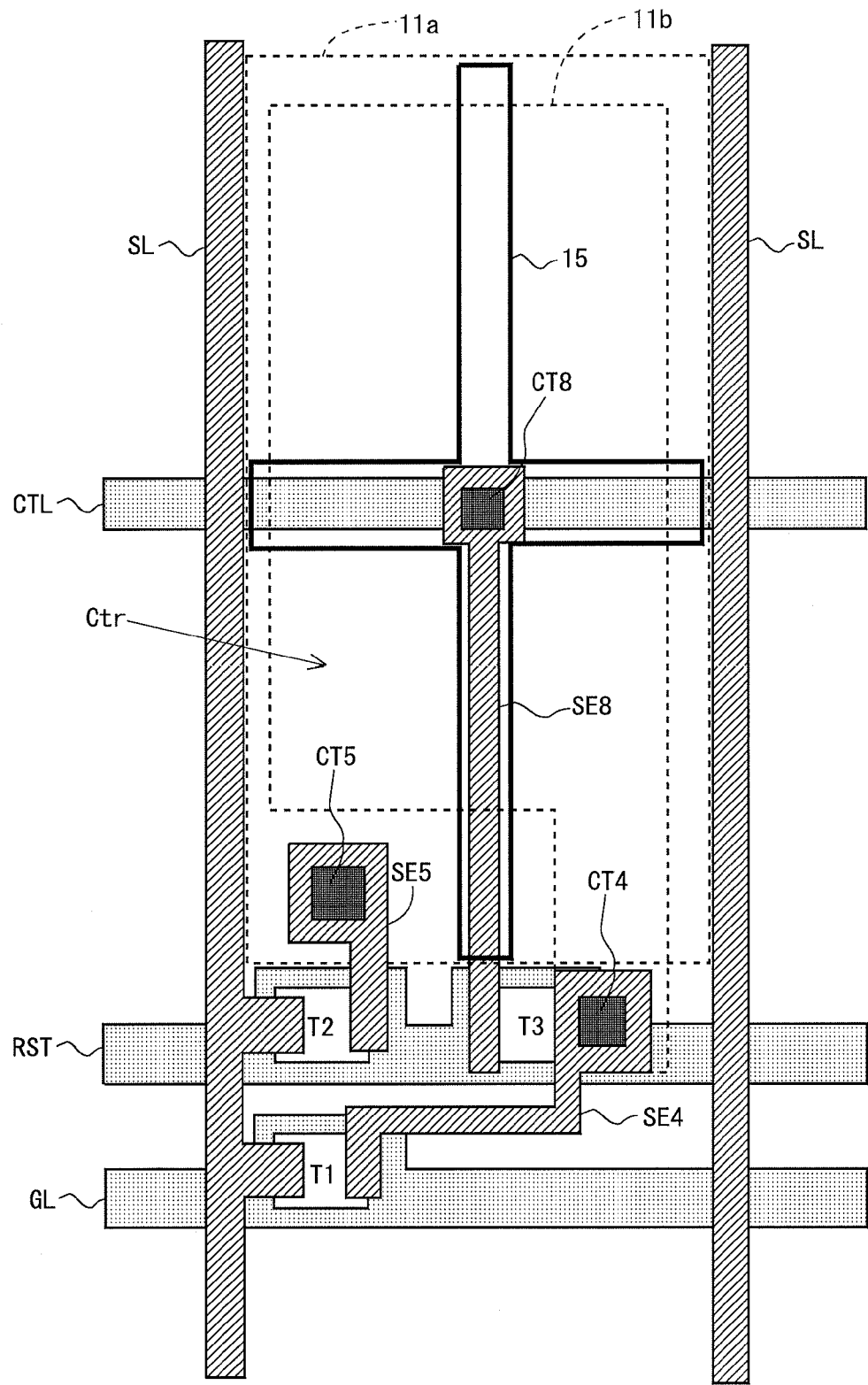
FIG. 25 is a view showing a layout of the vicinity of a pixel formation portion in a fifth modified example.

FIG. 25 is a view showing a layout of the vicinity of a pixel formation portion in the fifth modified example. In the second modified example, the control wire CTL is arranged so as not to overlap the transparent electrode in a vertical direction. As opposed to this, in the present modified example, the control wire CTL is arranged so as to overlap the transparent electrode in the vertical direction. More specifically, while a dark line 15 is generated in a boundary portion of the regions inside the display portion 100 in the orientation-division type liquid crystal display device, the control wire CTL is formed by the gate metal so as to overlap the dark line 15 which are generated so as to extend in parallel with the gate bus line GL. In such a configuration, the source electrode of the thin-film transistor T3 and the control wire CTL are electrically connected to each other by a source metal denoted by reference character SE8 and a contact CT8.

According to the present modified example, in the orientation-division type liquid crystal display device, the control wire CTL is formed so as to overlap the dark line 15, thus leading to effective suppression of a decrease in aperture ratio due to provision of the control wire CTL. It is to be noted that, even when the transparent electrode is configured of one layer as in each of the above embodiments, it is possible to form the control wire CTL so as to overlap the dark line 15 which are generated so as to extend in parallel with the gate bus line GL.

3.1.6 Sixth Modified Example

Figure 26:
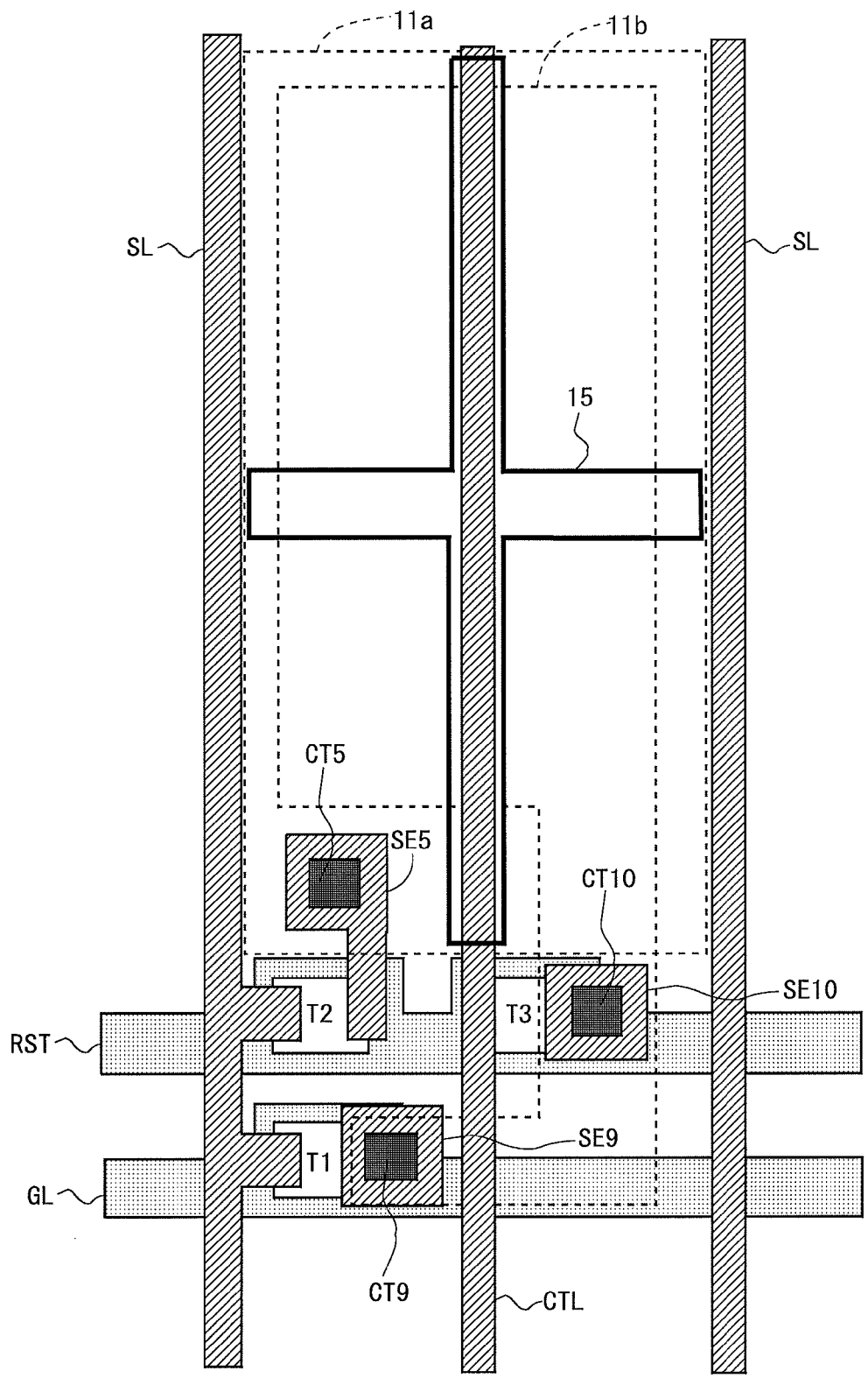
FIG. 26 is a view showing a layout of the vicinity of a pixel formation portion in a sixth modified example.

FIG. 26 is a view showing a layout of the vicinity of a pixel formation portion in a sixth modified example. In the third modified example, the control wire CTL is arranged so as to overlap the end of the lower-layer transparent electrode 11b in the vertical direction. As opposed to this, in the present modified example, the control wire CTL is arranged so as to overlap a central portion of the lower-layer transparent electrode 11b in the vertical direction. More specifically, the control wire CTL is formed by the source metal so as to overlap the dark line 15 which are generated so as to extend in parallel with the source bus line SL. In such a configuration, the drain electrode of the thin-film transistor T1 and the lower-layer transparent electrode 11b are electrically connected to each other by a source metal denoted by reference character SE9 and a contact CT9. The drain electrode of the thin-film transistor T3 and the lower-layer transparent electrode 11b are electrically connected to each other by a source metal denoted by reference character SE10 and a contact CT10.

According to the present modified example, as in the fifth modified example, in the orientation-division type liquid crystal display device, the control wire CTL is formed so as to overlap the dark line 15, thus leading to effective suppression of a decrease in aperture ratio due to provision of the control wire CTL. It is to be noted that, even when the transparent electrode is configured of one layer as in each of the above embodiments, it is possible to form the control wire CTL so as to overlap the dark line 15 which are generated so as to extend in parallel with the source bus line SL.

3.1.7 Seventh Modified Example

Figure 27:
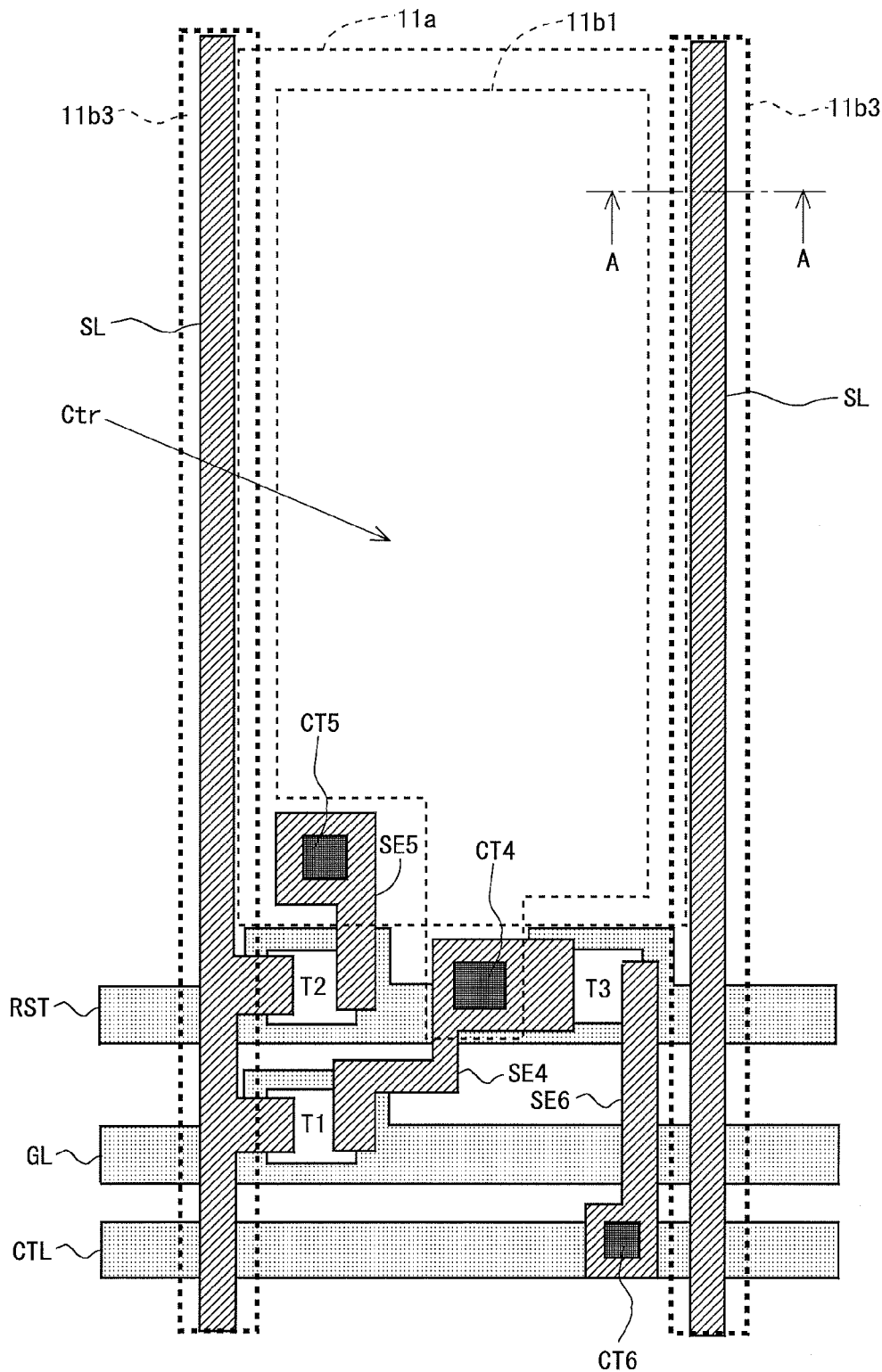
FIG. 27 is a view showing a layout of the vicinity of a pixel formation portion in a seventh modified example.

FIG. 27 is a view showing a layout of the vicinity of a pixel formation portion in a seventh modified example. In the present modified example, the lower-layer transparent electrode is separated into a portion 11b1 that functions as the amplification electrode 102, and a portion (herein after referred to as "shield electrode portion") 11b3 for reducing a parasitic capacitor formed between the transparent electrode (upper-layer transparent electrode and lower-layer transparent electrode) and the source bus line SL. In other words, the configuration of the present modified example is a configuration formed by adding the shield electrode portion 11b3 to the configuration of the second modified example (see FIG. 19). It is to be noted that the common electrode potential Vcom is, for example, provided to the shield electrode portion 11b3.

Figure 28:
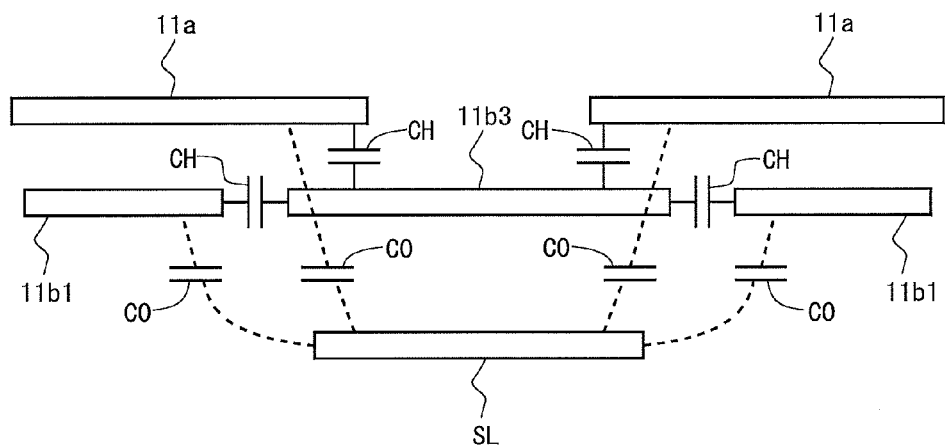
FIG. 28 is a sectional view taken along line A-A of FIG. 27.
Figure 29:
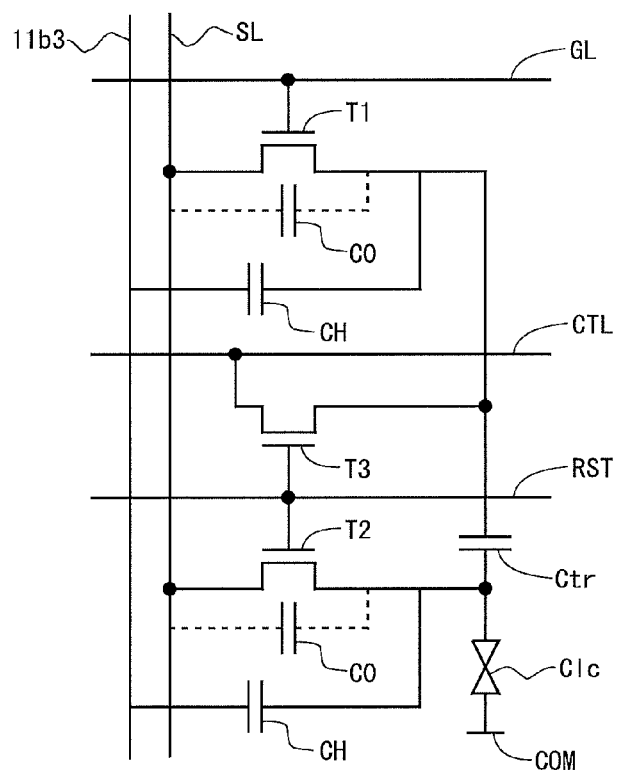
FIG. 29 is an equivalent circuit diagram also including a parasitic capacitor between a source bus line and a transparent electrode and a capacitor formed between a shield electrode and the transparent electrode in the seventh modified example.

FIG. 28 is a sectional view taken along line A-A of FIG. 27. FIG. 28 also shows the upper-layer transparent electrode and the lower-layer transparent electrode inside the pixel formation portion on the right side of the pixel formation portion shown in FIG. 27. As shown in FIG. 28, the shield electrode portion 11b3 is formed in a region between the source bus line SL and the upper-layer transparent electrode 11a. Provision of the shield electrode portion 11b3 in such a manner leads to a reduction in parasitic capacitor C0 between the source bus line and the transparent electrode (transparent electrode except for the shield electrode portion). It is to be noted that, in the present modified example, the shield electrode portion 11b3 is formed so as to cover the source bus line SL. FIG. 29 is an equivalent circuit diagram also including the parasitic capacitor C0 between the source bus line and the transparent electrode and a capacitor CH formed between the shield electrode portion and the transparent electrode. As grasped from FIG. 29, the capacitor CH formed between the shield electrode portion and the transparent electrode functions as an auxiliary capacitor, and hence it is possible to effectively reduce the influence exerted on the pixel electrode potential Vpix by the fluctuations in video signal potential (potential of the source bus line SL).

3.1.8 Eighth Modified Example

Figure 30:
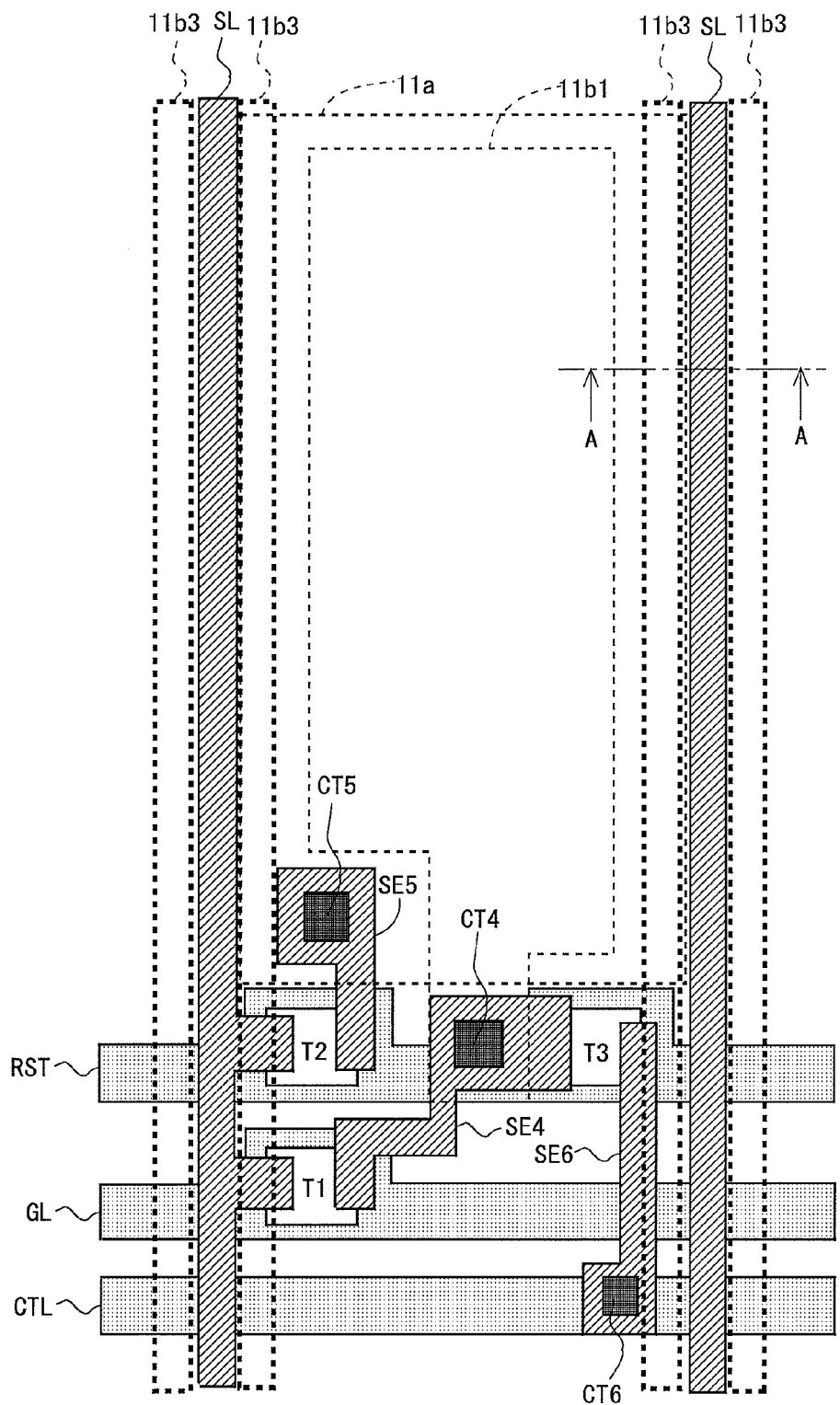
FIG. 30 is a view showing a layout of the vicinity of a pixel formation portion in an eighth modified example.
Figure 31:
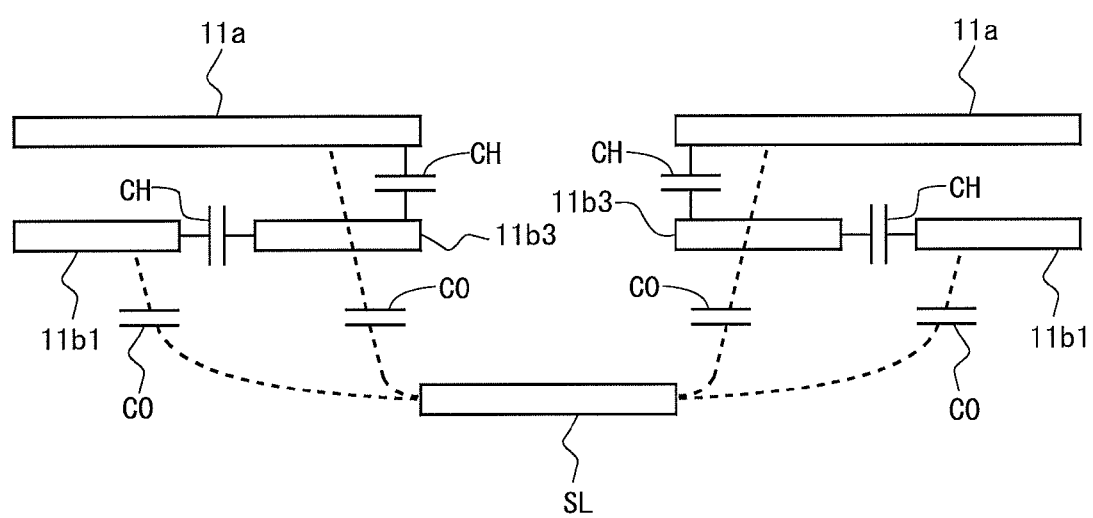
FIG. 31 is a sectional view taken along line A-A of FIG. 30.

FIG. 30 is a view showing a layout of the vicinity of a pixel formation portion in an eighth modified example. FIG. 31 is a sectional view taken along line A-A of FIG. 30. In the seventh modified example, the shield electrode portion 11b3 is formed so as to cover the source bus line SL, but in the present modified example, the shield electrode portions 11b3 are formed so as to be located on both sides of the source bus line SL in a plan view. In other words, the shield electrode portion 11b3 is formed so as not to overlap the source bus line SL, as well as being formed in a region between the source bus line SL and the lower-layer transparent electrode (the portion that functions as the amplification electrode 102) 11b1 in the direction in which the gate bus line GL extends.

According to the present modified example, a capacitance formed between the source bus line SL and the shield electrode portion 11b3 is reduced as compared with the seventh modified example. For this reason, it is possible to reduce wiring capacitance of the source bus line SL in addition to obtaining a similar effect to that in the seventh modified example.

3.1.9 Ninth Modified Example

Figure 32:
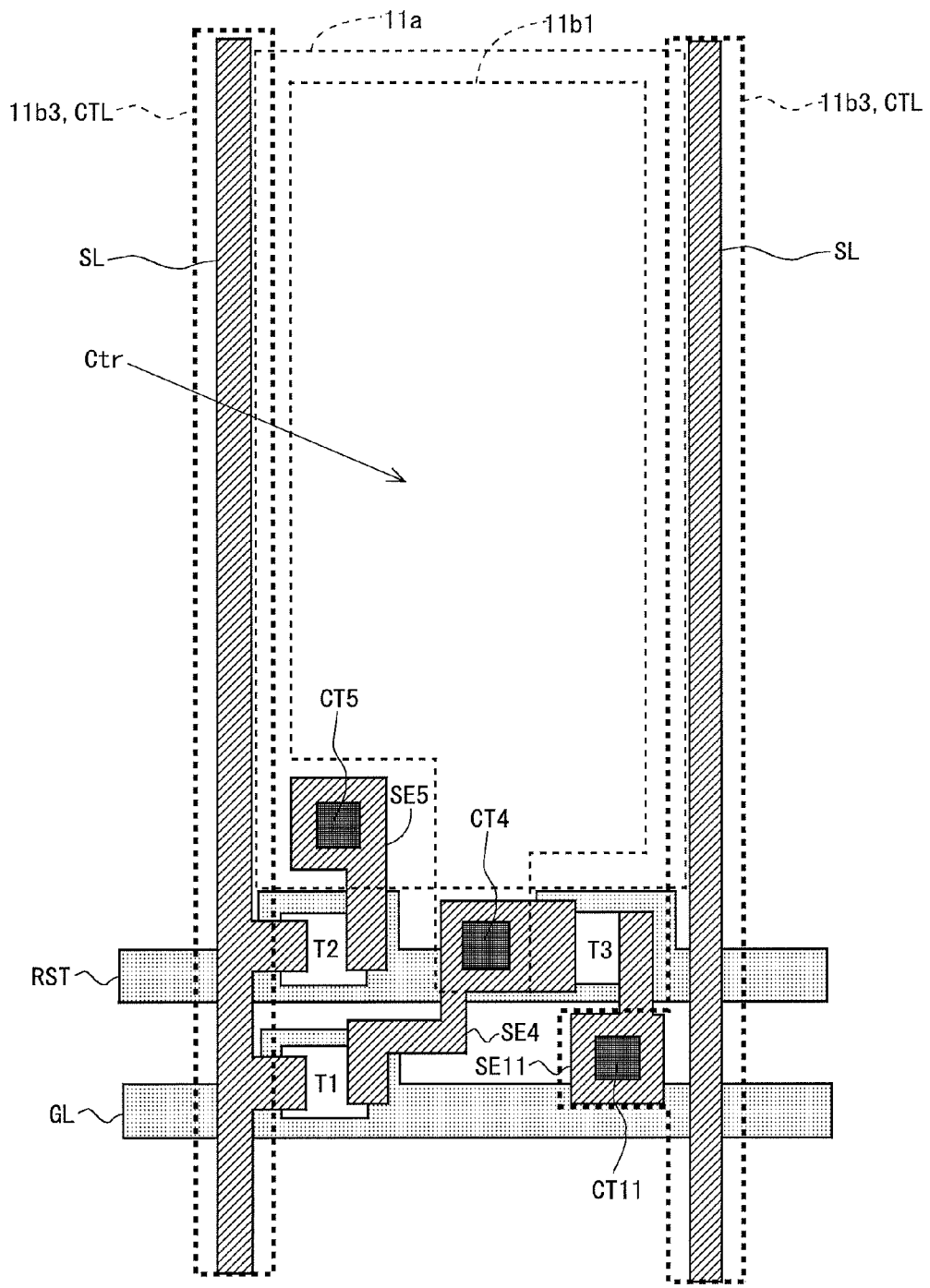
FIG. 32 is a view showing a layout of the vicinity of a pixel formation portion in a ninth modified example.

FIG. 32 is a view showing a layout of the vicinity of a pixel formation portion in a ninth modified example. In the present modified example, it is configured that the shield electrode portion 11b3 in the seventh modified example (see FIG. 27) also functions as the control wire CTL. For this reason, differently from the seventh modified example, the control wire CTL extending parallel to the gate bus line GL is not provided. In such a configuration, the source electrode of the thin-film transistor T3 and the shield electrode portion 11b3 (control wire CTL) are electrically connected to each other by a source metal denoted by reference character SE11 and a contact CT11.

Figure 33:
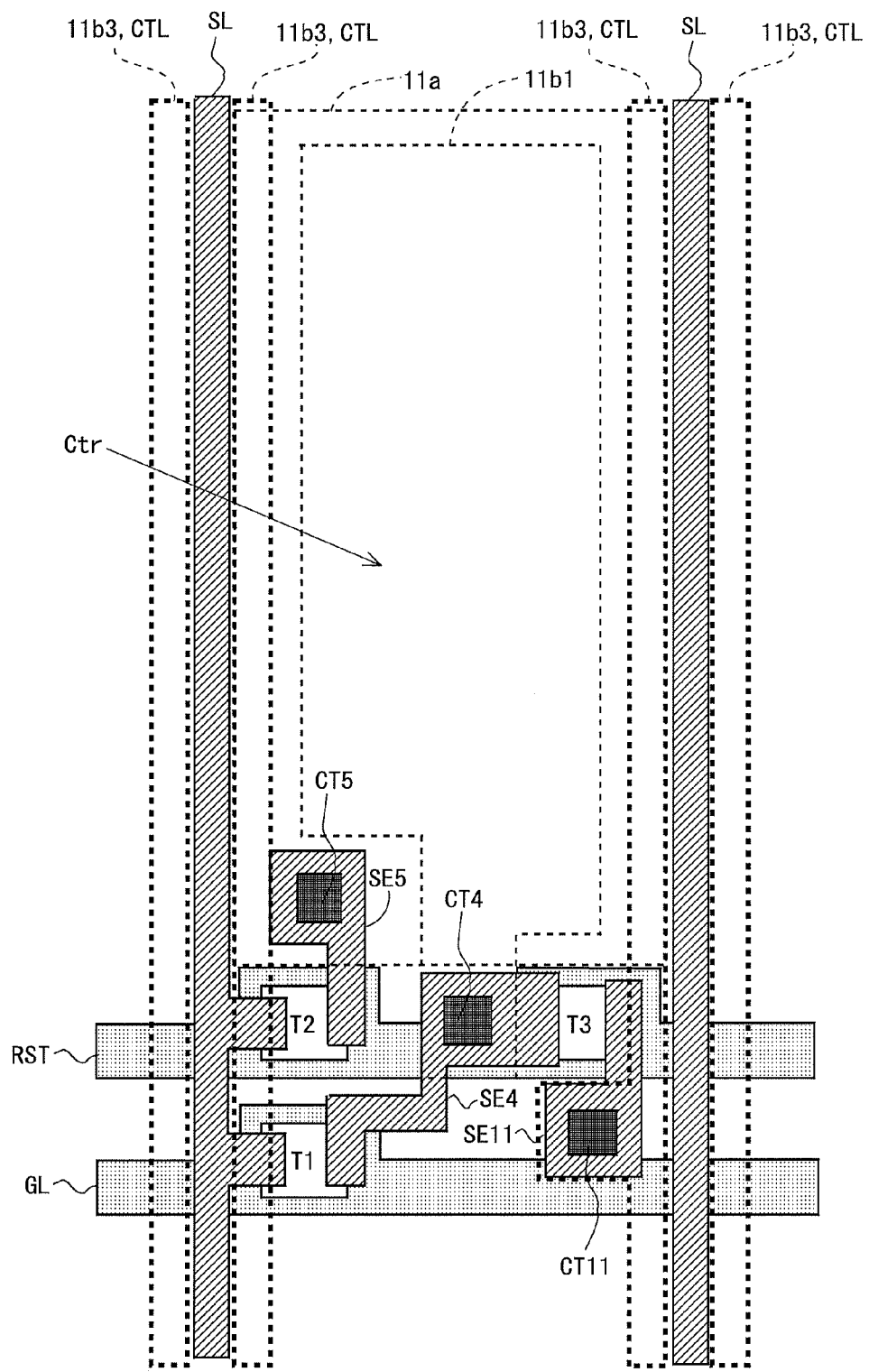
FIG. 33 is a view showing another example of the layout of the vicinity of the pixel formation portion in the ninth modified example.

According to the present modified example, since one electrode functions as both the shield electrode portion 11b3 and the control wire CTL, it is possible to obtain a similar effect to that in the seventh modified example also in the display device having the higher definition display portion 100. It is to be noted that, when a similar configuration is applied to the eighth modified example (see FIG. 30), the layout of the vicinity of the pixel formation portion is as shown in FIG. 33.

3.2 Method for Polarity Reversal of Pixels

As for the polarity reversal of pixels, a method as follows can be adopted other than the "1H line-reversal drive" adopted, for example, in the second embodiment (see FIG. 12) and the "dot-reversal drive" adopted, for example, in the first modified example (see FIG. 18).

3.2.1 Tenth Modified Example

Figure 34:
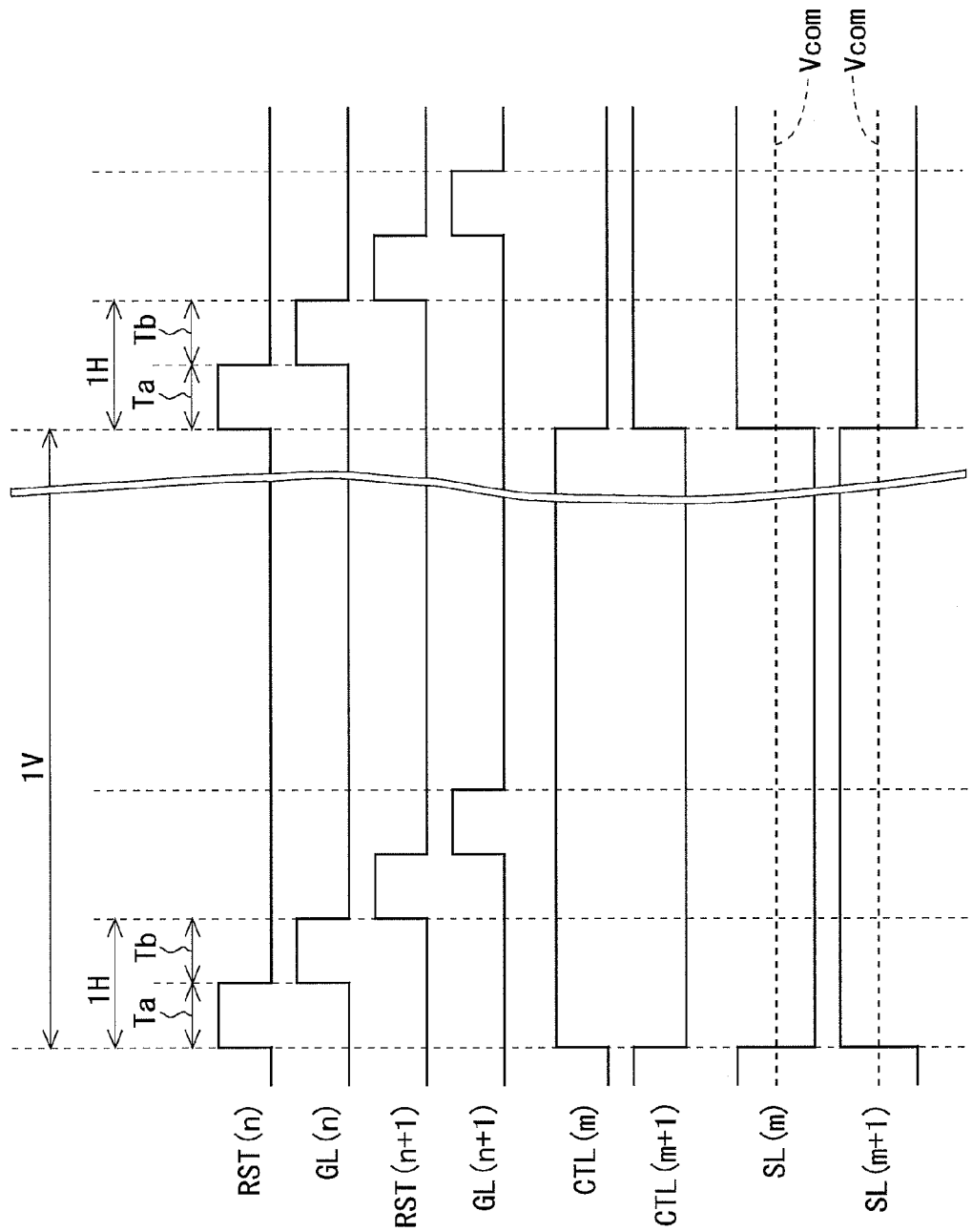
FIG. 34 is a signal waveform diagram for explaining a driving method in a tenth modified example.

FIG. 34 is a signal waveform diagram for explaining a driving method in a tenth modified example. It is to be noted that, in the present modified example, the arrangement relationship between the pixel formation portion and each line is, for example, one as shown in FIG. 17. A video signal in the positive polarity and a video signal in the negative polarity are alternately applied to the source bus line in each one frame (one vertical scanning period). Further, two adjacent source bus lines (e.g., SL(m) and SL(m+1)) are provided with video signals with different polarities from each other. A constant high-level potential and a constant low-level potential are alternately applied to the control wire in each one frame (one vertical scanning period). That is, the alternate-current drive is performed on the control wire CTL. Further, potentials on different levels from each other are applied to two adjacent control wires (e.g., CTL(m) and CTL(m+1)). Focusing attention on the relationship between the video signal potential and the control wire potential, a low-level potential is applied to the control wire corresponding to a certain source bus line when a video signal in the positive polarity is being provided to the source bus line. On the other hand, a high-level potential is applied to the control wire corresponding to a certain source bus line when a video signal in the negative polarity is being provided to the source bus line. In such a manner as thus described, a method called "column-reversal drive" can be adopted as to the polarity reversal of pixels.

For example, when the layout of the vicinity of the pixel formation portion is configured as in the first modified example (see FIG. 16), the third modified example (see FIG. 20) or the sixth modified example (see FIG. 26) and when the control wire CTL is alternate-current driven, the driving method of the present modified example can be adopted.

3.2.2 Eleventh Modified Example

Figure 35:
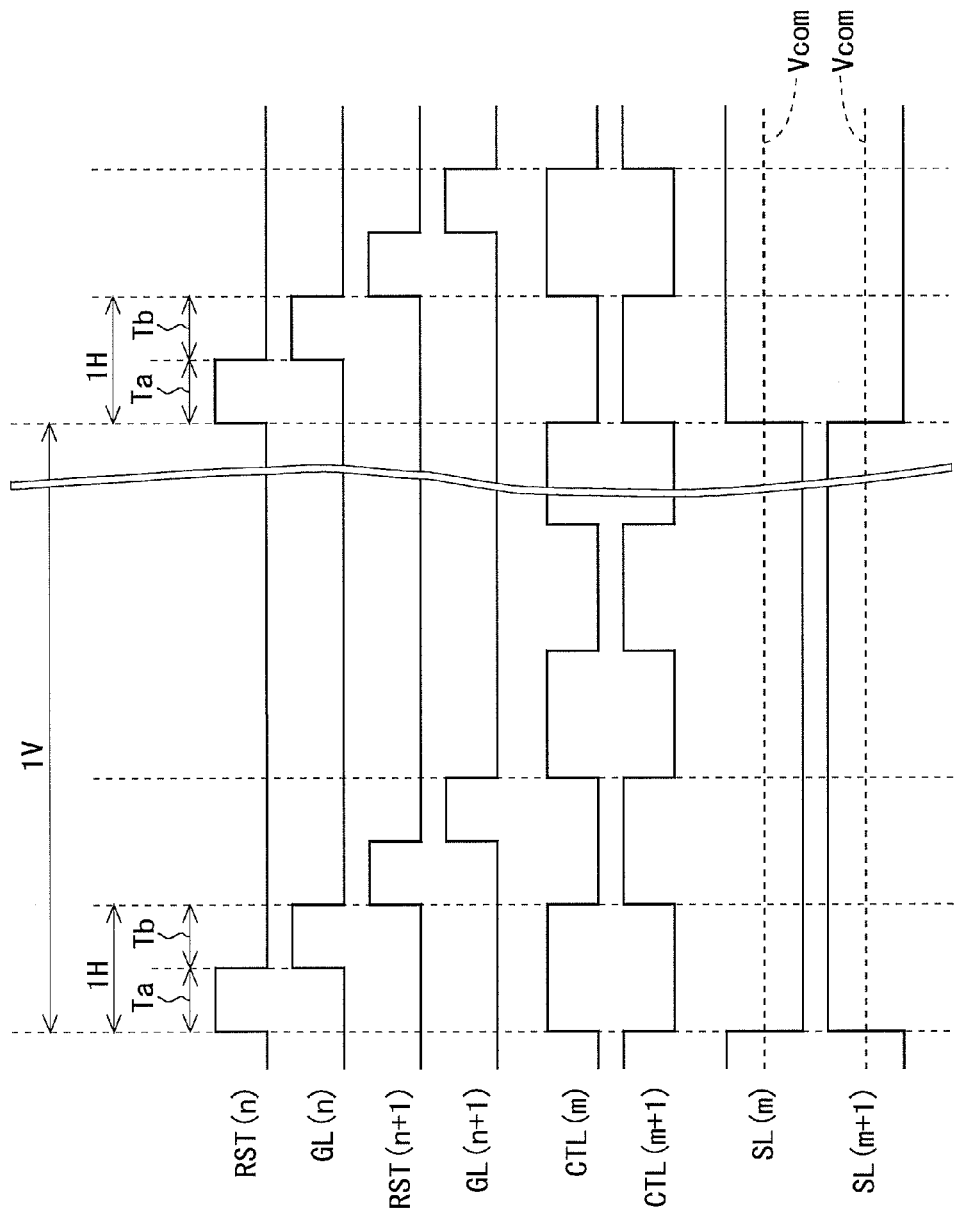
FIG. 35 is a signal waveform diagram for explaining a driving method in an eleventh modified example.
Figure 36:
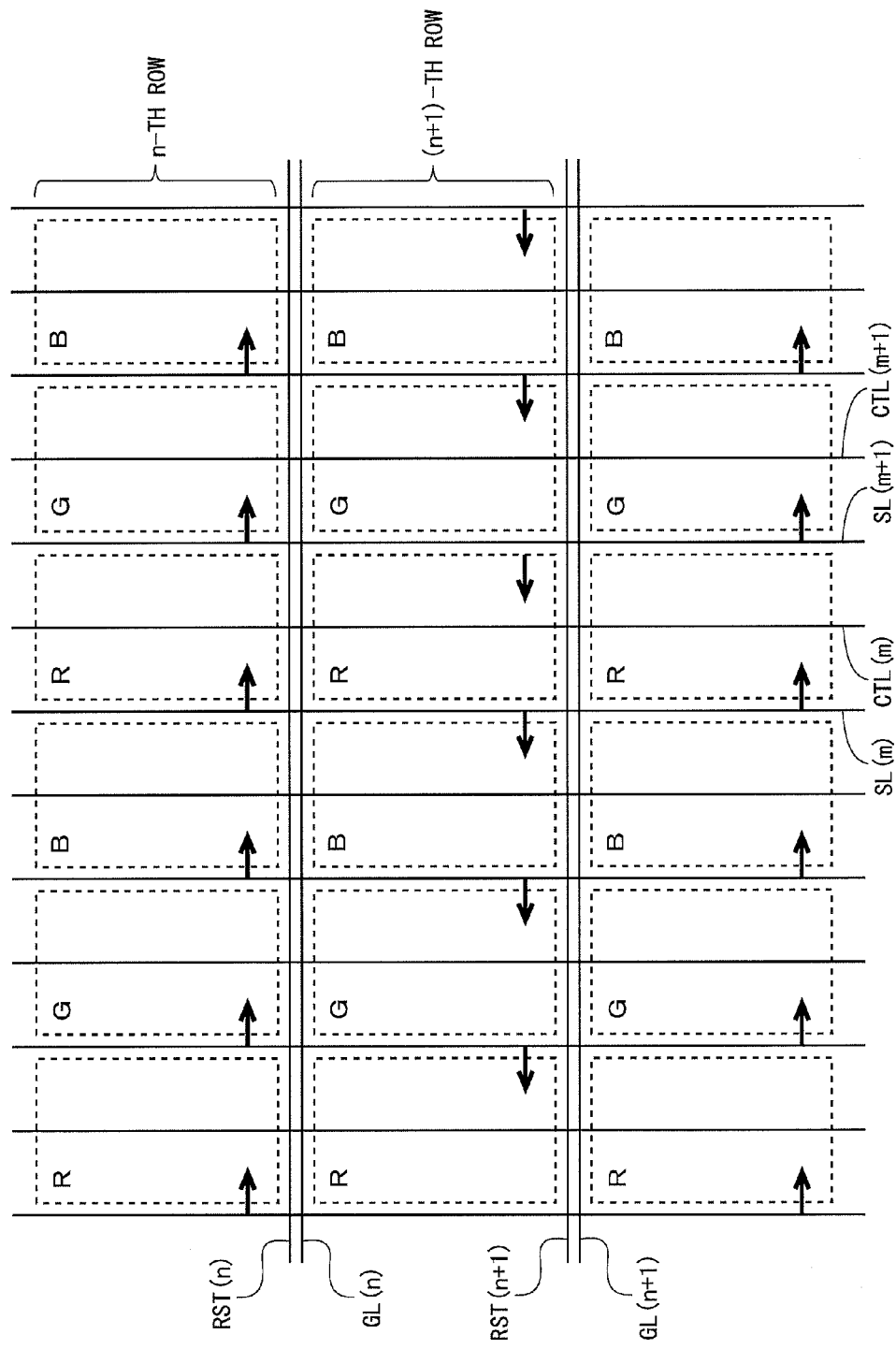
FIG. 36 is a view showing an arrangement relationship between a pixel formation portion and each line in the eleventh modified example.

FIG. 35 is a signal waveform diagram for explaining a driving method in an eleventh modified example. It is to be noted that, in the present modified example, the arrangement relationship between the pixel formation portion and each line is, for example, one as shown in FIG. 36. As shown in FIG. 36, when attention is focused on one source bus line, the pixel formation portions that receive supplies of video signals from the source bus line are arranged in a staggered form on both sides of the source bus line. The source bus line is driven in a similar manner to the tenth modified example. A constant high-level potential and a constant low-level potential are alternately applied to the control wire in each one horizontal scanning period. That is, the alternate-current drive is performed on the control wire. Further, potentials on different levels from each other are applied to two adjacent control wires (e.g., CTL(m) and CTL(m+1)).

For example, when the layout of the vicinity of the pixel formation portion is configured as in the first modified example (see FIG. 16), the third modified example (see FIG. 20) or the sixth modified example (see FIG. 26) and when the control wire CTL is alternate-current driven, the driving method of the present modified example can be adopted.

According to the present modified example, the source bus line is driven in a similar manner to the column-reversal drive, but the pixel formation portions connected to the respective source bus lines are arranged in the staggered form, thereby to suppress occurrence of flicker.

3.2.3 Others

In the first embodiment and the second embodiment, the examples are shown where the 1H line-reversal drive is adopted as to the polarity reversal of pixels (see FIGS. 8 and 12). Concerning this, the 1H line-reversal drive can also be adopted in a similar manner, for example, also in the case where the layout of the vicinity of the pixel formation portion is configured to be as in the second modified example (see FIG. 19) or in the fifth modified example (see FIG. 25).

In the first modified example, the examples are shown where the dot-reversal drive is adopted as to the polarity reversal of pixels (see FIG. 18). Concerning this, the dot-reversal drive can also be adopted in a similar manner, for example, when the layout of the vicinity of the pixel formation portion is configured to be as in the third modified example (see FIG. 20) or in the sixth modified example (see FIG. 26) and when the control wire CTL is alternate-current driven.

3.3 Configuration of Pixel Formation Portion

3.3.1 Twelfth Modified Example

Figure 37:
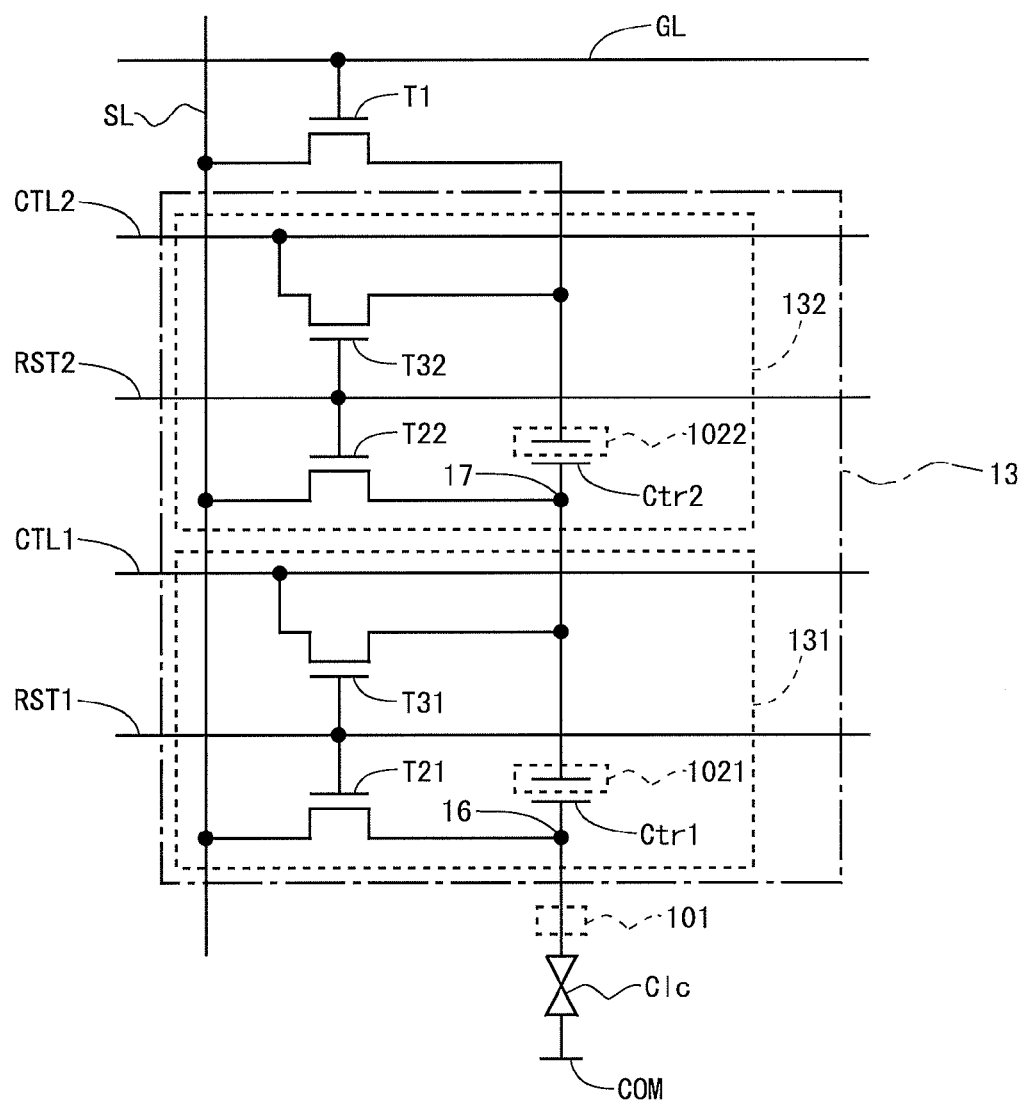
FIG. 37 is an equivalent circuit diagram showing a configuration of a pixel formation portion in a twelfth modified example.

FIG. 37 is an equivalent circuit diagram showing a configuration of a pixel formation portion in the present modified example. In the present modified example, as shown in FIG. 37, the amplification circuit portion 13 is configured of two amplification stages (first amplification stage 131 and second amplification stage 132). The first amplification stage 131 includes a thin-film transistor T21, a thin-film transistor T31 and a first second-capacitor Ctr1. The second amplification stage 132 includes a thin-film transistor T22, a thin-film transistor T32 and a second second-capacitor Ctr1. Further, as wires passing through the pixel formation portion, reset wires RST1, RST2 and control wires CTL1, CTL2 are provided in addition to the gate bus line GL and the source bus line SL. Moreover, as in the first embodiment, the thin-film transistor T1 and the first-capacitor Clc are included in the pixel formation portion.

In the configuration as thus described, a pixel electrode 101 exists at one end of the first-capacitor Clc. That is, the first-capacitor Clc is formed by the pixel electrode 101 and the common electrode COM. Further, at one end of the first second-capacitor Ctr1, there exists an electrode (herein after referred to as "first amplification electrode") 1021 for forming a capacitance between the electrode 1021 and the pixel electrode 101 or between the electrode 1021 and an electrode electrically connected to the pixel electrode 101. Moreover, at one end of the second second-capacitor Ctr2, there exists an electrode (herein after referred to as "second amplification electrode") 1022 for forming a capacitance between the electrode 1022 and the first amplification electrode 1021 or between the electrode 1022 and an electrode electrically connected to the first amplification electrode 1021.

A connecting relation among constitutional elements inside the pixel formation portion is as follows. As for the thin-film transistor T1, a gate electrode is connected to the gate bus line GL, a source electrode is connected to the source bus line SL, and a drain electrode is connected to one end of the second second-capacitor Ctr2. As for the thin-film transistor T22, a gate electrode is connected to the reset wire RST2, a source electrode is connected to the source bus line SL, and a drain electrode is connected to the other end of the second second-capacitor Ctr2. As for the thin-film transistor T32, a gate electrode is connected to the reset wire RST2, a source electrode is connected to the control wire CTL2, and a drain electrode is connected to one end of the second second-capacitor Ctr2. The other end of the second second-capacitor Ctr2 and the drain electrode of the thin-film transistor T22 are connected to one end of the first second-capacitor Ctr1 and a drain electrode of the thin-film transistor T31. As for the thin-film transistor T21, a gate electrode is connected to the reset wire RST1, a source electrode is connected to the source bus line SL, and a drain electrode is connected to the other end of the first second-capacitor Ctr1. As for the thin-film transistor T31, a gate electrode is connected to the reset wire RST1, a source electrode is connected to the control wire CTL1, and the drain electrode is connected to one end of the first second-capacitor Ctr1. One end of the first-capacitor Clc is connected to the drain electrode of the thin-film transistor T21 and the other end of the first second-capacitor Ctr1, and the other end of the first-capacitor Clc is connected to the common electrode COM.

Figure 38:
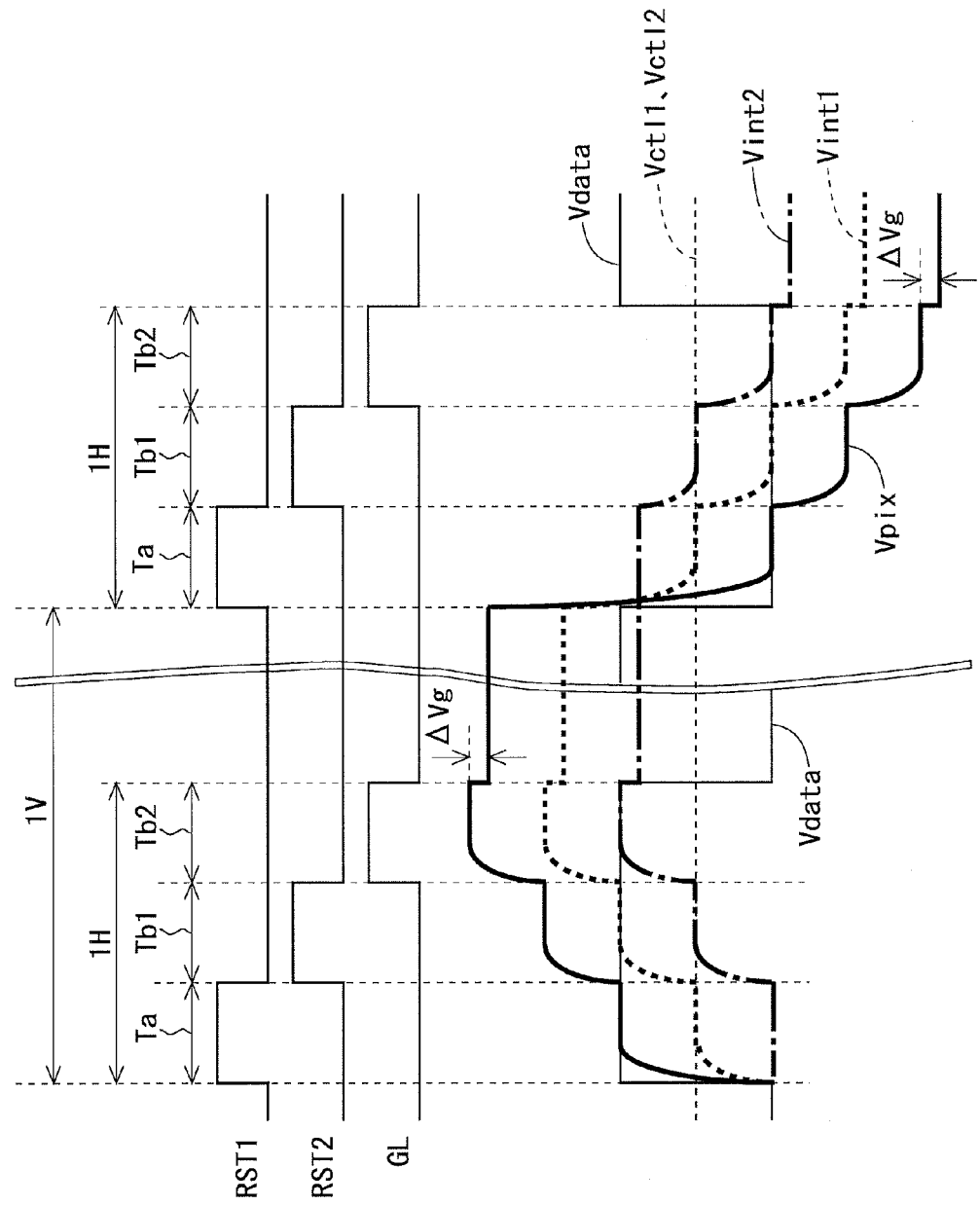
FIG. 38 is a signal waveform diagram for explaining an operation of a pixel formation portion in a selection period in the twelfth modified example.
Figure 39:
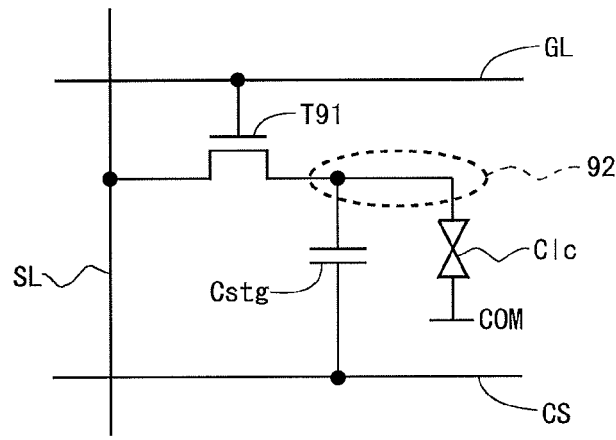
FIG. 39 is a circuit diagram showing a configuration of a pixel formation portion of a conventional general active matrix-type liquid crystal display device.
Figure 40:
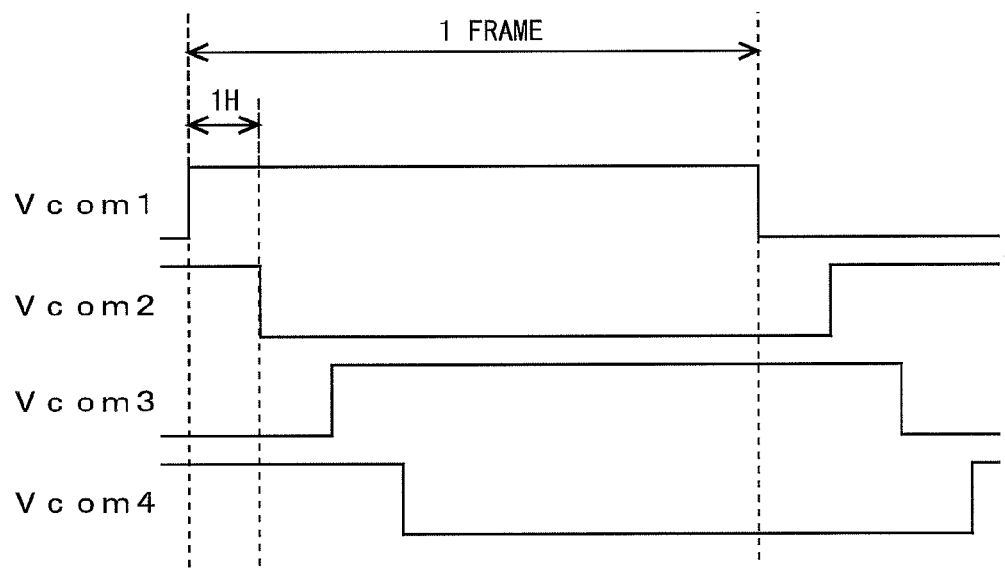
FIG. 40 is a signal waveform diagram for explaining an example of a method for driving a common electrode in the conventional example.
Figure 41:
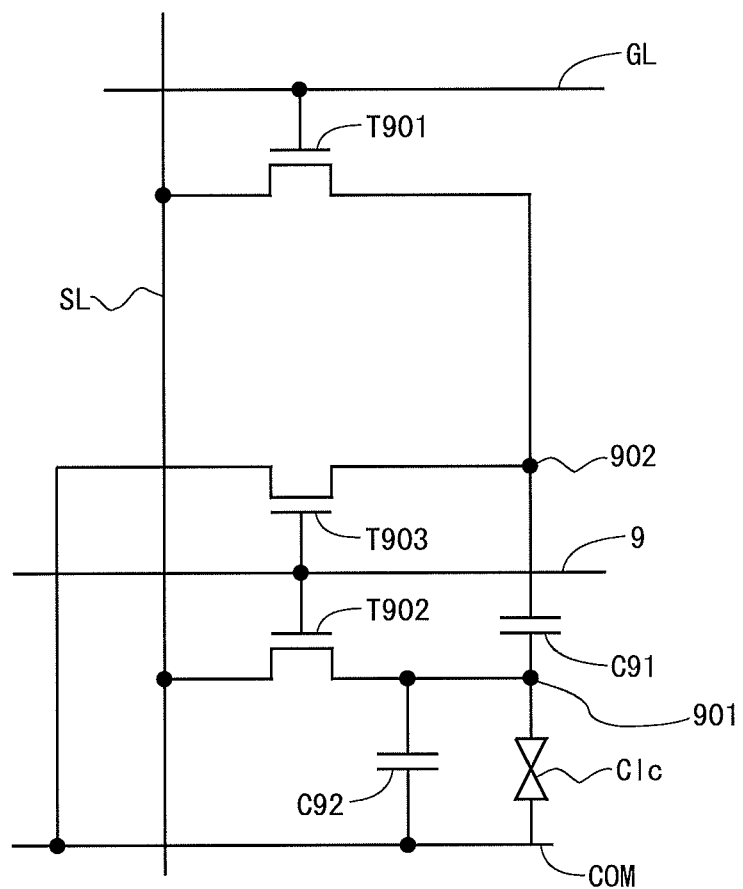
FIG. 41 is an equivalent circuit diagram showing an example of the configuration of the pixel formation portion in the conventional example.

FIG. 38 is a signal waveform diagram for explaining an operation of the pixel formation portion in a selection period in the present modified example. Here, attention is focused on the pixel formation portion where writing in the positive polarity is performed in an odd-numbered frame. In the present modified example, the selection period is configured of the precharge period Ta, a first amplification period Tb1 and a second amplification period Tb2.

First, in the precharge period Ta, an ON-level potential is applied to the reset wire RST1 in a state where an OFF-level potential is applied to the gate bus line GL and the reset wire RST2. This brings the thin-film transistors T1, T22 and T32 into the OFF state, and brings the thin-film transistors T21, T31 into the ON state. As a result, the video signal potential Vdata is applied to the pixel electrode 101, and a potential Vctl1 of the control wire CTL1 is applied to the first amplification electrode 1021.

Next, in the first amplification period Tb1, an ON-level potential is applied to the reset wire RST2 in a state where an OFF-level potential is applied to the gate bus line GL and the reset wire RST1. This brings the thin-film transistors T1, T21 and T31 into the OFF state, and brings the thin-film transistors T22, T32 into the ON state. As a result, the video signal potential Vdata is applied to the first amplification electrode 1021. That is, the potential Vint1 of the first amplification electrode 1021 increases from Vctl1 to Vdata. At this time, since the pixel electrode 101 is in the floating state, the pixel electrode potential Vpix increases via the first second-capacitor Ctr1 with increase in potential Vint1 of the first amplification electrode 1021. Further, in this period, a potential Vctl2 of the control wire CTL2 is applied to the second amplification electrode 1022.

Next, in the second amplification period Tb2, an ON-level potential is applied to the gate bus line GL in a state where OFF-level potentials are applied to the reset wires RST1, RST2. This brings the thin-film transistor T1 into the ON state, and brings the thin-film transistors T21, T31, T22 and T32 into the OFF state. As a result, the video signal potential Vdata is applied to the second amplification electrode 1022. That is, the potential Vint2 of the second amplification electrode 1022 increases from Vctl2 to Vdata. At this time, since the pixel electrode 101 and the first amplification electrode 1021 are in the floating state, the pixel electrode potential Vpix increases via the second second-capacitor Ctr1 and the first second-capacitor Ctr1 with increase in potential Vint2 of the second amplification electrode 1022. When the second amplification period Tb2 is completed, the pixel electrode potential Vpix decreases by ΔVg.

According to the present modified example, the pixel electrode potential Vpix is amplified in the first amplification period Tb1, and thereafter further amplified in the second amplification period Tb2. In this manner, the pixel electrode potential Vpix is amplified in two stages. As a result, the pixel electrode potential Vpix after completion of the selection period and the occurrence of the voltage fluctuation ΔVg become a value shown in the following equation (8).

[Mathematical Formula 6]

$$Vpix = \left[1 + \frac{Ctr1}{Ctr1 + Clc + Cp1} + \frac{Ctr1 \cdot Ctr2}{Ctr1(Clc + Cp1) + Ctr1 \cdot Ctr2 + Ctr2(Clc + Cp1) + Cp2(Ctr1 + Clc + Cp1)}\right] \cdot \qquad (8)$$

$$Vdata - \left[1 + \frac{Ctr1}{Ctr1 + Clc + Cp1}\right] \cdot Vctl1 -$$

$$\left[\frac{Ctr1 \cdot Ctr2}{Ctr1(Clc + Cp1) + Ctr1 \cdot Ctr2 + Ctr2(Clc + Cp1) + Cp2(Ctr1 + Clc + Cp1)}\right] \cdot Vctl2 - \Delta Vg$$

where Cp1 indicates a capacitance value of a parasitic capacitor at a node 16 in FIG. 37, and Cp1 indicates a capacitance value of a parasitic capacitor at a node 17 in FIG. 37.

As described above, the pixel electrode potential Vpix is amplified on a large scale. For this reason, the amplitude of the video signal can be significantly made smaller than the conventional case, thus significantly reducing the power consumption.

Although the description is given taking the example of the amplification circuit portion 13 being configured of two amplification stages, the amplification circuit portion 13 may be configured of three or more amplification stages. In this case, the drain electrode of the thin-film transistor T1 is connected to a drain electrode of the thin-film transistor that functions as the third switching element among the thin-film transistors included in the amplification stage electrically arranged the farthest from the pixel electrode 101 among the plurality of stages. Further, the pixel electrode 101 is connected to a drain electrode of the thin-film transistor that functions as the second switching element among the thin-film transistors included in the amplification stage electrically arranged the nearest from the pixel electrode 101 among the plurality of stages. Moreover, when attention is focused on the consecutive two amplification stages, the drain electrode of the thin-film transistor that functions as the second switching element among the thin-film transistors included in the amplification stage electrically arranged farther from the pixel electrode 101 is connected to the drain electrode of the thin-film transistor that functions as the third switching element among the thin-film transistors included in the amplification stage electrically arranged nearer from the pixel electrode 101.

4. Others

For example in the case of direct-current driving the control wire CTL as in the first embodiment, any of the "1H line-reversal drive", the "dot-reversal drive" and the "column-reversal drive" may be applied as to the polarity reversal of pixels.

Although the description is given taking the example of the liquid crystal display device in each of the above embodiments and each of the above modified examples, the present invention is not restricted thereto. The present invention is applicable to a display device besides the liquid crystal display device. Further, while the present invention is useful in that an amplitude of a video signal can be made small to reduce power consumption in a display device having a large-sized panel, the present invention is also applicable to a display device having a small-sized panel.

DESCRIPTION OF REFERENCE CHARACTERS

11: transparent electrode
12: electrode (electrode that functions as amplification electrode)
13: amplification circuit portion
100: display portion
101: pixel electrode
102: amplification electrode
COM: common electrode
T1: thin-film transistor (first switching element)
T2: thin-film transistor (second switching element)
T3: thin-film transistor (third switching element)
Clc: first-capacitor
Ctr: second-capacitor
GL: gate bus line
SL: source bus line
CTL: control wire
RST: reset wire
Vctl: control wire potential
Vcom: common electrode potential
Vdata: video signal potential
Vint: amplification electrode potential
Vpix: pixel electrode potential

The invention claimed is:
1. An active matrix-type display device which has a plurality of video signal lines; a plurality of scanning signal lines intersecting with the plurality of video signal lines; a plurality of pixel formation portions arranged in a matrix form correspondingly respectively to intersections of the plurality of video signal lines and the plurality of scanning signal lines; and a common electrode commonly provided in the plurality of pixel formation portions, the display device comprising:
    first control wires which intersect with at least one of the plurality of video signal lines and the plurality of scanning signal lines, and
    second control wires which are provided so as to correspond one-to-one to the plurality of scanning signal lines, wherein each of the pixel formation portions includes
a pixel electrode which is to be applied with a potential in accordance with an image to be displayed,
a first-capacitor which is formed by the pixel electrode and the common electrode,
an amplification circuit portion for amplifying a potential of the pixel electrode, and
a first switching element whose control terminal is connected to the scanning signal line, whose first conductive terminal is connected to the video signal line, and whose second conductive terminal is connected to the amplification circuit portion,
the amplification circuit portion includes an amplification stage constituted by
a second switching element whose control terminal is connected to the second control wire and whose first conductive terminal is connected to the video signal line,
a third switching element whose control terminal is connected to the second control wire and whose first conductive terminal is connected to the first control wire, and
a second-capacitor provided between the second conductive terminal of the second switching element and the second conductive terminal of the third switching element,
the second conductive terminal of the first switching element is connected to the second conductive terminal of the third switching element,
the pixel electrode is connected to the second conductive terminal of the second switching element, and
when attention is focused on any pixel formation portion, one frame period during which a display for one screen is performed includes a selection period and a non-selection period other than the selection period, the selection period being a period for changing a potential of the pixel electrode in accordance with the image to be displayed and including a first period and a second period,
the corresponding first control wire is applied with a constant potential or alternatively applied with a constant high-level potential and a constant low-level potential,
the corresponding second control wire is applied with a potential for bringing the second switching element and the third switching element into an ON state in the first period and is applied with a potential for bringing the second switching element and the third switching element into an OFF state in a period other than the first period, and
the corresponding scanning signal line is applied with a potential for bringing the first switching element into the ON state in the second period and is applied with a potential for bringing the first switching element into the OFF state in a period other than the second period.

2. The display device according to claim 1, wherein the high-level potential and the low-level potential are alternately applied to the first control wire.

3. The display device according to claim 2, wherein when attention is focused on any pixel formation portion, the corresponding first control wire is
applied with the high-level potential in the selection period in which a potential lower than the potential of the common electrode is to be applied to the pixel electrode, and
applied with the low-level potential in the selection period in which a potential higher than the potential of the common electrode is to be applied to the pixel electrode.

4. The display device according to claim 2, wherein when a median potential between the maximum potential and the minimum potential that can be applied to the plurality of video signal lines is taken as a reference potential, potentials of values obtained by adding a value Vctla, calculated by the following equation, to respective values of a potential higher than the reference potential by a predetermined magnitude and a potential lower than the reference potential by the predetermined magnitude, are applied to the first control wire as the high-level potential and the low-level potential, $$Vctla = -\Delta Vg \cdot (Ctr + Clc + Cp)/Ctr$$

where $\Delta Vg$ indicates a magnitude of a change in potential of the pixel electrode due to a change in potential of the scanning signal line at the time of shift from the selection period to the non-selection period, Clc indicates a capacitance value of the first-capacitor, Ctr indicates a capacitance value of the second-capacitor, and Cp indicates a capacitance value of a parasitic capacitor.

5. The display device according to claim 1, wherein when a median potential between the maximum potential and the minimum potential that can be applied to the plurality of video signal lines is taken as a reference potential, a potential of a value obtained by adding a value Vctla, calculated by the following equation, to a value of the reference potential is applied to the first control wire as the constant potential, $$Vctla = -\Delta Vg \cdot (Ctr + Clc + Cp)/Ctr$$

where $\Delta Vg$ indicates a magnitude of a change in potential of the pixel electrode due to a change in potential of the scanning signal line at the time of shift from the selection period to the non-selection period, Clc indicates a capacitance value of the first-capacitor, Ctr indicates a capacitance value of the second-capacitor, and Cp indicates a capacitance value of a parasitic capacitor.

6. The display device according to claim 1, wherein the first control wire is arranged so as to extend parallel to the scanning signal line.

7. The display device according to claim 1, wherein the first control wire is arranged so as to extend parallel to the video signal line.

8. The display device according to claim 1, further comprising
a two-layer transparent electrode having a first transparent electrode which functions as the pixel electrode, and a second transparent electrode which includes a capacitor forming electrode portion for forming the second-capacitor between the pixel electrode and the capacitor forming electrode portion.

9. The display device according to claim 8, wherein the second transparent electrode further includes a lattice-form electrode portion formed in a lattice so as to have a part extending parallel to the scanning signal line and a part extending parallel to the video signal line and electrically separated from the capacitor forming electrode portion, and
the lattice-form electrode portion functions as the first control wire.

10. The display device according to claim 8, wherein the second transparent electrode further includes a shield electrode portion formed in a region between the video signal line and the first transparent electrode and electrically separated from the capacitor forming electrode portion.

11. The display device according to claim 10, wherein the shield electrode portion is formed so as to cover the video signal line.

12. The display device according to claim 10, wherein
the shield electrode portion is formed so as not to overlap the video signal line, and formed in a region between the video signal line and the capacitor forming electrode portion in a direction in which the scanning signal line extends.

13. The display device according to claim 10, wherein
the shield electrode portion functions as the first control wire.

14. The display device according to claim 1, wherein
liquid crystal is provided as a display medium between the pixel electrode and the common electrode,
each of the pixel formation portions forms a pixel constituted by a plurality of regions in which orientational states of the liquid crystal are different from each other, and
the first control wire is arranged in the region corresponding to a boundary portion of the plurality of regions.

15. The display device according to claim 1, wherein
the amplification circuit portion includes a plurality of amplification stages,
the second conductive terminal of the first switching element is connected to the second conductive terminal of the third switching element included in the amplification stage electrically arranged the farthest from the pixel electrode among the plurality of amplification stages,
the pixel electrode is connected to the second conductive terminal of the second switching element included in the amplification stage electrically arranged the nearest from the pixel electrode among the plurality of amplification stages, and
when attention is focused on the consecutive two amplification stages, the second conductive terminal of the second switching element included in the amplification stage electrically arranged farther from the pixel electrode is connected to the second conductive terminal of the third switching element included in the amplification stage electrically arranged nearer from the pixel electrode.

16. A method for driving an active matrix-type display device which has a plurality of video signal lines; a plurality of scanning signal lines intersecting with the plurality of video signal lines; a plurality of pixel formation portions arranged in a matrix form corresponding respectively to intersections of the plurality of video signal lines and the plurality of scanning signal lines; and a common electrode commonly provided in the plurality of pixel formation portions, each of the pixel formation portions having a pixel electrode which is to be applied with a potential in accordance with an image to be displayed, the method comprising:
regarding each of the pixel formation portions,
a pixel electrode potential changing step for changing the potential of the pixel electrode in accordance with the image to be displayed in each one frame period during which a display for one screen is performed; and
a pixel electrode potential holding step for holding the potential of the pixel electrode, wherein
the display device includes
first control wires which intersect with at least one of the plurality of video signal lines and the plurality of scanning signal lines, and
second control wires which are provided so as to correspond one-to-one to the plurality of scanning signal lines,
each of the pixel formation portions includes
a first-capacitor which is formed by the pixel electrode and the common electrode,
an amplification circuit portion for amplifying a potential of the pixel electrode, and
a first switching element whose control terminal is connected to the scanning signal line, whose first conductive terminal is connected to the video signal line, and whose second conductive terminal is connected to the amplification circuit portion,
the amplification circuit portion includes an amplification stage constituted by
a second switching element whose control terminal is connected to the second control wire and whose first conductive terminal is connected to the video signal line,
a third switching element whose control terminal is connected to the second control wire and whose first conductive terminal is connected to the first control wire, and
a second-capacitor provided between the second conductive terminal of the second switching element and the second conductive terminal of the third switching element,
the second conductive terminal of the first switching element is connected to the second conductive terminal of the third switching element,
the pixel electrode is connected to the second conductive terminal of the second switching element,
the first control wire is applied with a constant potential or alternatively applied with a constant high-level potential and a constant low-level potential, and
when attention is focused on any pixel formation portion,
the pixel electrode potential changing step includes
a first step in which the corresponding second control wire is applied with a potential for bringing the second switching element and the third switching element into an ON state in a state where the corresponding scanning signal line is applied with a potential for bringing the first switching element into an OFF state, and
a second step in which the corresponding scanning signal line is applied with a potential for bringing the first switching element into the ON state in a state where the corresponding second control wire is applied with a potential for bringing the second switching element and the third switching element into the OFF state, and
in the pixel electrode potential holding step, the corresponding scanning signal line is applied with a potential for bringing the first switching element into the OFF state, and the corresponding second control wire is applied with a potential for bringing the second switching element and the third switching element into the OFF state.

* * * * *